(12) United States Patent
Loehr et al.

(10) Patent No.: US 11,510,205 B2
(45) Date of Patent: *Nov. 22, 2022

(54) EFFICIENT MULTIPLEXING OF CONTROL INFORMATION IN TRANSPORT BLOCK

(71) Applicant: Panasonic Intellectual Property Corporation of America, Torrance, CA (US)

(72) Inventors: Joachim Loehr, Hessen (DE); Prateek Basu Mallick, Hessen (DE); Rikin Shah, Hessen (DE); Hidetoshi Suzuki, Kanagawa (JP); Takako Hori, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/123,599

(22) Filed: Dec. 16, 2020

(65) Prior Publication Data

US 2021/0105777 A1 Apr. 8, 2021

Related U.S. Application Data

(63) Continuation of application No. 16/366,234, filed on Mar. 27, 2019, now Pat. No. 10,904,886, which is a
(Continued)

(30) Foreign Application Priority Data

Nov. 4, 2016 (EP) .................................... 16197412

(51) Int. Cl.
*H04W 72/04* (2009.01)
*H04L 1/00* (2006.01)
(Continued)

(52) U.S. Cl.
CPC ....... *H04W 72/0466* (2013.01); *H04L 1/0078* (2013.01); *H04W 8/02* (2013.01);
(Continued)

(58) Field of Classification Search
CPC ... H04W 72/0466; H04W 88/16; H04W 8/02; H04W 80/00; H04W 80/02; H04W 80/04;
(Continued)

(56) References Cited

U.S. PATENT DOCUMENTS

| | | | |
|---|---|---|---|
| 7,454,554 B1 | 11/2008 | Norrie et al. | |
| 7,978,640 B2 | 7/2011 | Lee et al. | |

(Continued)

FOREIGN PATENT DOCUMENTS

| | | |
|---|---|---|
| CN | 101578895 A | 11/2009 |
| CN | 101953095 A | 1/2011 |

(Continued)

OTHER PUBLICATIONS

3GPP TS 36.211 V8.9.0, "3rd Generation Partnership Project; Technical Specification Group Radio Access Network; Evolved Universal Terrestrial Radio Access (E-UTRA); Physical Channels and Modulation (Release 8)", Dec. 2009.
(Continued)

*Primary Examiner* — Warner Wong
(74) *Attorney, Agent, or Firm* — Seed IP Law Group LLP

(57) ABSTRACT

Provided are systems and methods for transmitting data over a wireless channel from a data transmitting node to a data receiving node in a communication system. The data transmitting node comprises second-layer processing circuitry for receiving at least one second-layer SDU, to be mapped onto a resource allocated for data transmission, and for generating a second-layer PDU, including the at least one second-layer SDU and at least one second-layer control element, and first-layer processing circuitry for receiving the
(Continued)

second-layer PDU generated by the second-layer processing circuitry and for mapping the second-layer PDU onto the resource allocated for data transmission. The data receiving node comprises first-layer processing circuitry for de-mapping at least one second-layer PDU, and second layer processing circuitry for receiving and parsing the second-layer PDU demapped by the first-layer processing circuitry, the second-layer PDU including at least one second-layer SDU, and at least one second-layer control element.

16 Claims, 35 Drawing Sheets

Related U.S. Application Data continuation of application No. PCT/JP2017/031306, filed on Aug. 31, 2017.

(51) Int. Cl.
    *H04W 8/02*     (2009.01)
    *H04L 1/16*     (2006.01)
    *H04L 27/34*    (2006.01)
    *H04W 80/02*    (2009.01)
    *H04W 88/16*    (2009.01)

(52) U.S. Cl.
    CPC .......... *H04L 1/1664* (2013.01); *H04L 27/345* (2013.01); *H04W 80/02* (2013.01); *H04W 88/16* (2013.01)

(58) Field of Classification Search
    CPC ................. H04L 1/1664; H04L 27/345; H04L 29/08009; H04L 29/08018; H04L 29/08027; H04L 29/08036; H04L 69/30; H04L 69/321; H04L 69/322; H04L 47/35322; H04L 47/35
    See application file for complete search history.

(56) References Cited

U.S. PATENT DOCUMENTS

| | | | |
|---|---|---|---|
| 10,749,641 | B2 | 8/2020 | Gholmieh et al. |
| 2005/0172199 | A1 | 8/2005 | Miller et al. |
| 2006/0072494 | A1 | 4/2006 | Matusz |
| 2006/0165045 | A1 | 7/2006 | Kim et al. |
| 2006/0251027 | A1 | 11/2006 | Chun et al. |
| 2009/0141670 | A1 | 6/2009 | Duncan Ho |
| 2009/0163211 | A1 | 6/2009 | Kitazoe et al. |
| 2009/0238124 | A1 | 9/2009 | Pragada et al. |
| 2009/0310533 | A1 | 12/2009 | Zheng et al. |
| 2010/0014468 | A1 | 1/2010 | Lee et al. |
| 2010/0028911 | A1 | 2/2010 | Tjioe |
| 2010/0111016 | A1 | 5/2010 | Lee et al. |
| 2010/0128672 | A1 | 5/2010 | Harada et al. |
| 2010/0157904 | A1 | 6/2010 | Ho et al. |
| 2010/0172376 | A1 | 7/2010 | Chun et al. |
| 2011/0019604 | A1* | 1/2011 | Chun .................... H04L 1/1887 370/312 |
| 2011/0096725 | A1 | 4/2011 | Chun et al. |
| 2011/0149840 | A1* | 6/2011 | Harada .................... H04L 69/22 370/328 |
| 2012/0083309 | A1 | 4/2012 | Kwon et al. |
| 2013/0044698 | A1* | 2/2013 | Susitaival ............. H04W 28/06 370/328 |
| 2013/0051334 | A1 | 2/2013 | Sammour et al. |
| 2013/0250973 | A1 | 9/2013 | Agiwal et al. |
| 2014/0050230 | A1 | 2/2014 | Bao et al. |
| 2014/0140276 | A1* | 5/2014 | Cave .................... H04W 24/10 370/328 |
| 2015/0085749 | A1 | 3/2015 | Eravelli et al. |
| 2015/0156764 | A1* | 6/2015 | Yang ...................... H04L 5/001 370/329 |
| 2015/0341865 | A1* | 11/2015 | Yang ..................... H04L 1/1861 455/522 |
| 2015/0382312 | A1* | 12/2015 | Kim .................. H04W 72/0413 370/252 |
| 2016/0302104 | A1 | 10/2016 | Bharadwaj et al. |
| 2017/0013634 | A1 | 1/2017 | Tsuboi et al. |
| 2018/0054814 | A1* | 2/2018 | Zhang .................... H04W 76/27 |
| 2018/0124767 | A1* | 5/2018 | Shaheen ............... H04W 28/06 |
| 2018/0124843 | A1* | 5/2018 | Shaheen ............... H04L 1/1874 |
| 2018/0176344 | A1* | 6/2018 | Yang ..................... H04L 69/324 |
| 2018/0183560 | A1* | 6/2018 | He ......................... H04W 76/34 |
| 2019/0215727 | A1* | 7/2019 | Turtinen ............. H04W 28/065 |
| 2019/0223256 | A1 | 7/2019 | Lin et al. |
| 2019/0230736 | A1 | 7/2019 | Quan et al. |
| 2019/0260856 | A1 | 8/2019 | Jiang |
| 2019/0306871 | A1 | 10/2019 | Liu et al. |
| 2019/0364605 | A1 | 11/2019 | Loehr et al. |

FOREIGN PATENT DOCUMENTS

| | | |
|---|---|---|
| WO | 2008/127034 A1 | 10/2008 |
| WO | 2009/104928 A1 | 8/2009 |
| WO | 2011/012040 A1 | 2/2011 |
| WO | 2015/141824 A1 | 9/2015 |
| WO | 2016/010258 | 1/2016 |

OTHER PUBLICATIONS

3GPP TS 36.321 version 13.3.0 Release 13, "LTE; Evolved Universal Terrestrial Radio Access (E-UTRA); Medium Access Control (MAC) protocol specification", Oct. 2016.
3GPP TS 36.213 version 13.0.0 Release 13, "LTE; Evolved Universal Terrestrial Radio Access (E-UTRA); Physical layer procedures", May 2016.
3GPP TS 36.322 version 13.2.0 Release 13, "LTE; Evolved Universal Terrestrial Radio Access (E-UTRA); Radio Link Control (RLC) protocol specification", Aug. 2016.
3GPP TS 36.212 version 13.0.0 Release 13, "LTE; Evolved Universal Terrestrial Radio Access (E-UTRA); Multiplexing and channel coding", Jan. 2016.
3GPP TSG-RAN WG2 #66bis, R2-093800, "Dynamic Scheduling Information in LTE MBMS", Jun. 2009.
3GPP TSG-RAN WG2 Meeting #96, R2-167796, "MAC PDU Structure for NR", Nov. 2016.
International Search Report of PCT application No. PCT/JP2017/031306 dated Nov. 28, 2017.
R2-167190—Way forward on concatenation discussion, "Way forward for concatenation discussion", Oct. 1, 2016.
Russian Search Report dated Sep. 11, 2020 for the corresponding Russian Patent Application No. 2019105130, 2 pages.
3GPP TS 36.321 V14.0.0, "3$^{rd}$ Generation Partnership Project; Technical Specification Group Radio Access Network; Evolved Universal Terrestrial Radio Access (E-UTRA); Medium Access Control (MAC) protocol specification (Release 14)", Sep. 2016, 96 pages.
Ericsson, "Placement of RLC/MAC headers," Tdoc R2-166824, Agenda Item: 9.2.1.1, 3GPP TSG-RAN WG2 Meeting #95bis, Kaohsiung, Taiwan, Oct. 10-14, 2016, 7 pages.
NTT DoCoMo, "MAC PDU structure for LTE," R2-072015, Agenda Item: 4.13, 3GPP TSG RAN WG2 Meeting #58, May 7-11, 2007, Kobe, Japan, 5 pages.
NTT DoCoMo, Inc., NEC, "MAC PDU structure for LTE," R2-073560, Agenda Item: 5.2.1, 3GPP TSG RAN WG2 Meeting #59, Aug. 20-24, 2007, Athens, Greece, 4 pages.
NTT DoCoMo, Inc., NEC, "MAC PDU structure for LTE," R2-074174, Agenda Item: 5.1.1.2, 3GPP TSG RAN WG2 Meeting #59bis, Oct. 8-12, 2007, Shanghai, China, 5 pages.
Panasonic, "MAC PDU format for LTE," R2-070096, Agenda Item: 5.9, 3GPP TSG RAN WG2 Meeting #56bis, Jan. 15-19, 2007, Sorrento, Italy, 3 pages.

(56) References Cited

OTHER PUBLICATIONS

Panasonic, "MAC PDU format for LTE," R2-070541, Agenda Item: 11.8, 3GPP TSG RAN WG2 Meeting #57, Feb. 12-16, 2007, St. Louis, USA, 3 pages.
Panasonic, "MAC PDU format for LTE," R2-071150, Agenda Item: 5.14, 3GPP TSG RAN WG2 Meeting #57bis, Mar. 26-30, 2007, St Julian's, Malta, 3 pages.
Panasonic, "MAC PDU format for LTE," R2-071781, Agenda Item: 4.13, 3GPP TSG RAN WG2 Meeting #58, May 7-11, 2007, Kobe, Japan, 3 pages.
Panasonic, "MAC PDU format for LTE," R2-072652, Agenda Item: 5.2.1, 3GPP TSG RAN WG2 Meeting #58bis, Jun. 25-29, 2007, Orlando, USA, 3 pages.
Panasonic, "MAC PDU format for LTE," R2-073273, Agenda Item: 5.2.1, 3GPP TSG RAN WG2 Meeting #59, Aug. 20-24, 2007, Athens, Greece, 2 pages.
Panasonic, "Open issues on MAC PDU format," R2-074148, Agenda Item: 5.1.1.2, 3GPP TSG RAN WG2 Meeting #59bis, Oct. 8-12, 2007, Shanghai, China, 2 pages.
English Translation of Chinese Office Action dated Jun. 29, 2021 for the related Chinese Patent Application No. 201780051288.7.
Ericsson, "Report from [95#26] Concatenation (Ericsson)," Tdoc: R2-166904, Agenda Item: 9.2.1.1, 3GPP TSG-RAN WG2 #95bis, Kaohsiung, Taiwan, Oct. 10-14, 2016, 38 pages.

* cited by examiner

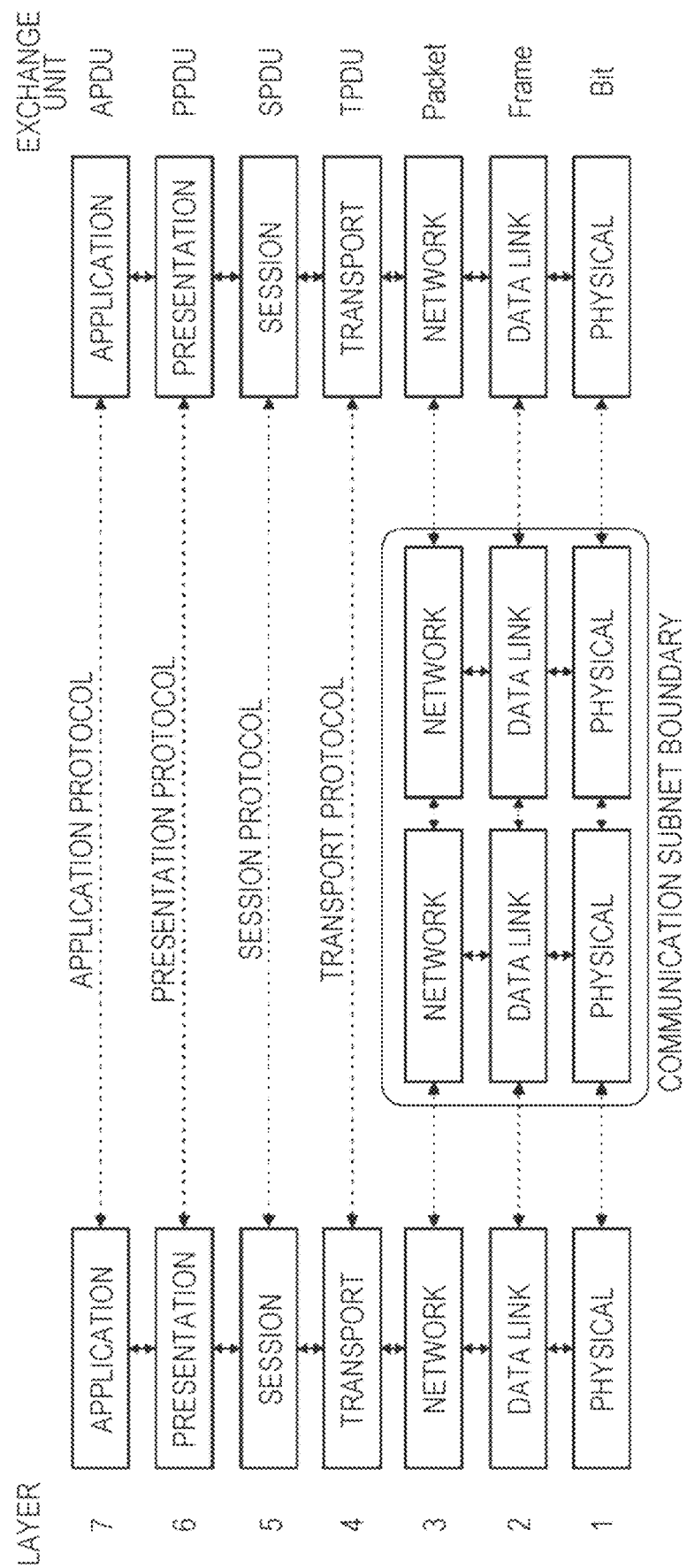

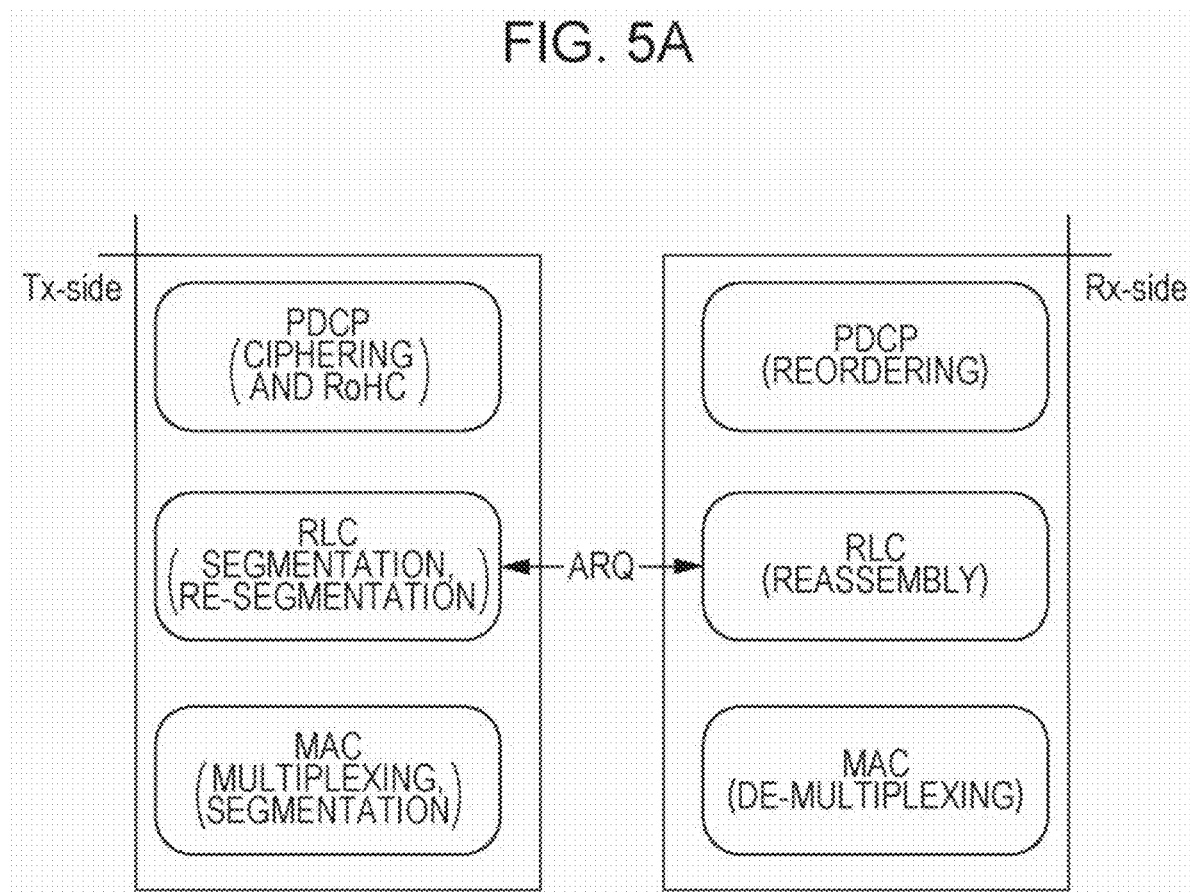

EFFICIENT MULTIPLEXING OF CONTROL INFORMATION IN TRANSPORT BLOCK

BACKGROUND

1. Technical Field

The present disclosure relates to transmission and reception processing on multiple layers in a communication system as well as to the corresponding transmission apparatuses, methods and programs.

2. Description of the Related Art

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive. In order to be prepared for further increasing user demands and to be competitive against new radio access technologies, 3GPP introduced a new mobile communication system called Long Term Evolution (LTE). LTE is designed to meet the carrier needs for high speed data and media transport as well as high capacity voice support through to the next decade. The ability to provide high bit rates is a key measure for LTE. The work item (WI) specification on Long-Term Evolution (LTE) called Evolved UMTS Terrestrial Radio Access (UTRA) and UMTS Terrestrial Radio Access Network (UTRAN) is finalized as Release 8 (Rel. 8 LTE). The LTE system represents efficient packet based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since the provision of wide area coverage was prioritized over improvement in the peak data rate considering the restricted transmission power of the user equipment (UE). Many key packet radio access techniques are employed including multiple-input multiple-output (MIMO) channel transmission techniques, and a highly efficient control signaling structure is achieved in Rel. 8 LTE.

LTE Architecture

The overall architecture is shown in FIG. 1 and a more detailed representation of the E-UTRAN architecture is given in FIG. 2. The E-UTRAN consists of eNBs, providing the E-UTRA user plane (PDCP/RLC/MAC/PHY) and control plane (RRC) protocol terminations towards the UE. The eNB hosts the Physical (PHY), Medium Access Control (MAC), Radio Link Control (RLC), and Packet data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated UL QoS, cell information broadcast, ciphering/deciphering of user and control plane data, and compression/decompression of DL/UL user plane packet headers. The eNBs are interconnected with each other by means of the X2 interface. The eNBs are also connected by means of the S1 interface to the EPC (Evolved Packet Core), more specifically to the MME (Mobility Management Entity) by means of the S1-MME and to the Serving Gateway (S-GW) by means of the S1-U. The Si interface supports a many-to-many relation between MMES/Serving Gateways and eNBs. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PDN GW). For idle state UEs, the SGW terminates the DL data path and triggers paging when DL data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedures including retransmissions. It is involved in the bearer activation/deactivation process and is also responsible for choosing the SGW for a UE at the initial attach and at time of intra-LTE handover involving Core Network (CN) node relocation. It is also responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming UEs.

The downlink component carrier of a 3GPP LTE system is subdivided in the time-frequency domain in so-called subframes. In 3GPP LTE each subframe is divided into two downlink slots, wherein the first downlink slot comprises the control channel region (PDCCH region) within the first OFDM symbols. Each subframe consists of a give number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective subcarriers.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as consecutive OFDM symbols in the time domain (e.g. 7 OFDM symbols) and consecutive subcarriers in the frequency domain (e.g. 12 subcarriers for a component carrier). In 3GPP LTE (Release 8), a physical resource block thus consists of resource elements, corresponding to one slot in the time domain and 180 kHz in the frequency domain (for further details on the downlink resource grid, see for example 3GPP TS 36.211, "Evolved Universal Terrestrial Radio Access (E-UTRA);

Physical Channels and Modulation (Release 8)", section 6.2, available at http://www.3gpp.org).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources. Similar assumptions for the component carrier structure apply to later releases too.

General Overview of the OSI Layer

FIG. 3A provides a brief overview of a layer model on which the further discussion of the LTE architecture is based.

The Open Systems Interconnection Reference Model (OSI Model or OSI Reference Model) is a layered abstract description for communication and computer network protocol design. The OSI model divides the functions of a system into a series of layers. Each layer has the property of only using the functions of the layer below, and only exporting functionality to the layer above. A system that implements protocol behavior consisting of a series of these layers is known as a 'protocol stack' or 'stack'. Its main feature is in the junction between layers which dictates the specifications on how one layer interacts with another. This means that a layer written by one manufacturer can operate with a layer from another. For the purposes of the present disclosure, only the first three layers will be described in more detail below.

The physical layer or layer 1's main purpose is the transfer of information (bits) over a specific physical medium (e.g. coaxial cables, twisted pairs, optical fibers, air interface, etc.). It converts or modulates data into signals (or symbols) that are transmitted over a communication channel.

The purpose of the data link layer (or Layer 2) is to shape the information flow in a way compatible with the specific physical layer by breaking up the input data into data frames (Segmentation And Re-assembly (SAR) functions). Furthermore, it may detect and correct potential transmission errors by requesting a retransmission of a lost frame. It typically provides an addressing mechanism and may offer flow control algorithms in order to align the data rate with the receiver capacity. If a shared medium is concurrently used by multiple transmitters and receivers, the data link layer typically offers mechanisms to regulate and control access to the physical medium.

As there are numerous functions offered by the data link layer, the data link layer is often subdivided into sublayers (e.g. RLC and MAC layers in UMTS). Typical examples of Layer 2 protocols are PPP/HDLC, ATM, frame relay for fixed line networks and RLC, LLC or MAC for wireless systems. More detailed information on the sublayers PDCP, RLC and MAC of layer 2 is given later. It is noted that in the present application the sublayers are also referred to as "layer" and thus the term "layer" employed herein does not necessarily mean a layer of the OSI model.

The network layer or Layer 3 provides the functional and procedural means for transferring variable length packets from a source to a destination via one or more networks while maintaining the quality of service requested by the transport layer. Typically, the network layer's main purposes are inter alia to perform network routing, network fragmentation and congestion control functions. The main examples of network layer protocols are the IP Internet Protocol or X.25.

With respect to Layers 4 to 7, it should be noted that depending on the application and service it is sometimes difficult to attribute an application or service to a specific layer of the OSI model since applications and services operating above Layer 3 often implement a variety of functions that are to be attributed to different layers of the OSI model. Therefore, especially in TCP(UDP)/IP based networks, Layer 4 and above is sometimes combined and forms a so-called "application layer".

Layer Services and Data Exchange

In the following, the terms service data unit (SDU) and protocol data unit (PDU) as used herein are defined in connection with FIG. 3B. In order to formally describe in a generic way the exchange of packets between layers in the OSI model, SDU and PDU entities have been introduced. An SDU is a unit of information (data/information block) transmitted from a protocol at layer N+1 that requests a service from a protocol located at layer N via a so-called service access point (SAP). A PDU is a unit of information exchanged between peer processes at the transmitter and at the receiver of the same protocol located at the same layer N.

A PDU is generally formed by a payload part consisting of the processed version of the received SDU(s) preceded by a layer N specific header and optionally terminated by a trailer. Since there is no direct physical connection (except for Layer 1) between these peer processes, a PDU is forwarded to the layer N−1 for processing. Therefore, a layer N PDU is, from a layer N−1 point of view, an SDU.

LTE User Plane (U-Plane, UP) and Control Plane (C-Plane, CP) Protocols:

The LTE layer 2 user-plane/control-plane protocol stack comprises three sublayers PDCP, RLC and MAC.

As explained before, at the transmitting side, each layer receives a SDU from a higher layer for which the layer provides a service and outputs a PDU to the layer below. The RLC layer receives packets from the PDCP layer. These packets are called PDCP PDUs from a PDCP point of view and represent RLC SDUs from an RLC point of view. The RLC layer creates packets which are provided to the layer below, i.e. the MAC layer. The packets provided by RLC to the MAC layer are RLC PDUs from an RLC point of view and MAC SDUs from a MAC point of view. At the receiving side, the process is reversed, with each layer passing SDUs up to the layer above, where they are received as PDUs.

While the physical layer essentially provides a bitpipe, protected by turbo-coding and a cyclic redundancy check (CRC), the link-layer protocols enhance the service to upper layers by increased reliability, security and integrity. In addition, the link layer is responsible for the multi-user medium access and scheduling. One of the main challenges for the LTE link-layer design is to provide the required reliability levels and delays for Internet Protocol (IP) data flows with their wide range of different services and data rates. In particular, the protocol over-head must scale. For example, it is widely assumed that voice over IP (VoIP) flows can tolerate delays on the order of 100 ms and packet losses of up to 1 percent. On the other hand, it is well-known that TCP file downloads perform better over links with low bandwidth-delay products. Consequently, downloads at very high data rates (e.g., 100 Mb/s) require even lower delays and, in addition, are more sensitive to IP packet losses than VoIP traffic.

Overall, this is achieved by the three sublayers of the LTE link layer that are partly intertwined. The Packet Data Convergence Protocol (PDCP) sublayer is responsible mainly for IP header compression and ciphering. In addition, it supports lossless mobility in case of inter-eNB handovers and provides integrity protection to higher layer-control protocols. The radio link control (RLC) sublayer comprises mainly ARQ functionality and supports data segmentation and concatenation. The latter two minimize the protocol overhead independent of the data rate. Finally, the medium access control (MAC) sublayer provides HARQ and is responsible for the functionality that is required for medium access, such as scheduling operation and random access.

In particular, The Medium Access Control (MAC) layer is the lowest sublayer in the Layer 2 architecture of the LTE radio protocol stack and is defined by e.g. the 3GPP technical standard TS 36.321, current version 13.0.0. The connection to the physical layer below is through transport channels, and the connection to the RLC layer above is through logical channels. The MAC layer therefore performs multiplexing and demultiplexing between logical channels and transport channels: the MAC layer in the transmitting side constructs MAC PDUs, known as transport blocks, from MAC SDUs received through logical channels, and the MAC layer in the receiving side recovers MAC SDUs from MAC PDUs received through transport channels.

The MAC layer provides a data transfer service (see sub-clauses 5.4 and 5.3 of TS 36.321) for the RLC layer through logical channels, which are either control logical channels which carry control data (e.g. RRC signaling) or traffic logical channels which carry user plane data. On the other hand, the data from the MAC layer is exchanged with the physical layer through transport channels, which are classified as downlink or uplink. Data is multiplexed into transport channels depending on how it is transmitted over the air. In addition to the MAC SDUs, the MAC PDUs may further comprise MAC control elements of several types and padding, if necessary.

The Physical layer is responsible for the actual transmission of data and control information via the air interface, i.e. the Physical Layer carries all information from the MAC transport channels over the air interface on the transmission side. Some of the important functions performed by the Physical layer include coding and modulation, link adaptation (AMC), power control, cell search (for initial synchronization and handover purposes) and other measurements (inside the LTE system and between systems) for the RRC layer. The Physical layer performs transmissions based on transmission parameters, such as the modulation scheme, the coding rate (i.e. the modulation and coding scheme, MCS), the number of physical resource blocks etc. More information on the functioning of the physical layer can be found in the 3GPP technical standard 36.213 current version 13.0.0.

The Radio Resource Control (RRC) layer controls communication between a UE and an eNB at the radio interface and the mobility of a UE moving across several cells. The RRC protocol also supports the transfer of NAS information. For UEs in RRC IDLE, RRC supports notification from the network of incoming calls. RRC connection control covers all procedures related to the establishment, modification and release of an RRC connection, including paging, measurement configuration and reporting, radio resource configuration, initial security activation, and establishment of Signaling Radio Bearer (SRBs) and of radio bearers carrying user data (Data Radio Bearers, DRBs).

The radio link control (RLC) sublayer comprises mainly ARQ functionality and supports data segmentation and concatenation, i.e. RLC layer performs framing of RLC SDUs to put them into the size indicated by the MAC layer. The latter two minimize the protocol overhead independently from the data rate. The RLC layer is connected to the MAC layer via logical channels. Each logical channel transports different types of traffic. The layer above RLC layer is typically the PDCP layer, but in some cases it is the RRC layer, i.e. RRC messages transmitted on the logical channels BCCH (Broadcast Control Channel), PCCH (Paging Control Channel) and CCCH (Common Control Channel) do not require security protection and thus go directly to the RLC layer, bypassing the PDCP layer.

RLC Retransmission Protocol

When the RLC is configured to request retransmission of missing PDUs, it is said to be operating in Acknowledged Mode (AM). This is similar to the corresponding mechanism used in WCDMA/HSPA. Overall, there are three operational modes for RLC: Transparent Mode (TM), Unacknowledged Mode (UM), and Acknowledged Mode (AM). Each RLC entity is configured by RRC to operate in one of these modes.

In Transparent Mode no protocol overhead is added to RLC SDUs received from higher layer. In special cases, transmission with limited segmentation/reassembly capability can be accomplished. It has to be negotiated in the radio bearer setup procedure, whether segmentation/reassembly is used. The transparent mode is e.g. used for very delay-sensitive services like speech.

In Unacknowledged Mode data delivery is not guaranteed since no retransmission protocol is used. The PDU structure includes sequence numbers for integrity observations in higher layers. Based on the RLC sequence number, the receiving UM RLC entity can perform reordering of the received RLC PDUs. Segmentation and concatenation are provided by means of header fields added to the data. The RLC entity in Unacknowledged mode is unidirectional, since there are no associations defined between uplink and downlink. If erroneous data is received, the corresponding PDUs are discarded or marked depending on the configuration. In the transmitter, the RLC SDUs which are not transmitted within a certain time specified by a timer are discarded and removed from the transmission buffer. The RLC SDUs, received from higher layer, are segmented/concatenated into RLC PDUs on sender side. On receiver side, reassembly is performed correspondingly. The unacknowledged mode is used for services where error-free delivery is of less importance compared to short delivery time, for example, for certain RRC signaling procedures, a cell broadcast service such as MBMS and voice over IP (VoIP).

In Acknowledged Mode the RLC layer supports error correction by means of an Automatic Repeat Request (ARQ) protocol, and is typically used for IP-based services such as file transfer where error-free data delivery is of primary interest. RLC retransmissions are for example based on RLC status reports, i.e. ACK/NACK, received from the peer RLC receiving entity. The acknowledged mode is designed for a reliable transport of packet data through retransmission in the presence of high air-interface bit error rates. In case of erroneous or lost PDUs, retransmission is conducted by the sender upon reception of an RLC status report from the receiver.

ARQ is used as a retransmission scheme for retransmission of erroneous or missed PDUs. For instance, by monitoring the incoming sequence numbers, the receiving RLC entity can identify missing PDUs. Then, an RLC status report can be generated at the receiving RLC side, and fed back to the transmitting RLC entity, requesting retransmission of missing or unsuccessfully decoded PDUs. The RLC status report can also be polled by the transmitter, i.e. the polling function is used by the RLC transmitter to obtain a status report from RLC receiver so as to inform the RLC transmitter of the reception buffer status. The status report provides positive acknowledgements (ACK) or negative acknowledgment information (NACK) on RLC Data PDUs or portions of them, up to the last RLC Data PDU whose HARQ reordering is complete. The RLC receiver triggers a status report if a PDU with the polling field set to '1' or when an RLC Data PDU is detected as missing. There are certain triggers defined in sub-clause 5.2.3 of TS 36.322, current version 13.0.0, which trigger a poll for an RLC status report in the RLC transmitter, transmission is only allowed for the PDUs within the transmission window, and the transmission window is only updated by the RLC status report. Therefore, if the RLC status report is delayed, the transmission window cannot be advanced and the transmission might get stuck. The receiver sends the RLC status report to the sender when triggered.

Layer 1/Layer 2 Control Signaling

In order to inform the scheduled users about their allocation status, transport format, and other transmission-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/L2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. Several PDCCHs can be transmitted in one subframe.

Generally, the information sent in the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (e.g. Resource Blocks, RBs) on which a user is allocated. Alternatively, this information is termed resource block assignment (RBA). Note, that the number of RBs on which a user is allocated can be dynamic;

Carrier indicator, which is used if a control channel transmitted on a first carrier assigns resources that concern a second carrier, i.e. resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields as mentioned above. The different DCI formats that are currently defined for LTE are as follows and described in detail in 3GPP TS 36.212, "Multiplexing and channel coding", section 5.3.3.1 (current version v13.0.0 available at http://www.3gpp.org and). For instance, the following DCI Formats can be used to carry a resource grant for the uplink.

Format 0: DCI Format 0 is used for the transmission of resource grants for the PUSCH, using single-antenna port transmissions in uplink transmission mode 1 or 2.

Format 4: DCI format 4 is used for the scheduling of the PUSCH, using closed-loop spatial multiplexing transmissions in uplink transmission mode 2.

Uplink Access Scheme for LTE

The uplink scheme allows for both scheduled access, i.e. controlled by eNB, and contention-based access.

In case of scheduled access, the UE is allocated a certain frequency resource for a certain time (i.e. a time/frequency resource) for uplink data transmission. However, some time/frequency resources can be allocated for contention-based access. Within these time/frequency resources, UEs can transmit without first being scheduled. One scenario where UE is making a contention-based access is for example the random access, i.e. when UE is performing initial access to a cell or for requesting uplink resources.

For the scheduled access, the Node B scheduler assigns a user a unique frequency/time resource for uplink data transmission. More specifically the scheduler determines which UE(s) is (are) allowed to transmit, in which physical channel resources (frequency), and the corresponding transport format to be used by the mobile terminal for the transmission.

The allocation information is signaled to the UE via the scheduling grant, sent on the L1/L2 control channel. The scheduling grant message contains information which part of the frequency band the UE is allowed to use, the validity period of the grant, and the transport format the UE has to use for the upcoming uplink transmission. The shortest validity period is one sub-frame. Additional information may also be included in the grant message, depending on the selected scheme. Only "per UE" grants are used to grant the right to transmit on the UL-SCH (i.e. there are no "per UE per RB" grants). Therefore, the UE needs to distribute the allocated resources among the radio bearers according to some rules. Unlike in HSUPA, there is no UE based transport format selection. The eNB decides the transport format based on some information, e.g. channel quality feedback, reported scheduling information and QoS info, and the UE has to follow the selected transport format.

The usual mode of scheduling is dynamic scheduling, by means of downlink assignment messages for the allocation of downlink transmission resources and uplink grant messages for the allocation of uplink transmission resources; these are usually valid for specific single subframes. They are transmitted on the PDCCH using the C-RNTI of the UE. Dynamic scheduling is efficient for services types in which the traffic is bursty and dynamic in rate, such as TCP.

In addition to the dynamic scheduling, a persistent scheduling is defined, which enables radio resources to be semi-statically configured and allocated to a UE for a longer time period than one subframe, thus avoiding the need for specific downlink assignment messages or uplink grant messages over the PDCCH for each subframe. Persistent scheduling is useful for services such as VoIP for which the data packets are small, periodic and semi-static in size. Thus, the overhead of the PDCCH is significantly reduced compared to the case of dynamic scheduling.

Logical Channel Prioritization, LCP, Procedure

For the uplink the process by which a UE creates a MAC PDU to transmit using the allocated radio resources is fully standardized; this is designed to ensure that the UE satisfies the QoS of each configured radio bearer in a way which is optimal and consistent between different UE implementations. Based on the uplink transmission resource grant message signaled on the PDCCH, the UE has to decide on the amount of data for each logical channel to be included in the new MAC and, if necessary, also to allocate space for a MAC Control Element.

In constructing a MAC PDU with data from multiple logical channels, the simplest and most intuitive method is the absolute priority-based method, where the MAC PDU space is allocated to logical channels in decreasing order of logical channel priority. This is, data from the highest priority logical channel are served first in the MAC PDU, followed by data from the next highest priority logical channel, continuing until the MAC PDU space runs out. Although the absolute priority-based method is quite simple in terms of UE implementation, it sometimes leads to starvation of data from low-priority logical channels. Starvation means that the data from the low-priority logical channels cannot be transmitted because the data from high-priority logical channels take up all the MAC PDU space.

In LTE, a Prioritized Bit Rate (PBR) is defined for each logical channel, in order to transmit data in order of importance but also to avoid starvation of data with lower priority. The PBR is the minimum data rate guaranteed for the logical channel. Even if the logical channel has low priority, at least a small amount of MAC PDU space is allocated to guarantee the PBR. Thus, the starvation problem can be avoided by using the PBR.

Constructing a MAC PDU with PBR consists of two rounds. In the first round, each logical channel is served in decreasing order of logical channel priority, but the amount of data from each logical channel included in the MAC PDU is initially limited to the amount corresponding to the configured PBR value of the logical channel. After all logical channels have been served up to their PBR values, if there is room left in the MAC PDU, the second round is performed. In the second round, each logical channel is served again in decreasing order of priority. The major difference for the second round compared to the first round is that each logical channel of lower priority can be allocated with MAC PDU space only if all logical channels of higher priority have no more data to transmit.

A MAC PDU may include not only the MAC SDUs from each configured logical channel but also a MAC CE. Except for a Padding BSR, the MAC CE has a higher priority than a MAC SDU from the logical channels because it controls the operation of the MAC layer. Thus, when a MAC PDU is composed, the MAC CE, if it exists, is the first to be included, and the remaining space is used for MAC SDUs from the logical channels. Then, if additional space is left and it is large enough to include a BSR, a Padding BSR is triggered and included in the MAC PDU.

The Logical Channel Prioritization is standardized e.g. in 3GPP TS 36.321 (version v12.4.0) in sub-clause 5.4.3.1. It is up to the UE implementation to decide in which MAC PDU a MAC control element is included when the UE is requested to transmit multiple MAC PDUs in one TTI.

Buffer Status Reporting

Buffer status reports (BSR) from the UE to the eNodeB are used to assist the eNodeB in allocating uplink resources, i.e. uplink scheduling. For the downlink case, the eNB scheduler is obviously aware of the amount of data to be delivered to each UE; however, for the uplink direction, since scheduling decisions are done at the eNB and the buffer for the data is in the UE, BSRs have to be sent from the UE to the eNB in order to indicate the amount of data that needs to be transmitted over the UL-SCH.

Buffer Status Report MAC control elements for LTE consist of either: a long BSR (with four buffer size fields corresponding to LCG IDs #0-3) or a short BSR (with one LCG ID field and one corresponding buffer size field). The buffer size field indicates the total amount of data available across all logical channels of a logical channel group, and is indicated in number of bytes encoded as an index of different buffer size levels (see also 3GPP TS 36.321 v 12.4.0 Chapter 6.1.3.1).

Which one of either the short or the long BSR is transmitted by the UE depends on the available transmission resources in a transport block, on how many groups of logical channels have non-empty buffers and on whether a specific event is triggered at the UE. The long BSR reports the amount of data for four logical channel groups, whereas the short BSR indicates the amount of data buffered for only the highest logical channel group.

The reason for introducing the logical channel group concept is that even though the UE may have more than four logical channels configured, reporting the buffer status for each individual logical channel would cause too much signaling overhead. Therefore, the eNB assigns each logical channel to a logical channel group; preferably, logical channels with same/similar QoS requirements should be allocated within the same logical channel group.

If the UE has no uplink resources allocated for including a BSR in the transport block when a BSR is triggered, the UE sends a scheduling request (SR) to the eNodeB so as to be allocated with uplink resources to transmit the BSR. Either a single-bit scheduling request is sent over the Physical Uplink Control Channel (PUCCH) (dedicated scheduling request, D-SR), or the random access procedure (RACH) is performed to request an allocation of an uplink radio resource for sending a BSR.

Other MAC Control Elements

MAC Control elements are used for MAC level peer-to-peer signaling.

There are further MAC control elements defined in the LTE. These MAC control elements may relate to either uplink or downlink transmission.

Power Headroom Report (PHR) MAC control elements are used by the UE to report available power Headroom and used then at the base station to determine how much more uplink bandwidth per subframe a UE is capable of using. These elements are provided in the uplink to the scheduling node (eNB) in order to enable it to schedule the uplink transmission resources to different UEs and avoid that resources are allocated to a UE which is not capable of using them due to its power limitations. Currently, the PHR can only be sent in subframes in which a UE has an uplink transmission grant, i.e. with uplink data transmission.

Activation/Deactivation MAC control elements are used for the activation/deactivation of SCells, i.e. secondary serving cells providing additional resources to the resources of the primary serving cell. To enable reasonable UE battery consumption when carrier aggregation is configured, the activation/deactivation mechanism of SCells is supported. If the UE is configured with one or more SCells, the eNodeB may activate and deactivate the configured SCells. Activation/Deactivation does not apply to PCell. The MAC CE carries a bitmap for the activation and deactivation of SCells: set to 1 denotes activation of the corresponding SCell, while a bit set to 0 denotes deactivation. With the bitmap, SCells can be activated and deactivated individually, and a single activation/deactivation command can activate/deactivate a subset of the SCells.

Cell Radio Network Temporary Identifier (C-RNTI) MAC control elements control elements enable the UE to transmit its own C-RNTI during a random access procedure for the purpose of contention resolution.

UE Contention Resolution Identity MAC Control Elements are used by the eNodeB to transmit the uplink CCCH (Common Control Channel) is due that the UE has sent in during the random access procedure for the purpose of contention resolution when the UE has no C-RNTI.

DRX command MAC control element is used by the eNodeB to transmit the downlink PRX command to the UEs.

Timing advance command MAC control element is used by the eNodeB to transmit timing advance command is to the UE's for uplink timing alignment.

MBMS dynamic scheduling information MAC control element is transmitted for each MCH to inform MBMS-capable UEs about scheduling of data transmissions on MTCH.

For more information on the MAC control elements listed above, see 3GPP TS 36.321, V13.3.0 section 6.1.3. For each type of MAC control element, one special LCID is allocated.

L1/L2 Processing

FIG. 4 exemplary depicts the data flow of an IP packet through the link-layer protocols down to the physical layer. The figure shows that each protocol sublayer adds its own protocol header to the data units as well as the mapping of the transport block on a subframe. Transport block (TB) denotes the MAC PDU which is mapped onto the physical layer.

The mapping of the transport block onto the subframe in LTE is performed within a so-called transmission time interval (TTI). Generally a single transport block is mapped in one TTI to one subframe in case of single input single output (SISO), i.e. transmitter and receiver operating with one antenna. In case of MIMO/MISO (multiple input multiple output/multiple input single output), two codewords corresponding to two transport blocks may be mapped in one TTI to the physical resources. In general, more than two transport blocks may be considered for mapping.

The LTE L2 functions are summarized in the following table:

TABLE 1

Table 1: LTE L2 functions (Tx side)

| UP Protocol layer | Functions |
| --- | --- |
| PDCP | Bearer mapping (EPS bearer-> radio bearer) |
| | Sequence numbering |
| | Header compression |
| | Security |
| | Routing |
| RLC | Sequence numbering |
| | Segmentation |
| | Concatenation |
| | ARQ |
| MAC | Scheduling |
| | Multiplexing |
| | HARQ |

In LTE, the RLC layer performs concatenation/segmentation of PDCP PDUs.

When the transmitter knows the transport block (TB) size, the MAC layer performs logical channel prioritization (LCP) to determine how much data each RLC-entity should transmit (provide to the lower layers, i.e. to the MAC/PHY). Each RLC entity provides one RLC PDU containing one or more RLC SDUs. For each RLC SDU ending in the RLC PDU, a corresponding L-field (length field) is added, which enables the receiver to extract the corresponding SDUs. If the last contained RLC SDU does not fit entirely into the RLC PDU, it is segmented, i.e., the remainder of the RLC SDU will be sent in the subsequent RLC PDU(s). Whether the first (last) byte of the RLC PDU corresponds to the first (last) byte of the RLC SDU is indicated by the "Framing Info" flags (2 bit) located in the RLC header. Other than that, segmentation does not any additional overhead. In order to re-establish the original order of the data and to detect losses, the RLC sequence number (SN) is added to the RLC PDU header.

MAC multiplexes the RLC PDUs for different logical channel identifiers (LCIDs) and adds a corresponding subheader with the LCD and the L-field. A high level illustration of the transport block structure is illustrated in FIG. 4. Recently, the 3GPP has started to study and work on the 5$^{th}$ generation system under the name new radio (NR). NR targets very high data rates (currently up to 20 Gbit/sec in downlink and 10 Gbit/sec in uplink).

SUMMARY

As NR is targeting for very high data rates, the processing time available for both transmitter and receiver might be very limited compared with the amount of data to be transmitted. One example to minimize transmitter processing time is to minimize the needed real-time processing. For instance, in the LTE, a PDCP PDU can be generated once a PDCP SDU (i.e. an IP packet) is available, i.e. PDCP PDU generation can be done in a non-real-time manner, i.e. irrespectively of whether or not there are currently resources granted for the PDCP PDU. However RLC and MAC PDUs can only be generated in real-time manner (i.e. after reception of the UL grant). Segmentation, concatenation and multiplexing are required for DL/UL data SDUs to fit within the total size of assigned TB size determined by scheduler. Concatenation and segmentation requires knowledge of the scheduling decision/grant size before it can be performed so it is subject to strict real time processing requirements. This also implies that the transmitter cannot do any pre-processing for either the RLC or the MAC layer, e.g., of subheaders/headers before the scheduling/grant information. The inability to perform "pre-processing" incurs a processing delay upon grant reception. If the RLC and to some extent MAC processing could be completed beforehand (the grant reception), then the delay in MAC TB submission to PHY layer would be, comparatively, much smaller.

Furthermore, the MAC PDU format used in LTE does not allow an early start of encoding before the TB generation has been finalized. In LTE, MAC PDU is an iterative process since the size of the control information (header) depends e.g. on the number of SDUs in that PDU. This iterative process takes time until the transmission of the MAC PDU may start. Since MAC control elements (MAC CEs i.e. BSR, PHR) are added at the beginning of MAC PDU (TB) which needs to be computed before starting the transmission of the MAC PDU towards PHY. Computation of BSR can be only done based on the outcome of LCP whereas the calculation of PHR depends upon inputting this value to MAC. Hence, pre-computing of MAC header is not possible and MAC PDU cannot be forwarded to PHY until the complete MAC PDU is constructed. Therefore, if MAC control elements are placed before any MAC SDU, like in LTE, the MAC layer can only deliver available MAC SDUs to the PHY after the MAC control elements have been computed. For example, the computation of a BSR can only be done after LCP has been completed. Also, power headroom calculation may take some time and dependent on PHY signals, for example the information whether PUCCH is transmitted or not.

One non-limiting and exemplary embodiment provides an approach improving the efficiency of the layer processing.

This is achieved by the features of the independent claims.

Advantageous embodiments are subject matter of the dependent claims.

In an embodiment, the techniques disclosed here feature a data transmitting node that is provided for transmitting data over a wireless channel to a data receiving node in a communication system, comprises: second-layer processing circuitry for receiving, from a third layer, at least one second-layer service data unit, SDU, to be mapped onto a resource allocated for data transmission, and for generating a second-layer protocol data unit, PDU, including said at least one second-layer SDU and at least one second-layer control element, the at least one second-layer control element placed after any of the at least one second-layer SDU, first-layer processing circuitry for receiving the second-layer PDU generated by the second-layer processing circuitry and mapping the second-layer PDU onto the resource allocated for data transmission.

Moreover, a computer readable medium is provided for storing therein instructions, which when executed on a computer, cause the computer to perform the steps of the above methods.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

In the following exemplary embodiments are described in more detail with reference to the attached figures and drawings.

FIG. 3A illustrates the OSI model with the different layers for communication;

FIG. 5A is a schematic drawing illustrating processing of data by different layers of the radio access network in LTE user plane;

FIG. 11A is a schematic drawing illustrating a structure of an RLC status report;

FIG. 11B is a schematic drawing showing an exemplary structure of a status report that conveys PDCP sequence number;

DETAILED DESCRIPTION

Figure 1:
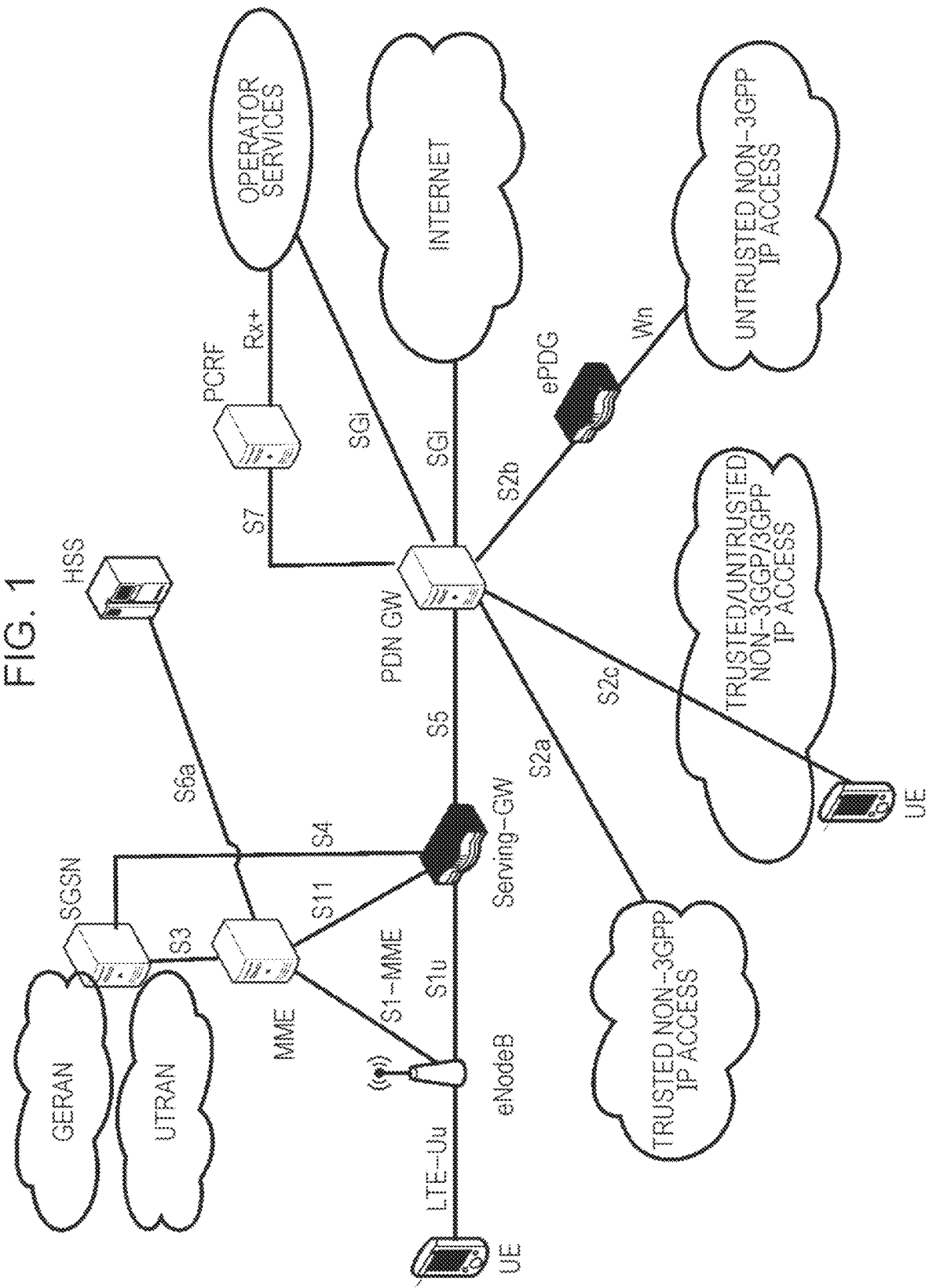
FIG. 1 shows an exemplary architecture of a 3GPP LTE system.
Figure 2:
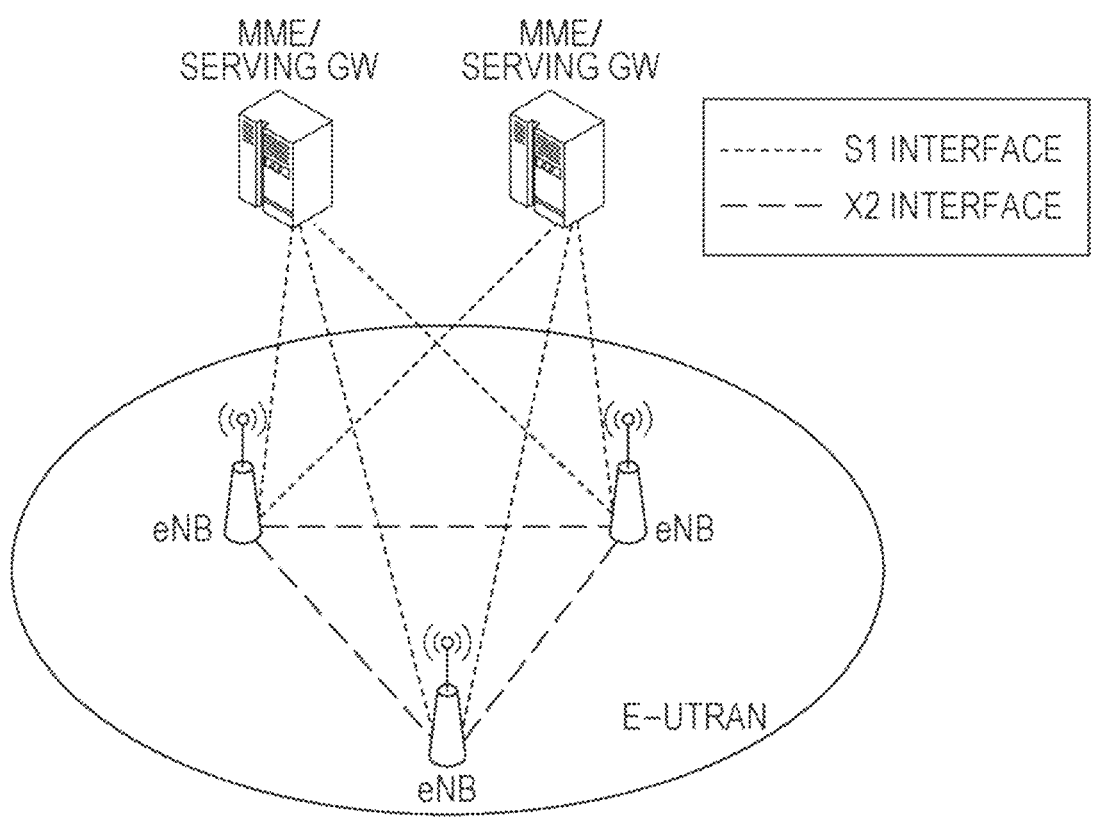
FIG. 2 shows an exemplary overview of the overall E-UTRAN architecture of 3GPP LTE.
Figure 3B:
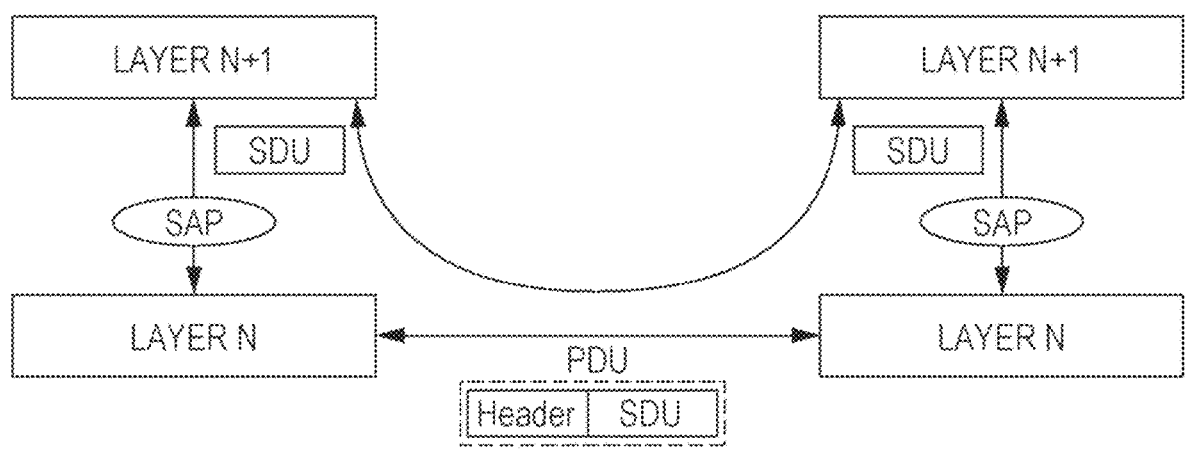
FIG. 3B illustrates the relationship of a protocol data unit (PDU) and a service data unit (SDU) as well as the inter-layer exchange of same.
Figure 4:
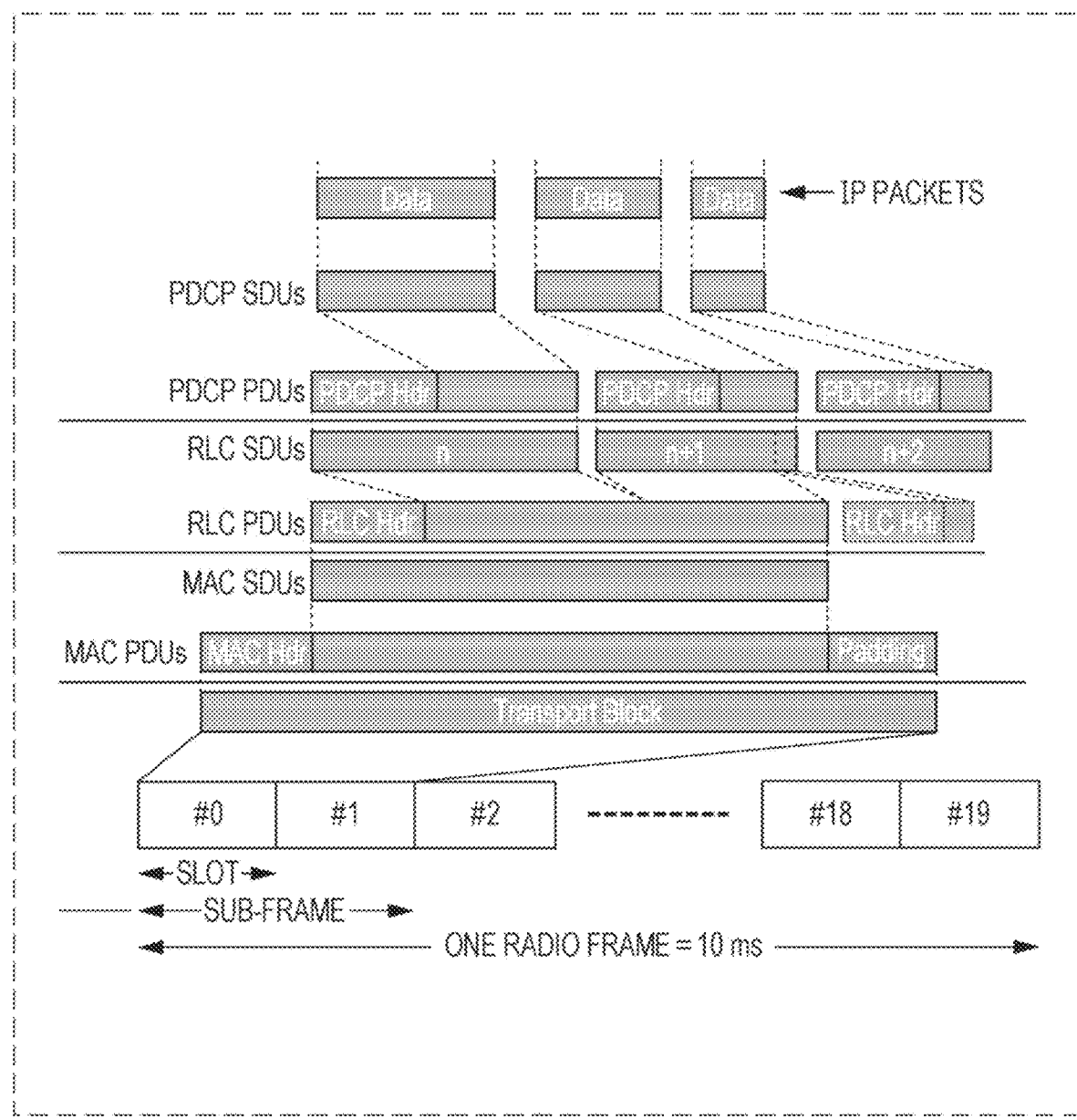
FIG. 4 gives an overview of the different functions in the PDCP, RLC and MAC layers as well as illustrates exemplary the processing of SDUs/PDUs by the various layers.

A mobile station or mobile node or user terminal or user equipment (UE) is a physical entity within a communication network. One node may have several functional entities. A functional entity refers to a software or hardware module that implements and/or offers a predetermined set of functions to other functional entities of a node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The terms "radio resources" as used in the set of claims and in the application is to be broadly understood as referring to physical radio resources, such as time-frequency radio resources.

The following exemplary embodiments provide an improved radio interface layer processing for the new radio technology envisioned for the 5G mobile communication systems. As yet, very few details have been agreed on with regard to the 5G mobile communication system, such that many assumptions have to be made in the following in order to be able to explain the principles underlying the embodiments. These assumptions are however to be understood as merely examples that should not limit the scope of the disclosure. A skilled person will be aware that the principles of the present disclosure as laid out in the claims can be applied to different scenarios and in ways that are not explicitly described herein. For example, the new radio technology will be evolving from the radio technology already defined for LTE(-A), although several changes can be expected so as to meet the requirements for 5G mobile communication systems. Consequently, particular exemplary implementations of the various embodiments could still reuse procedures, messages, functions etc. already defined for the LTE(-A) communication systems (according to Release 10/11/12/13/14 etc.) as long as they are equally applicable to both the new radio technology for 5G communication systems and to the various implementations as explained for the following embodiments.

According to the present disclosure, the concatenation/segmentation functionality is moved from the RLC layer to the MAC entity. This approach provides some advantages, for instance, the RLC PDUs and partly the MAC PDUs can be pre-constructed at the terminal (if the transmission is performed in the uplink), before an UL grant is received. This reduces processing time through pre-constructing the respective RLC PDU and partly MAC PDU. The RLC layer does not have to wait for MAC scheduling decision and the RLC PDU size indication (both carried with resource allocation by L1/L2 signaling). This reduces the processing time in generating the transport block.

FIG. 5A shows the main functions of protocol layers on the transmitter (TX) and the receiver (RX) sides. As can be seen, at the transmitter side, the segmentation is performed in MAC layer, in cooperation of the RLC layer.

Figure 5B:
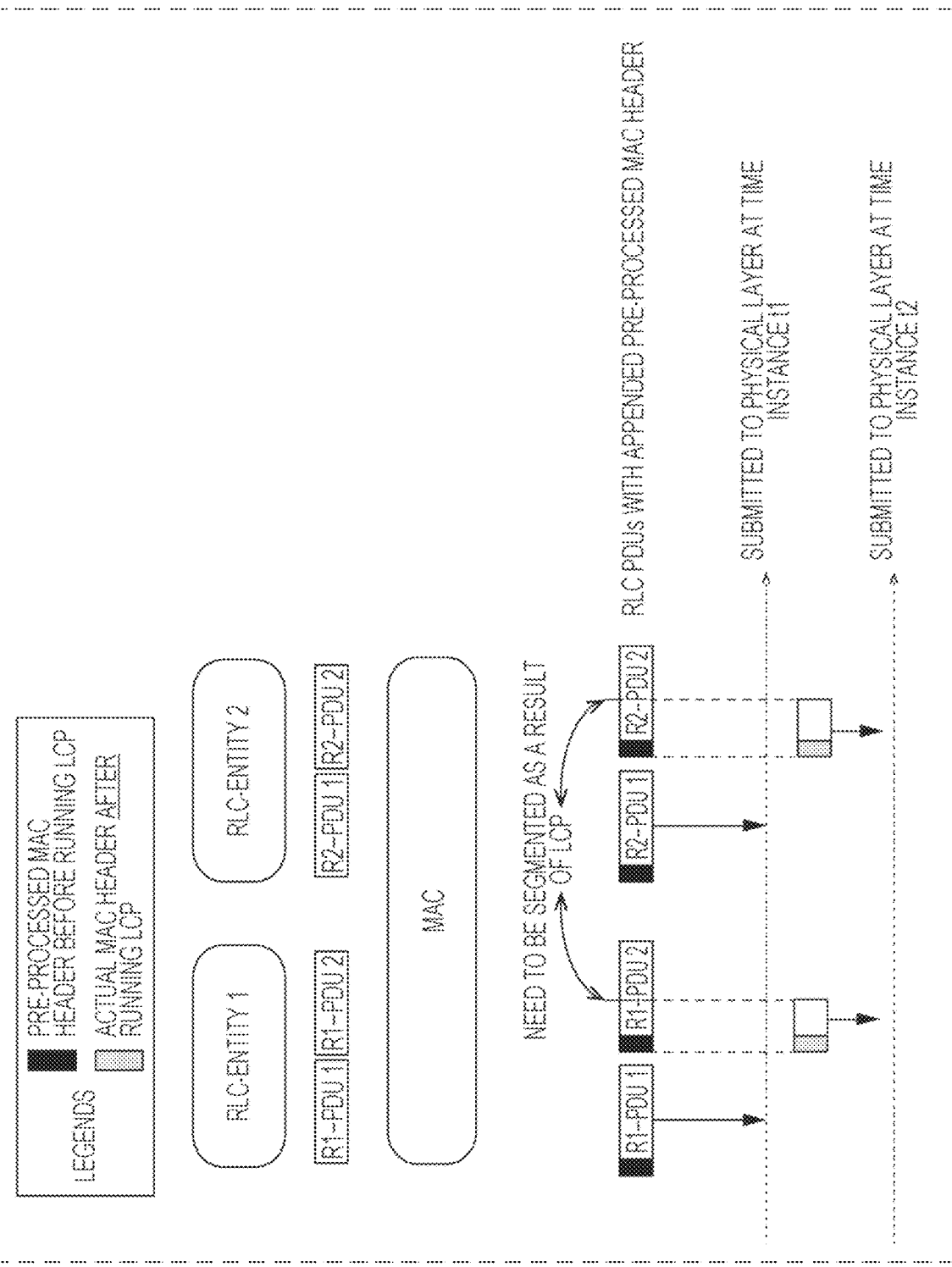
FIG. 5B is a schematic drawing illustrating pre-processing of MAC-PDUs and their mapping onto physical resources by modifying the preprocessed headers.

FIG. 5B illustrates basic operation performed on the transmitter side:

a) The RLC and/or MAC PDUs are pre-processed on a per PDCP PDU basis, i.e. the RLC layer does not concatenate the PDCP PDUs. However, the RLC layer may further segment the RLC SDU (PDCP PDU), which is illustrated by two results of a PDCP PDU segmenting, namely R1-PDU1 and R2-PDU2. Pre-processing could be based on a "minimal (or alternatively, an average) grant size" which is statistically available, with certain high confidence level, in a given radio condition (e.g. RSSI/RSRP etc.). So, a pseudo LCP (since it works with estimated grant sizes) is run on this minimal or an average grant size and the RLC and MAC PDUs are pre-processed accordingly. When the (real) grant is received and the LCP has been run in the MAC layer, some of the pre-processed RLC PDUs, which can be accommodated in the granted resources (i.e. size of the corresponding MAC PDU is smaller or equal to the grant size for the corresponding LCID) based on the result of the LCP, will be submitted to the physical layer. The physical layer may initiate its processing on these immediately, i.e. in the time instance t1. In FIG. 5B, the pre-segmented R1-PDU1 and R2-PDU1 which have appended the pre-processed MAC header can be accommodated in the granted resources.

b) The pre-segmented R1-PDU2 and R2-PDU2 cannot be accommodated in as whole to the grated resources and thus, further segmentation of these PDUs is necessary with the knowledge of the allocation size and after the LCP has been performed. In other words, the remaining grant (after the above step) would require the pre-processed PDUs to be segmented and their corresponding headers need to be recomputed. The segmentation can be done in the MAC layer (on the RLC PDUs which were already pre-processed and submitted to it) or in the RLC layer (RLC re-computing the header after the segmentation based on result of LCP). After this L2 processing, the resulting part(s) (segments) of the MAC PDU are submitted to the physical layer. The physical layer may initiate its processing on these subsequently (i.e. at the time instance t2).

In FIG. 5B, the two different RLC entities belong to different logical channels. Accordingly, MAC also decides, based on logical channel prioritization procedure (LCP), which of the corresponding MAC PDUs are to be provided to the physical layer at which time point. One example of a LCP procedure is known from the LTE and referred to above in the background section. Nevertheless, the present disclosure is not limited thereto and in general.

At the receiver side, after physical layer processing, the corresponding reverse steps are performed:

a) The MAC layer performs the de-multiplexing on the basis of the MAC header (basically the LCID field and the Length field) and gives the resulting MAC SDU(s) to the RLC. When the MAC layer passes the MAC SDU to the RLC layer, it also keeps segmentation/concatenation header field since segmentation and concatenation are done by MAC and re-ordering and re-assembly of segments are performed by RLC. This is the reason why MAC passes segmentation header filed to RLC. In other words, the MAC layer passes it to the RLC not only MAC SDU, but also a part of the MAC header related to segmentation/concatenation.

b) The RLC layer reassembles the RLC PDU segments (if any) before forwarding the complete RLC SDU(s) to PDCP. Submission of complete RLC SDUs to PDCP is done also out of order, i.e. including "holes" at the place where a segment is missing for instance because it has not been correctly received within a predefined time or a predefined number of retransmissions. However, the RLC needs to keep track of the missing PDU(s) and PDU segment(s). The ARQ runs at RLC, so that any missing RLC PDU and/or PDU segment shall be reported to the TX side for a possible re-transmission. Here, the ARQ shall try to retrieve the missing RLC PDU and/or PDU segment until upon the expiry of a timer, Timer 1. Timer 1 is started when a hole first appears (or when the subsequent/next RLC SDU is delivered to the PDCP layer). Upon expiry of Timer 1, RLC shall inform the PDCP layer as well as RRC. The RRC might take further actions like triggering a Radio Link Failure (RLF) procedure. In general, end-to-end protocols of higher layers like TCP may still take care of correct delivery.

c) The PDCP layer shall decipher the incoming PDUs received from RLC on the basis of PDCP SN (or COUNT, if available directly from the header; else, it needs to estimate/calculate COUNT from the SN included in the PDCP header). Calculation of COUNT will be done by adjusting the last COUNT value with the difference between the last PDCP SN and the PDCP SN value in the just received PDCP PDU header. Here, the "last" refers to the previous PDCP PDU that was successfully deciphered. In addition, PDCP shall wait for the "hole(s)" to arrive from RLC. However, if the indication from RLC (upon Timer 1 expiry) comes before the corresponding PDCP PDU is received, the PDCP SDUs are submitted to the upper layers (including holes).

The above approach is applicable not only to the AM, but also to UM. In the case that UM is applied, there are no retransmissions on the RLC layer. Nevertheless, at the receiver side, if a RLC PDU or a RLC PDU segment is missing, the RLC SDU is still assembled and provided to the PDCP layer.

In the AM, when the RLC Status Report indicates that a RLC PDU and/or PDU segment is missing, the TX side RLC submits the corresponding missing RLC PDU and/or PDU segment to the MAC layer including a suitable header to assist the receiver in reassembly of the segment(s) by retransmitting it.

Alternatively, the RLC layer may submit the whole RLC PDU to the MAC layer, even if just a segment of the corresponding RLC PDU was indicated as missing; in addition, the RLC layer shares the Status Report details (i.e. the entire status report) with the MAC layer. An advantage of this approach is to reduce RLC header overhead. If the re-segmentation is done in the RLC layer, then the RLC layer adds segmentation header fields which increases header overhead. To overcome this problem, the complete RLC PDU is sent to MAC and MAC performs segmentation based the on status report. The status report of RLC is understood by MAC since universal (common) sequence number is being used between the layers (PDCP, RLC, MAC). In this case, the MAC layer performs the re-segmentation based on this knowledge and the result of the LCP, and includes a suitable header to assist the receiver in reassembly of the segment(s).

It is noted that the above description refers to the "MAC", "RLC" and "PDCP", which are terms employed in the UMTS/LTE(-A) standards. However, the present disclosure is not limited to these standards, or to their advancements and may work irrespectively of the used terminology.

In other words, the framework may be seen as a protocol stack in which there a first layer responsible for mapping/de-mapping of the data onto/from the physical resources (corresponding to the physical layer), a second layer (corresponding to MAC) and a third layer (corresponding to RLC and/or PDCP). It is noted that the terms "first layer", "second layer" and "third layer" here do not necessarily correspond to the OSI model layers.

The reduction of protocol stack processing latency can be achieved in a transmitter side with a first, physical, layer; a second layer; and a third layer in that the second layer receives from the third layer pre-processed third layer PDUs (generated by the third layer without knowledge of the resource allocation) and receives (from the receiver in uplink or internally in downlink) resource allocation for the physical layer. The pre-processed third layer PDUs may be added (already at the third layer or at the second layer) a header including segmentation information. It is noted that such pre-processed third layer PDUs may be provided for a plurality of third layer entities, corresponding to a plurality of logical channels which may have different priorities. Accordingly, the second layer then may perform a prioritization procedure. Based on the received resource allocation and possibly also based on the result of prioritization procedure, the second layer then provides the first layer with the suitable preprocessed third layer PDUs including the segmentation information as the second layer header at a first time point t1 and possibly performs further segmentation of the pre-processed PDUs and modifies the segmentation information in the header accordingly before providing the data to the first layer at a time point t2 later than the time point t1.

It is noted that the third layer PDUs received at the second layer may be already pre-segmented according to ARQ status report if the third layer implements ARQ. But this approach is also applicable if the third layer does not implement ARQ. The pre-segmentation may then be done based on some statistic measures of past allocations or according to another rule or does not have to be performed at all.

Moreover, the present disclosure may also be advantageously applied to double or multi-connectivity. Multi-Connectivity is a mode of operation whereby a multiple Rx/Tx UE in the connected mode is configured to utilize radio resources amongst E-UTRA and NR provided by multiple distinct schedulers connected via a non-ideal backhaul. In other words, with multiple connectivity a layer above the third layer in the transmitter (such as a terminal) provides the same packet (IP or PDCP) to be transmitted to multiple base stations (eNBs). The two or more base stations then receive the same packet independently, thus increasing the probability of correct reception by the network.

The concept of multi-connectivity is somewhat similar to the dual connectivity which is one promising solution under discussion in 3GPP RAN working groups is the so-called "dual connectivity" concept. The term "dual connectivity" is used to refer to an operation where a given UE consumes radio resources provided by at least two different network nodes connected with non-ideal backhaul. Essentially, a UE is connected with both macro cell (macro eNB) and small cell (secondary eNB). Furthermore, each eNB involved in dual connectivity for a UE may assume different roles. Those roles do not necessarily depend on the eNB's power class and can vary among UEs. However, unlike dual connectivity, where different data are sent from a UE to different eNBs, in multi-connectivity, the same IP/PDCP packet is transmitted over a plurality of links/cells. Among the multiple receiving eNBs, one is functioning as a master eNB, which implements the layer that performs the reassembly of the segments received via multiple connections. The master eNB communicates with the other eNBs.

For instance, speaking in terms of LTE, the PDCP layer takes over the reassembly function in addition to other functions that it is already performing upon switching from single to multi connectivity. The ARQ may still run at the RLC layer (in the AM) and in this case the PDCP layer will need to share the missing (fully or partially) PDCP SN details with the RLC layer. The PDCP layer will inform the RLC layer about missing part of segments. Afterwards, the receiving entity of the RLC layer will send status report to transmitting entity of the RLC layer. Therefore, a separate ARQ in RLC and PDCP layer is not required, which means single connectivity and multi-connectivity, ARQ may both run in RLC layer. Alternatively, the PDCP layer can compose its own Status Report and send it to the TX-PDCP entity. The Status Report shall contain information on the missing PDCP PDUs and/or PDU segments.

In order to enable the latency reduction and/or overhead reduction as described above, the present disclosure provides an efficient layer model to be implemented at the transmitter and the receiver side. This includes one or more of the following:

Moving the segmentation into the second layer, i.e. as close as possible to the physical layer which must perform the real-time processing since it maps the data onto the physical resources (from the third layer). This provides the possibility of preparing data for transmission over a shared channel even before the corresponding grant is received. (The terminal implementation may make a use of this possibility or not. In other words, whether or not the terminal timing makes use of pre-processed PDUs may be left to the implementation).

Employing common control information accessed by multiple layers. Usually, the layer model assumes that each layer only accesses control information generated on that layer: This leads sometimes to overlapping duplicated control information being provided in several layers, i.e. headers of the different layers' PDU's. This may be the case for the sequence number which enables reordering of the received data. A common sequence number may be used for more than one layer (such as PDCP and RLC) which reduces header overhead.

A higher layer (such as third layer or more particular RLC or PDCP) supports ARQ functionality. Therefore, based on the third-layer status report, the third layer performs the segmentation of PDUs. Here it is assumed that the segmentation of the third layer PDU based on the status report may differ from the segmentation performed on the basis of the received allocation performed in the lower layer (second layer or more particularly MAC). Similar advantage may be achieved if the third layer provides the second layer with the segmenting information based on the status report and only the second layer performs the segmentation based on both the allocation and the status report. This approach enables saving both time (thanks to pre-processing) and resources (re-segmentation enables only retransmitting the missing segments).

Layer 2 Segmentation, Layer 3 Pre-Segmentation for ARQ

In accordance with an embodiment, a data transmitting node is provided for transmitting data over a wireless interface in a communication system to a data receiving node. In order to implement the functionality of protocol stack layer model, the data transmitting node comprises a third layer processing unit (hereinafter "a processing unit" can be replaced as "processing circuitry") for performing or not an ARQ retransmission according to a status report fed back from the data receiving node and for re-segmenting or not data to be retransmitted (if any) based on segment length information included in the status report. The re-segmentation includes adding to the segmented data segmentation control information, for instance as a header. This header is also advantageously interpreted and used in a second layer, provided to the second layer together with the third layer data unit. In this embodiment it is assumed that the retransmission protocol is handled by the third layer, which does not exclude application of independent ARQ/HARQ protocols in other layers below or above the third layer.

The data transmitting node further comprises a second layer processing unit for receiving, from the third layer processing unit, a third layer data unit, segmenting the third layer data unit based on a resource allocation and forming a plurality of second layer data units including the respective segments of the third layer data unit and the segmentation control information which is modified if re-segmentation is to be applied. The resource allocation may be either received from the data receiving node or generated at the data transmitting node. For instance, if the transmitting node is terminal (UE), the resource allocation (uplink grant) may be received from a base station, i.e. from the data receiving node. On the other hand, if the transmitting node is a base station, the resource allocation for the transmission may be generated at the base station, and provided to the MAC layer. However, the present disclosure is also applicable to direct communication between terminals or between relays and terminals or relays and base stations.

Finally, the data transmitting node comprises a first layer processing unit for receiving from the second layer one or more of the plurality of second layer data units and mapping the one or more of the plurality of the second layer data units onto the resources allocated for data transmission.

It is noted that the data transmitting node may further comprise a fourth layer processing unit for providing sequence number within its header. The sequence number is increased for each new fourth layer SDU, i.e. with each IP packet, the increasing may be cyclical while the sequence number has a predefined maximum value. The third layer advantageously does not provide another sequence number but encapsulates the fourth layer processing unit including the sequence number provided by the PDCP layer.

In terms of LTE terminology, the first layer may be the physical layer, the second layer may be the MAC layer and the third layer may be the RLC layer, whereas the fourth layer may be the PDCP. However, it is noted that the third layer may also be considered to be the PDCP layer in some embodiments or one combined layer with functions of both RLC and PDCP especially in case of architectures evolving based from the present LTE.

Figure 6:
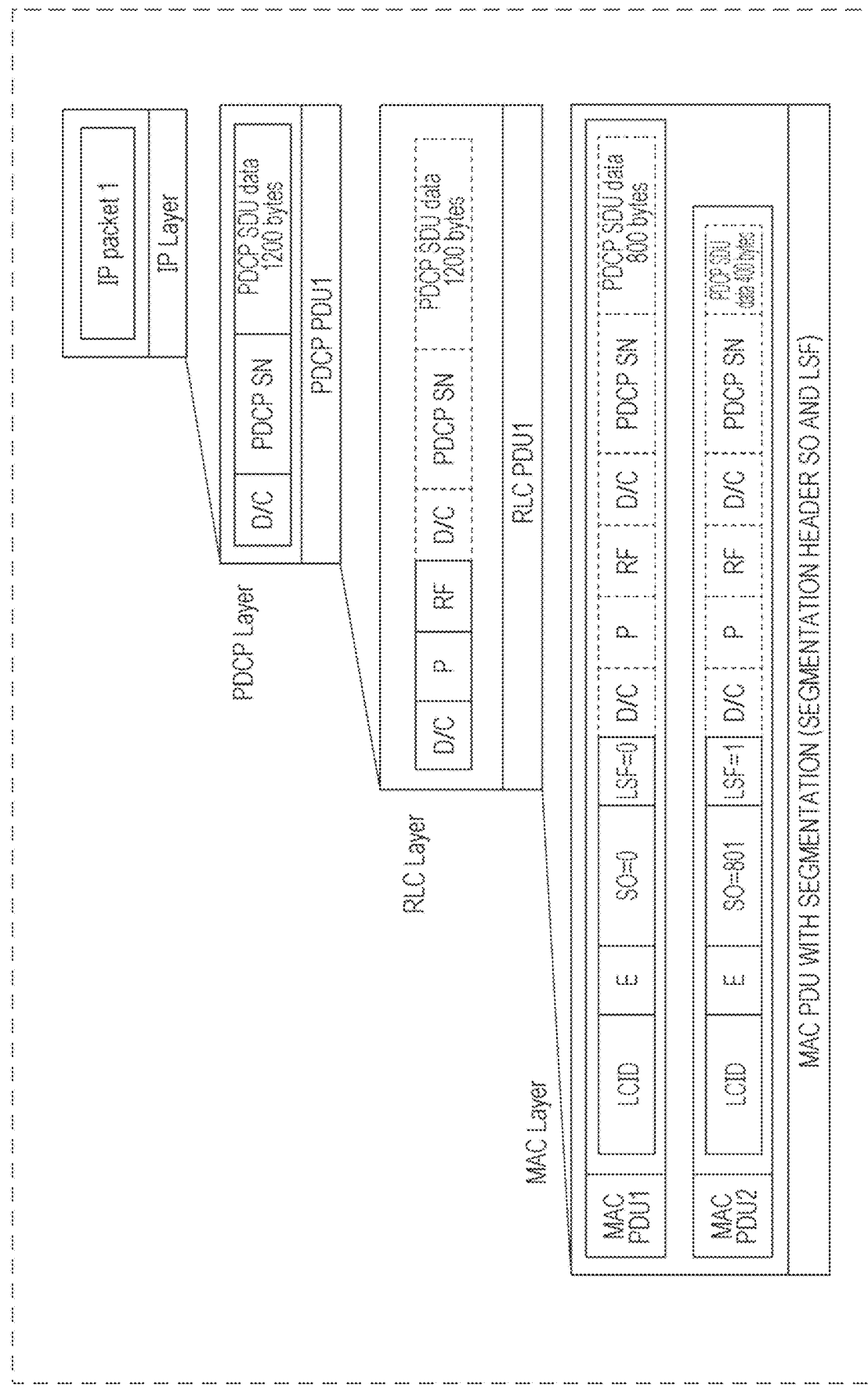
FIG. 6 is a schematic drawing of an exemplary transmission side processing by three layers.

FIG. 6 illustrates processing at a transmitter side according to this embodiment and exemplified using LTE terminology. The transmitter side may be the terminal transmitting data in the uplink to a base station. However, the present disclosure is not limited thereto and the transmitting side may be a terminal transmitting data to another terminal or to any other node. Moreover, the present disclosure may also be applied to a base station or a relay node or another node being the data transmitter.

As shown in FIG. 6, an IP packet 1 with the length of 1200 bytes is provided to the PDCP layer, thus forming a PDCP SDU. The PDCP SDU is added a header including a D/C indicator which may be a single bit. This bit indicates whether the content of the PDCP PDU is a Data or Control PDU. In this example, it is set (i.e. the bit is equal to 1) for data PDU and unset (i.e. the bit is equal to 0) for control PDU. However, in general, the setting/unsetting may be reversed. The PDCP header further includes the PDCP sequence number (SN).

The PDCP PDU1 (with a payload of 1200 bytes) is sent to the RLC layer, thus forming an RLC SDU. The RLC layer includes the relevant RLC header to the RLC PDU. As can be seen in the figure, the RLC header includes another D/C flag, a P flag and an RF flag. The D/C flag indicates whether control or data are carried by the RLC PDU, while the P flag is a polling bit which is set to request a status report from the receiver (peer RLC entity). If it is not set then a status report is not requested. The RF flag is a re-segmentation flag indicating whether the RLC PDU is a complete PDCP PDU or a PDCP PDU segment. The RF value is initially set to 0, indicating that the RLC PDU is a complete PDU, and then delivered to the MAC layer as a part of the RLC PDU1. In this example, for the first transmission of data of the PDCP PDU/IP packet, the RLC layer does not perform segmentation; rather the MAC layer performs the segmentation. Accordingly, for the first transmission, the RF value is always set to 0.

In the example of FIG. 6, the transmitting MAC entity needs to segment the RLC PDU based on the grant received. Further, the grant sizes assumed in this example are 800 and 400 bytes at two different transmission occasions (or at least one grant for 800 bytes and the rest waiting for another grant). Thus, the MAC layer segments the RLC PDU corresponding to a MAC SDU. After the segmentation of the RLC PDU, the transmitting MAC entity includes segmentation-relevant MAC header portions into the respective MAC PDUs to indicate segment offset (SO) and last segment field (LSF) of the included RLC PDU and forms the MAC PDUs which are referred as MAC PDU1 and MAC PDU2 in FIG. 6. MAC PDU1 contains an 800 byte payload whereas MAC PDU2 contains a 400 byte payload. MAC PDU1 and MAC PDU2 are sent to TTI0 and TTI1 respectively. The TTI0 and TTI1 are then multiplexed into different resources, for instance different time resources. However, it is noted that this is not to limit the present disclosure to mapping the two MAC PDUs to different time points. More than one MAC PDU may be generally mapped onto different type of resources, for instance different frequencies or different streams of a MIMO system, orthogonal codes, or the like.

The SO field in this example indicates the position of the PDU segment in bytes within the original PDU. Specifically, the SO field indicates the position within the data field of the original PDU to which the first byte of the data field of the PDU segment corresponds to. The first byte in the data field of the original PDU is referred by the SO field value zero. The LSF field indicates whether or not the last byte of the PDU segment corresponds to the last byte of a PDU.

The MAC layer may include into the MAC PDU1 and MAC PDU2 further fields such as logical channel ID (LCID) and an extension flag (E), which indicates whether or not there are other fields following the MAC header. Value 1 indicates that there is at least one or more E/LCID fields following this field. Value 0 indicates that there is no more E/LCID fields following this field implying that the next byte is the start byte of the MAC SDU. There may some further fields or reserved fields in the header (not shown in the figure).

According to this embodiment also a data receiving node is provided for receiving data over a wireless interface in a communication system from a data transmitting node. The data receiving node comprises a first layer processing unit for de-mapping one or more of a plurality of second layer data units from the resources allocated for data transmission and for providing the one or more of the plurality of the de-mapped second layer data units to a second layer processing unit. Moreover, the data receiving node further comprises the second layer processing unit for performing de-multiplexing of a plurality of third layer unit segments and segmentation control information from the one or more of the plurality of second layer data units, and forwarding the plurality of the demultiplexed third layer unit segments together with the segmentation control information to a third layer processing unit. The data receiving node further comprises the third layer processing unit for performing re-ordering of the plurality of the demultiplexed third layer segments and assembly into a third layer unit.

Thus, the segmentation information which is a part of the second layer data units (and may be, in particular carried in the second layer header) is also looked at and used at the third layer. This approach disregards thus the strict layer separation on one hand; on the other hand it saves overhead and enables to efficiently perform the re-ordering and re-assembly at the third layer. This is particularly advantageous if the ARQ procedure is implemented in the third layer, which—however—is not necessary and not limiting for the present disclosure.

According to an exemplary implementation, the third layer processing unit in the data receiving apparatus is further configured to generate control data carrying a status report indicating whether or not at least one third layer unit segment has been received correctly. The status report may include at least one of positive acknowledgements or negative acknowledgements for at least one third layer data unit and/or identification of correctly received or missing segments of the third layer data unit. Exemplary format of the status report which may be employed here can be found in 3GPP TS 36.322, Version 13.2.0, Section 6.2.1.6 However, it is noted that this is only an example and the status report may have a different format and content as long as it enables positive and/or negative reception acknowledgement for a third layer PDU or its segments.

Figure 7:
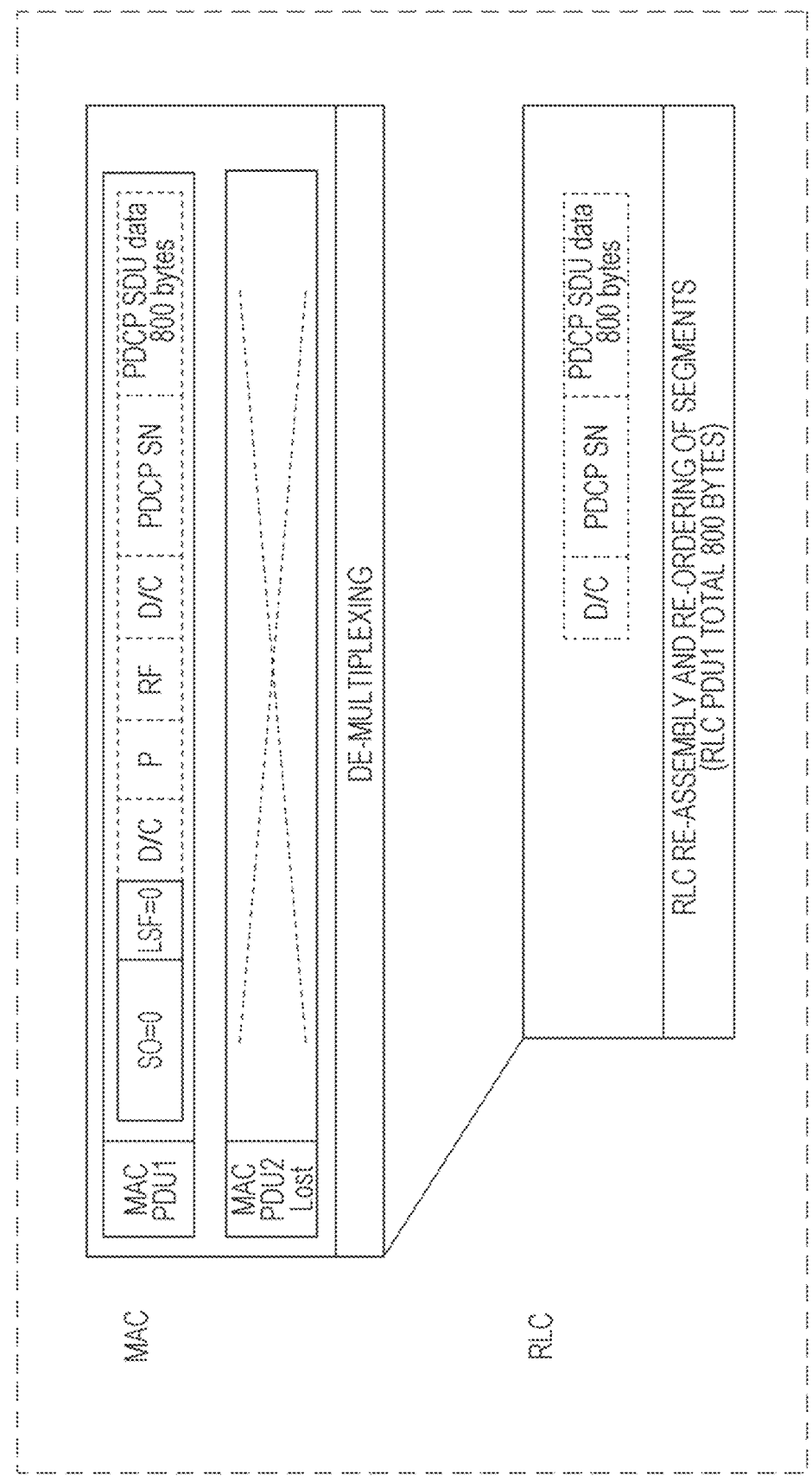
FIG. 7 is a schematic drawing of an exemplary reception side processing by the three layers in case one of two MAC PDUs is lost.

FIG. 7 illustrates an exemplary reception processing of MAC PDU1 and MAC PDU2 received over an error prone channel. As shown in FIG. 7, MAC PDU1 is received (800 bytes payload) correctly but MAC PDU2 (400 bytes payload) is lost (could not been decoded correctly, i.e. the CRC failed).

The MAC layer performs de-multiplexing of the RLC PDU1 and sends it to RLC layer. The RLC layer then performs reassembling and reordering of the MAC segments. The RLC receiving side (RX) sends status report indicating correct reception of the 800 to 1200 bytes belonging to the MAC PDU1 to the RLC transmitting side (TX). The re-ordering and re-assembling of the RLC PDU segments is performed based on the header information from the MAC layer. This includes in the example of FIG. 7 in particular the segment offset and the LSF indicator. The RLC layer D/C field enables distinguishing between the RLC data PDUs and RLC control PDUs such as status reports.

Figure 8:
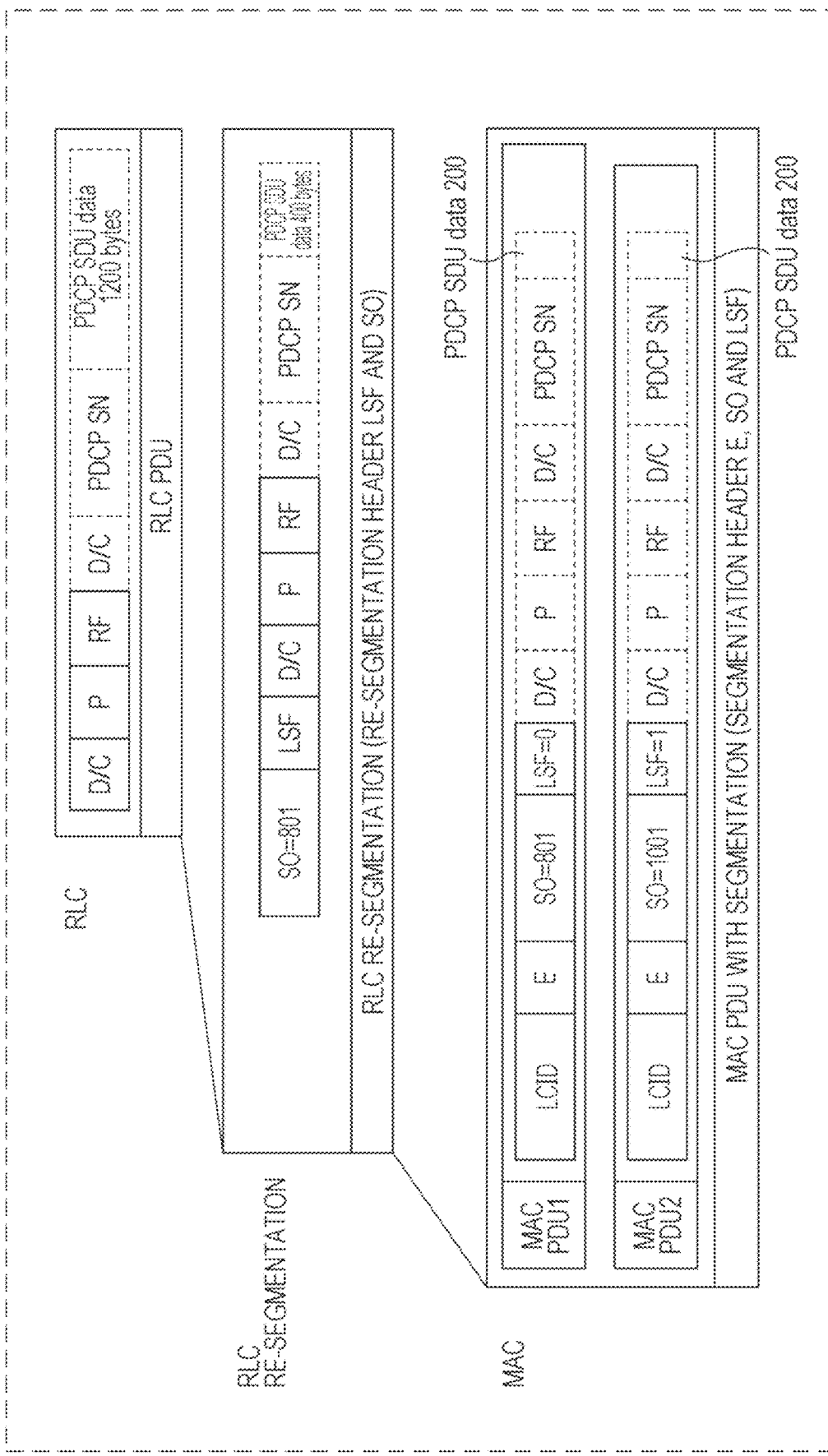
FIG. 8 is a schematic drawing of an exemplary transmission side processing by the three layers in case one of two MAC PDUs is lost.

FIG. 8 shows the exemplary subsequent actions at the RLC transmitting side, assuming that the transmitter side is aware of the second missing MAC-PDU2 segment (for instance based on the status report). As shown in FIG. 8, in this example the RLC TX takes the complete RLC PDU of the corresponding missing packet from the transmission buffer and performs a new segmentation (re-segmentation) of the 400 (800 to 1200) bytes which are indicated by the RLC status report as missing. The re-segmentation includes also attaching the appropriate RLC header. The RLC header here includes the segment offset which indicates the position of the RLC PDU segment which is to be retransmitted by means of an offset in bytes. In this example, the segmentation offset SO=801 since the missing 400 bytes from 801 to 1200 are to be retransmitted. Then the re-segmented RLC PDU corresponding to the missing 400 bytes is delivered to the MAC layer.

The MAC layer then performs segmentation of the received RLC PDU and forms MAC PDU1 (which contains 200 bytes of data) and MAC PDU2 (which also contains 200 bytes of data), which are then sent to TTI0 and TTI1 respectively—as described above with reference to FIG. 6 for the first transmission. Of course, in general, the MAC layer only performs segmentation if it is required. Here in this example, the grant size is not sufficient and that is why the MAC layer forms MAC PDU1 and MAC PDU2. If the allocation is sufficient, no segmentation is needed, or possibly, concatenation is performed (in case the allocation is larger than needed for one MAC PDU).

Figure 9:
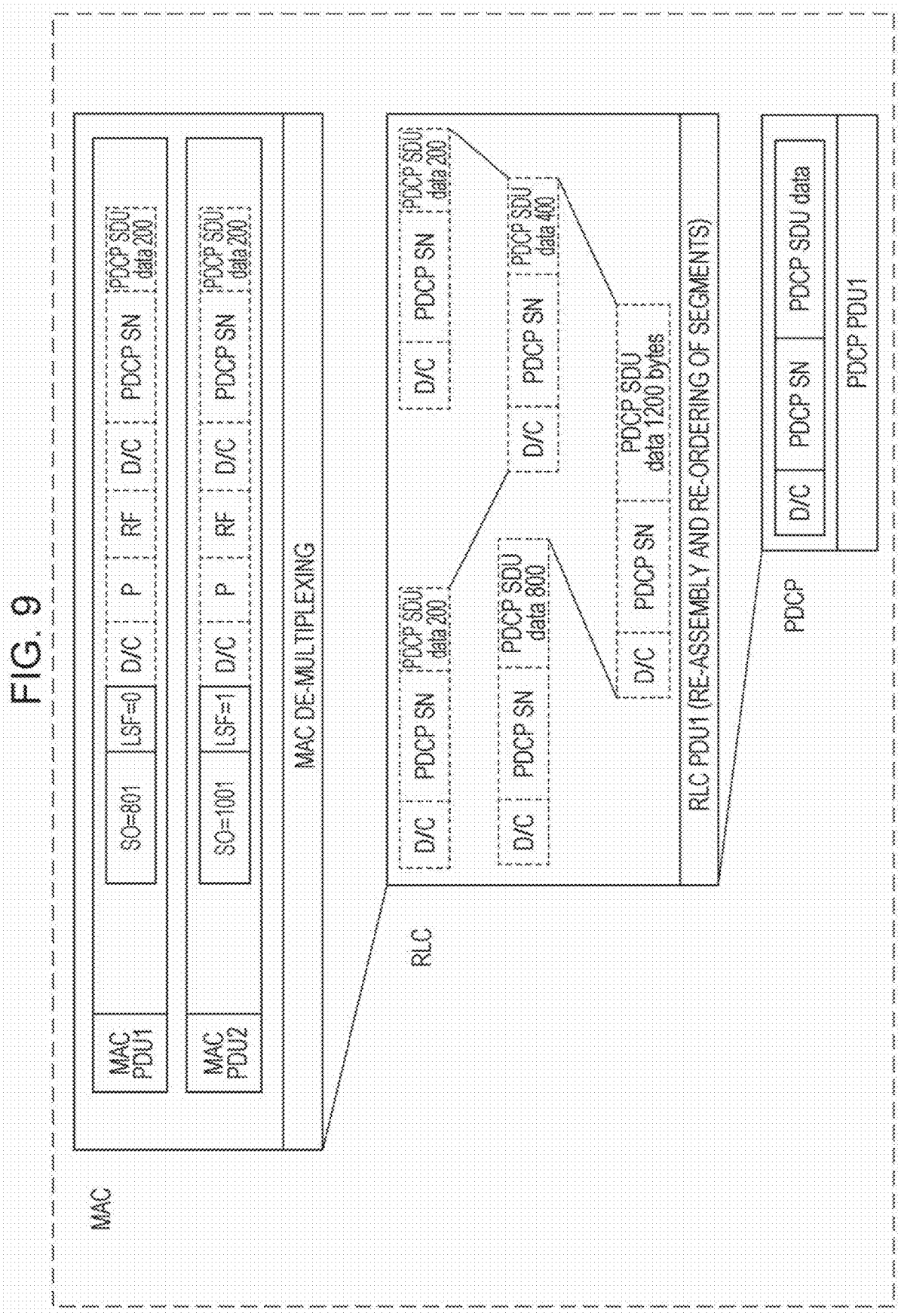
FIG. 9 is a schematic drawing of an exemplary reception side processing by the three layers in case both MAC PDUs are correctly received.

In particular, the MAC layer reads the SO field and the LSF field from the RLC header and modifies them on the basis of the grant size, i.e. in this example to reflect the segmentation size of 200 bytes and 200 bytes, respectively. As can be seen in FIG. 8, the MAC layer provides the new segmentation information in the respective headers of the segmented MAC PDUs, namely SO=801 and SO=1001, corresponding to the position of the new segments of data to be retransmitted within the first-transmitted (not re-segmented) RLC PDU and the LSF. FIG. 9 illustrates an example in which the MAC PDU1 and MAC PDU2 from FIG. 8 are both received correctly. The MAC layer delivers the correctly received MAC PDU1 and MAC PDU2 to the RLC layer. The RLC layer performs the reordering and reassembling of MAC segments and then delivers the complete PDCP PDU to the PDCP layer. The reordering is performed based on the sequence numbers (SN). As mentioned above, a single sequence number is advantageously used for both PDCP and RLC layers in order to save overhead.

In other words, the RLC RX collects all segments of the RLC PDU (retransmitted or correctly received after the first transmission), re-orders them based on the MAC header information and reassembles the RLC PDU. The reassembled PDU may then be provided to the higher layers (such as PDCP or directly IP, if there is no PDCP) for further processing.

Accordingly, the present disclosure modifies the functions performed by the different layers of the RAN protocol stack as is illustrated in Table 2 below.

TABLE 2

Table 2: NR protocol stack tasks

| UP protocol layer | Functions |
|---|---|
| PDCP TX | Header compression |
| | SN attached |
| | Ciphering |
| | Retransmission |
| RLC TX | Delivering packets to MAC layer |
| | Packet (re)-segmentation on retransmission |
| MAC TX | Concatenation/multiplexing |
| | Segmentation |
| | HARQ transmission |
| MAC RX | HARQ reception |
| | De-multiplexing |
| RLC RX | MAC segment reordering/status reporting (Retransmission) |
| | Packet reassembly |
| | Out of sequence delivery to PDCP |
| PDCP RX | Packet deciphering |
| | Complete PDU based reordering/status reporting |
| | Header decompression |

In the following Tables 3-5 provide examples of the headers of the respective layers PDCP, RLC and MAC.

TABLE 3

Table 3: The description of the PDCP header fields

| Data/Control bit (D/C) | D/C indicates whether PDU is data or control PDU |
|---|---|
| Sequence number (SN) | 10 bit sequence number |

TABLE 4

Table 4: The description of the RLC header fields

| Data/Control bit (D/C) | D/C indicates whether PDU is data or control PDU |
|---|---|
| Re-segmentation flag (RF) | RF indicates whether PDU is complete or segment PDU. |
| Polling bit (P) | The P field indicates whether or not the transmitting side of an AM RLC entity requests a STATUS report from its peer. |

TABLE 5

Table 5: The description of the MAC header fields

| | |
|---|---|
| Length indicator (LI) | The LI field indicates the length in bytes of the corresponding Data field element present in the MAC data PDU delivered/received by MAC entity. |
| Extension bit (E) | The E field indicates whether this field is the end of the header or another extension follows or not. |
| Segmentation offset (SO) | The SO field indicates the start position of the first byte of the corresponding MAC SDU in bytes. |
| Last segment field (LSF) | The LSF is set to 1 to indicate that this is the last segment of the RLC PDU. |

In the above tables, the length of the sequence number is exemplified as 10 bits. However, it is noted that this is only an example which is not to limit the present disclosure. Already in LTE, the length of the PDCP sequence number can be 5 bit, 7 bits or 12 bits depending on the radio bearer's characteristics. The length of the sequence number is a matter of system design as is clear to those skilled in the art any may be selected to have any length for the purposes of the present disclosure.

As shown in FIG. 6, the PDCP PDUs are sent to the RLC layer at the receiver. Advantageously, the PDCP, RLC and MAC layers use a universal sequence number which is understood by all these layers. In this example, the PDCP sequence number is used, which is understood by all three layers, or at least the PDCP and RLC since the SN is not necessarily needed in the lower layers.

The RLC layer includes the relevant RLC header in the RLC PDU, for instance the RF field to indicate a complete or segmented PDU. The RF value is initially set to 0 and is updated when a status report arrives at the RLC TX. When the transmitting side transmits the RLC data PDUs, it still stores the RLC PDUs in the retransmission buffer for possible retransmission. A retransmission may be requested by the receiver by means of the status report. As can be seen in FIG. 6, the RLC PDUs are then delivered to the MAC layer. Afterwards, the transmitting MAC entity performs segmentation and/or concatenation on the MAC SDU received from the upper layer (RLC) to form the MAC PDU(s).

The size of the MAC PDU at each transmission opportunity (TTI) is decided and notified by the MAC layer itself depending on the radio channel conditions and transmission resources available therefor. As mentioned in the background section, dynamic scheduling may be applied for the shared channel so that in each TTI a different allocation is possible (capable of accommodating different amount of date for instance due to varying modulation and coding scheme for better link adaptation).

The size of each transmitted MAC PDU can thus be different. The transmitting MAC entities include RLC PDUs/MAC SDUs into a MAC PDU in the order, in which they arrive at the MAC entity. Therefore a single MAC PDU can contain complete RLC PDUs or an RLC PDU segment since MAC may perform not only segmentation but also concatenation, depending on the respective segment sizes and allocated resources. If a MAC PDU contains N (N being an integer larger than 0) RLC PDUs and/or PDU segments, then the MAC layer shall include N−1 Length fields (L-fields) for all respective corresponding RLC PDUs and/or PDU segments i.e. one L-field for each RLC PDUs and/or PDU segments except for the last one.

On the receiver side, as shown in FIG. 7 (LI fields are not shown since the Example of FIGS. 6-9 relates to segmentation rather than concatenation), the MAC layer knows where the actual data starts since it knows both the header length, as well as—with the L-field—the MAC PDU length. The header length is assumed to be known here. For instance, it may be predefined (for instance specified in a standard) and/or indicated within a field in the header. In the above example, the extension bit is used to indicate whether the header continues or terminates, which makes possible to determine the header size.

The MAC layer performs de-multiplexing of the MAC PDUs without removing the segmentation fields (SO and LSF) and then the de-multiplexed RLC PDUs/segments are delivered to the RLC layer. When the receiving RLC layer receives the RLC PDU segments, it first reorders and re-assemblies them if they are received out of sequence (cf. also FIG. 9). One of the advantages of not doing reordering and reassembling in the MAC layer is the processing time reduction. If one segment is missed in the receiver side, then the MAC layer could not do reassembly and reordering which will add delay in delivery to the upper layer (RLC). In order not to delay re-assembling and re-ordering, the MAC layer passes the segmentation fields (SO, LSF) to the RLC layer since segmentation and concatenation are performed by the MAC layer, as described above with reference to FIG. 6. Therefore, the RLC layer reads the segmentation header field(s) received from the MAC layer and on the basis of the segmentation (e.g. SO, LSF) and concatenation (e.g. LI) header field(s), the RLC layer performs, where appropriate, the re-ordering and re-assembling. Accordingly, a cross-layer interaction is required in this example since the receiving RLC layer has to know and use the MAC layer signaling fields.

Any RLC PDUs received out of sequence at the MAC layer are delivered to the upper layer (RLC). An ARQ operation is performed in the receiving RLC to support an error free transmission (acknowledged mode). In order to enable the transmitting side to retransmit only the missing RLC PDUs, the receiver side provides an RLC status report to the transmitting side indicating the missing PDU(s) or PDU segment(s) information for the RLC PDUs.

In response to a status report with one or more PDUs/segments missing, the transmitter of the RLC layer takes the complete RLC PDU of the corresponding missing packet from the transmission buffer and performs (re)-segmentation on the basis of the missing segment(s) which is/are indicated by the RLC status report. If re-segmentation is performed after the reception of the status report, the RLC changes the RF field from 0 to 1. Then the (re)-segmented PDU(s) is/are delivered to the MAC layer, which reads the RF flag. Since the radio conditions may deteriorate during the retransmission procedure, the missing segment PDU or PDUs may have to be broken up into smaller segmentations (re-segmented) before retransmission (which is done by MAC layer). This is illustrated in FIG. 8, in which the missing 400 byte payload RLC PDU is taken at the RLC layer from the original 1200 byte payload RLC PDU in the retransmission buffer and further broken (re-segmented) into the smaller 200 byte payload MAC PDUs.

Re-Segmentation in the MAC Layer

When looking at FIG. 8, it can be seen that the RLC overhead is slightly increased, since the RLC transmitter performs the re-segmentation on the basis of the missing part of the segment, i.e. on the basis of the 400 bytes long data which was not received correctly and which is indicated by the RLC status report and then delivered to the MAC layer. Accordingly, the re-segmentation header (including SO, RF and LSF) is required in the RLC, which increases the RLC header overhead.

In order to reduce the overhead, according to an embodiment, the re-segmentation is performed in the MAC layer.

In particular, according to this embodiment, a data transmitting node is provided for transmitting data over a wireless interface in a communication system to a data receiving node. The data transmitting node comprises a third layer processing unit for performing an automatic repeat request, ARQ, retransmission according to a status report fed back from the data receiving node. The data transmitting node further comprises a second layer processing unit for receiving, from the third layer processing unit, a third layer data unit, segmenting the third layer data unit according to the status report and based on a resource allocation and forming a plurality of second layer data units including the respective segments of the segmented third layer data unit. The first layer processing unit is also present for receiving from the second layer the plurality of the second layer data units and mapping the plurality of the second layer data units onto the resources allocated for data transmission.

Accordingly, the segmentation functionality is entirely transferred to the second layer, the closest layer to the physical layer. This is illustrated in FIG. 10 in a greater detail based on a selected example.

The RLC layer of the transmitter adds the PDCP PDU (RLC SDU) a header including the polling bit (if this embodiment is applied with AM rather than UM) to request a status report and the D/C field indicating whether the RLC PDU carries payload (user) or control data. It is noted that the present disclosure is not limited to the RLC layer preforming ARQ since the RLC layer may also operate in the unacknowledged mode.

The RLC TX layer delivers the status report received from the RLC RX to the MAC layer. The MAC layer reads the segmentation information such as the sequence number (SN), SOstart and SOend value form the status report and performs the segmentation accordingly. Therefore, the RLC TX takes the complete RLC PDU from the retransmission buffer and sends it to the MAC TX. This is illustrated in FIG. 10 which shows the RLC PDU including the data field with PDCP SDU data of 1200 bytes rather than only the 400 bytes as shown in FIG. 8.

Figure 10:
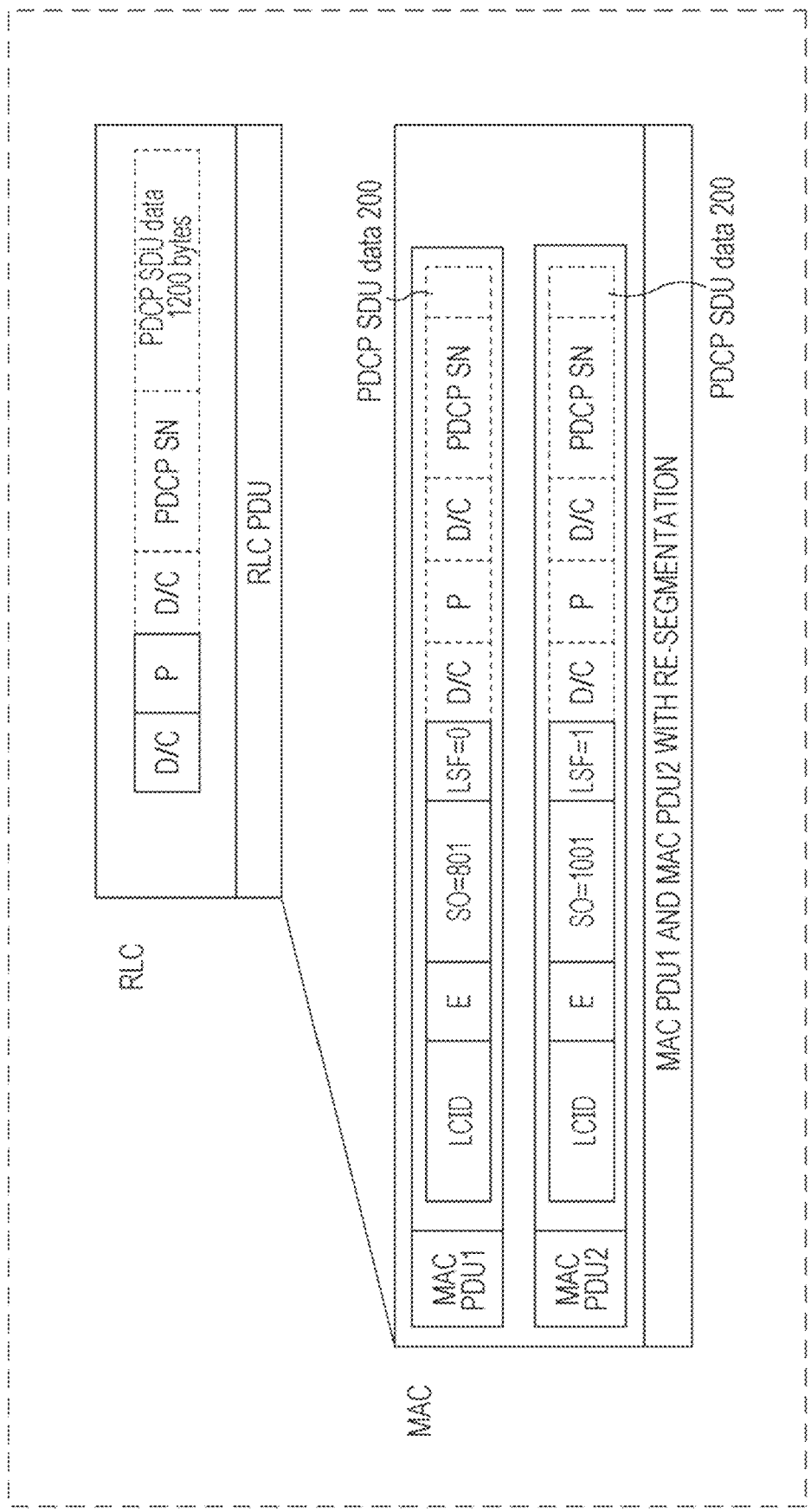
FIG. 10 is a schematic drawing showing an exemplary layer processing at the transmitter side for a first transmission.

Afterwards, the MAC TX layer performs the segmentation on the basis of the segmentation information, e.g. SOstart, SOend and SN which is indicated by the RLC status report and forwarded down to the MAC layer by the RLC layer as shown in FIG. 10. In accordance therewith, the MAC PDU header is generated. The header in FIG. 10 includes the LCID (logical channel identification), the E-bit indicating whether or not further header information is present and the segmentation information including here the segment offset (may be in the units of bytes) which indicates the start of the carried segment within the RLC PDU and the last segment field (LSF) indicating whether or not the encapsulated RLC PDU segment is the last in the RLC PDU. As can be seen in FIG. 10, the offsets of 801 and 1001 doe the two segments of 200 and 200 bytes respectively are signaled.

Figures 11A, 11B:
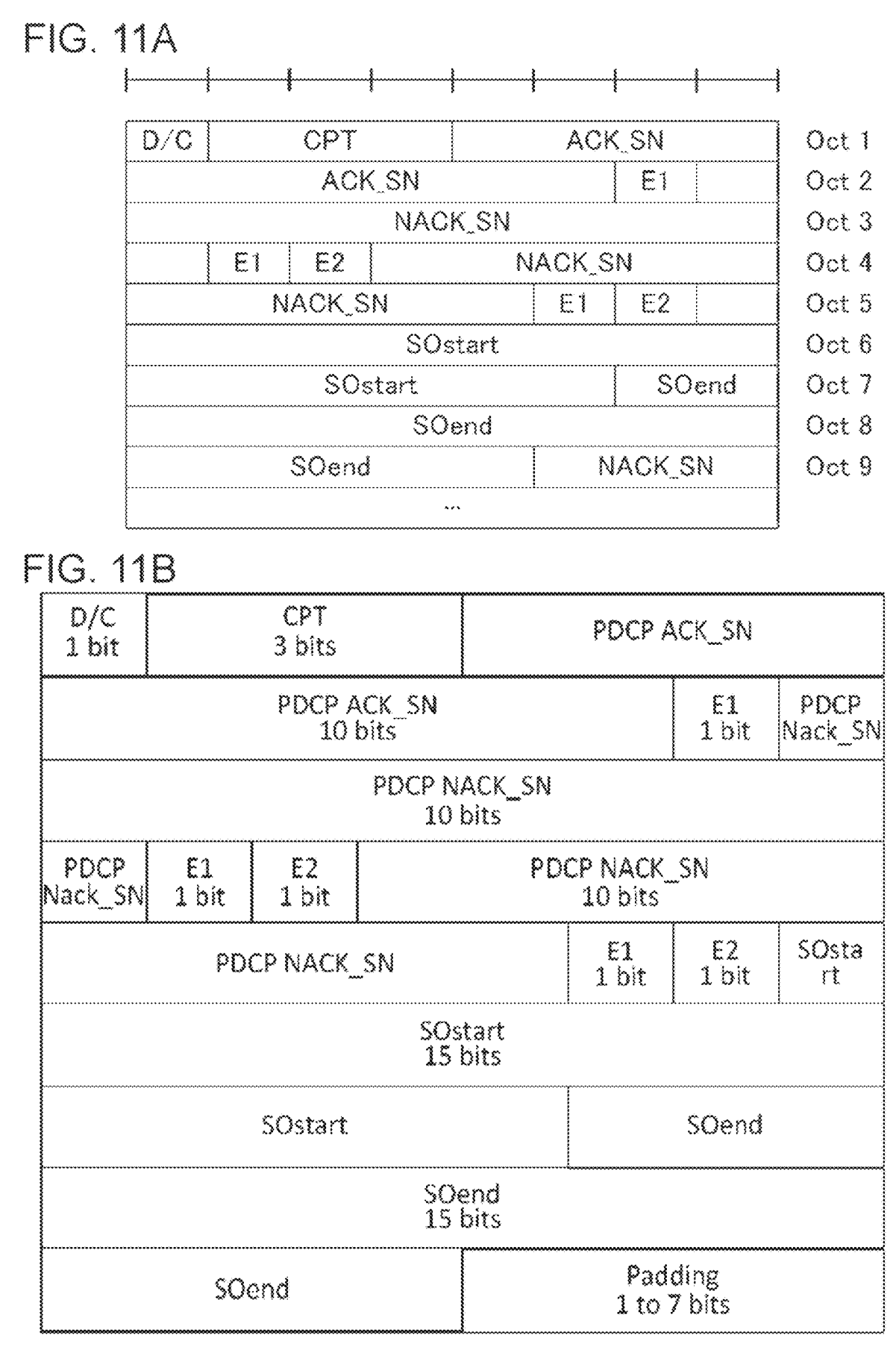

FIG. 11A shows a status report (STATUS PDU) as defined in the 3GPP TS 36.322, v. 13.2.0. STATUS PDU consists of a STATUS PDU payload and a RLC control PDU header. RLC control PDU header consists of a D/C and a CPT field. The STATUS PDU payload starts from the first bit following the RLC control PDU header, and it consists of one ACK_SN and one E1, zero or more sets of a NACK_SN, an E1 and an E2, and possibly a set of a SOstart and a SOend for each NACK_SN. When necessary one to seven padding bits are included in the end of the STATUS PDU to achieve octet alignment.

FIG. 11B shows an exemplary format of an RLC status report. This exemplary status report is similar and includes similar fields as the LTE status report which is exemplified in FIG. 11A. The status report of FIG. 11B differs from the LTE status report in FIG. 11A in that the PDCP sequence number is conveyed rather than the RLC sequence number.

In particular, the status report includes a D/C field and a CPT (control PDU type) field which indicates whether or not the PDU is a status PDU, it indicates the status PDU for the status report. PDCP ACK_SN is a 10 bits long field which indicates the SN of the next not received RLC Data PDU which is not reported as missing in the status report (STATUS PDU). The prefix "PDCP" here emphasizes that a common SN is used for the RLC and the PDCP layer which is thus also applied to the status report.

Extension bit 1 (E1) indicates whether or not a set of PDCP NACK_SN, E1 and E2 follows; if set to 0—a set of NACK_SN, E1 and E2 does not follow; if set to 1—a set of NACK_SN, E1 and E2 follows.

Negative Acknowledgement SN (NACK_SN), in this example PDCP NACK_SN field, indicates the SN of the RLC PDU (or portions of it) that has been detected as lost at the receiving side of the AM RLC entity.

Extension bit 2 (E2) indicates whether or not a set of SOstart and SOend follows; if set to 0—a set of SOstart and SOend does not follow for this NACK SN; if set to 1—a set of SOstart and SOend follows for this NACK_SN.

According to 36.322, sections 6.2.2.18, 6.2.2.19 describe these SOstart an SOend as follows:

SOstart (15 bits): The SOstart field (together with the SOend field) indicates the portion of the RLC PDU with SN=NACK_SN (the NACK_SN for which the SOstart is related to) that has been detected as lost at the receiving side of the AM RLC entity. Specifically, the SOstart field indicates the position of the first byte of the portion of the RLC PDU in bytes within the Data field of the RLC PDU.

SOend (15 bits): The SOend field (together with the SOstart field) indicates the portion of the RLC PDU with SN=NACK_SN (the NACK_SN for which the SOend is related to) that has been detected as lost at the receiving side of the AM RLC entity. Specifically, the SOend field indicates the position of the last byte of the portion of the AMD PDU in bytes within the Data field of the RLC PDU. The special SOend value "111111111111111" is used to indicate that the missing portion of the AMD PDU includes all bytes to the last byte of the AMD PDU. In other words, the SOstart and SOend indicate respectively the start and the end of the negatively acknowledged RLC PDU segments.

Segment Number

The segment offsets (start and end together) which are typically 30 bits long which increases MAC sub-header overhead, especially for smaller segments.

In order to reduce the overhead, in this embodiment, the segment identification is thus a segment number indicating a sequence number of the segment of the third layer data unit within the third layer data unit. This segment number may be used in the data PDUs as illustrated in the drawing, i.e. instead of the SO field. However, the segment number may also be advantageously used in the status report (STATUS PDU) to replace the SOstart and SOend.

In one example, the MAC sub-header (i.e. portion of the header related to segmentation) is reduced by using a 4 bit long segment number instead of the 30 bit segment offsets (15 bits of SOstart and 15 bits SOend). Thus, the MAC layer performs segmentation on the basis of the 4 bits indicating the segment number. The 4 bit segment number allows distinguishing a maximum of 16 segments. However the number 4 is only for exemplary purposes here. If more or less segments are necessary for the corresponding user plane layer architecture, this could be done using a higher number of bits. The approach of this embodiment is to reduce the overhead by signaling a segment number for each segment instead of the start and end of each segment within the RLC PDU. Since the number of segments is certainly smaller than the number of bits in the RLC PDU to which the offsets are related, overhead is generally saved by addressing the segments rather than the offset.

Figure 12:
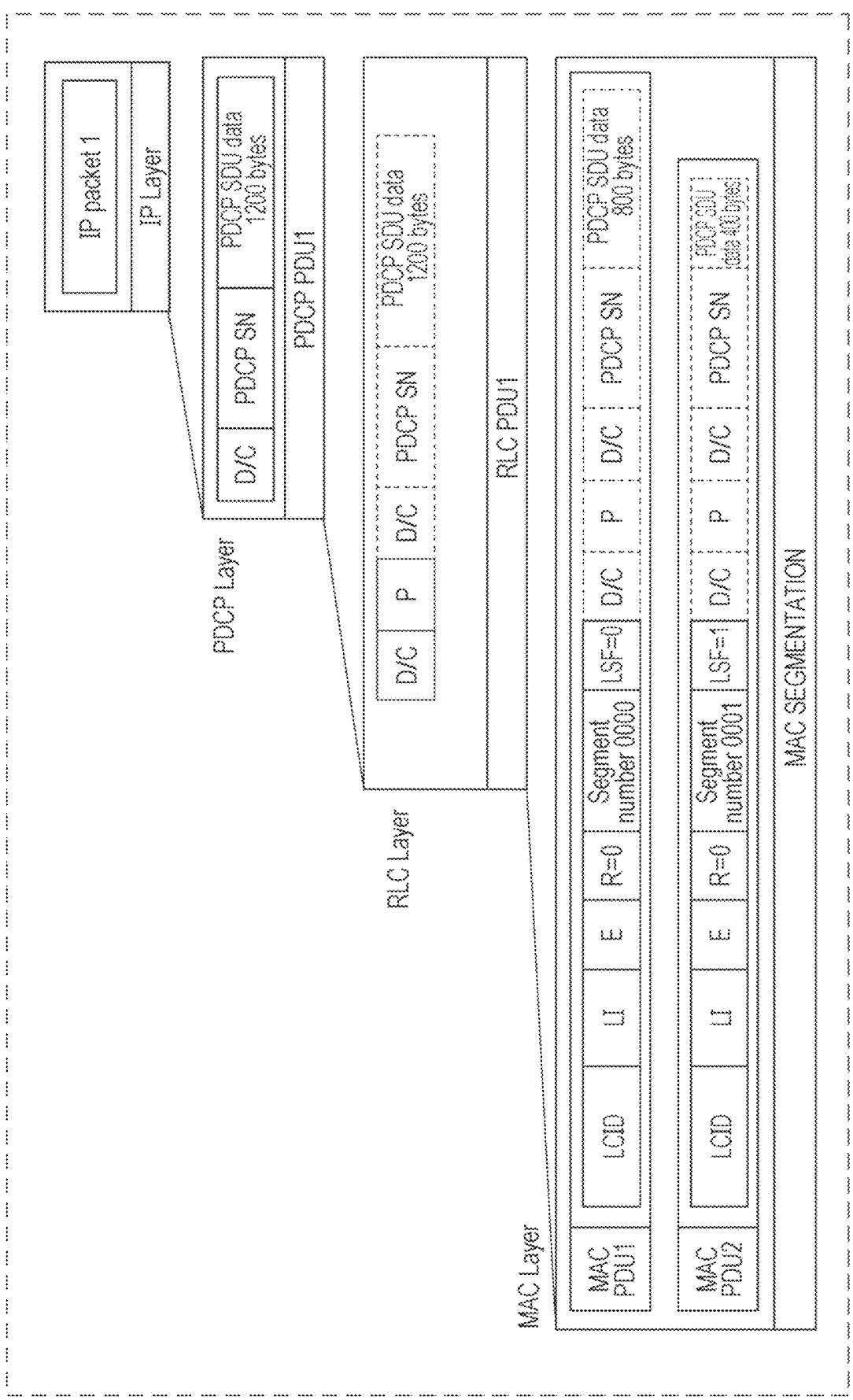
FIG. 12 is a schematic drawing showing an exemplary layer processing at the transmitter side for a first transmission using segment numbers.

The employing of the segment number is illustrated in FIG. 12 for the transmission side. In particular, FIG. 12 shows an IP packet provided to the PDCP layer, where it is added a D/C field and the PDCP SN and provided together with this header information to the RLC layer. The RLC layer encapsulates the PDCP PDU by adding thereto an own header including the D/C field and the polling field. Here, RF field is not necessary as the segmentation is not performed at the RLC layer. Rather, the RLC PDU1 is provided whole to the MAC layer.

As shown in FIG. 12, in the MAC layer, the RLC PDU is divided into two segments: segment 0 and segment 1 which containing 800 and 400 bytes, respectively. This segmentation may be performed based on the allocation size. After the segmentation of the RLC PDU, the transmitting MAC entity includes the relevant MAC headers to form the MAC PDU. In particular, the header includes a Length Indicator (LI) indicating the length of the segment, the segment number (e.g. the above described 4 bits), the Last Segment Field (LSF) and a field R set to 0 (which indicates that the re-segmentation does not follow) for the included RLC PDU. The LI field is needed in case of concatenation where one MAC PDU contains 2 or more RLC PDUs. In case of segmentation, the grant size is known, so that receiver knows the size of grant and can perform the reverse operation accordingly.

The MAC layer then forms, based on the segmentation information the two MAC PDUs which are referred as MAC PDU1 and MAC PDU2 in FIG. 12. MAC PDU1 and MAC PDU2 are sent to the respective transmission time intervals TTI0 and TTI1 respectively.

TABLE 6

Table 6: MAC header fields

| | |
|---|---|
| Length indicator (LI) | The LI field indicates the length in bytes of the corresponding Data field element present in the MAC data PDU delivered/received by MAC entity.<br>E.g. in FIG. 12, the LI of the MAC PDU1 indicates 800 and the LI of the MAC PDU2 indicates 400. |
| Extension bit (E) | The E field indicates whether this field is the end of the header or another extension follows or not.<br>E.g. in FIG. 12, the E field is set since further fields are present in both MAC PDU1 and MAC PDU2. |
| R | The R field indicates whether re-segmentation follows or not R value is initially set to 0.<br>E.g. in FIG. 12, the R = 0 since the respective MAC PDU1 and MAC PDU2 are not further segmented. |
| Last segment field (LSF) | The LSF is set to 1 to indicate that this is the last segment of the RLC PDU.<br>E.g. in FIG. 12, for MAC PDU, 1 the LSF = 0 since MAC PDU1 is not the last RLC PDU segment and for MAC PDU2, the LSF = 1 since MAC PDU2 is the last segment of the RLC PDU. |

TABLE 6-continued

Table 6: MAC header fields

| | |
|---|---|
| Last Re-segment field (LRF) | The LRF is set to 1 to indicate that this is the last re-segment of the RLC PDU.<br>E.g. in FIG. 12, this field is not present since the R field was not set. |
| Segment number | The segment is assigned segment number 0 to 15.<br>E.g. in FIG. 12, for MAC PDU1 which is the first RLC PDU segment the segment number has a value of 0 (0000 in binary notation assuming the length of this field being 4 bits) and for MAC PDU2 which is the second and last RLC PDU segment the segment number has a value of 1 (0001 in the binary notation) |

Figure 13:
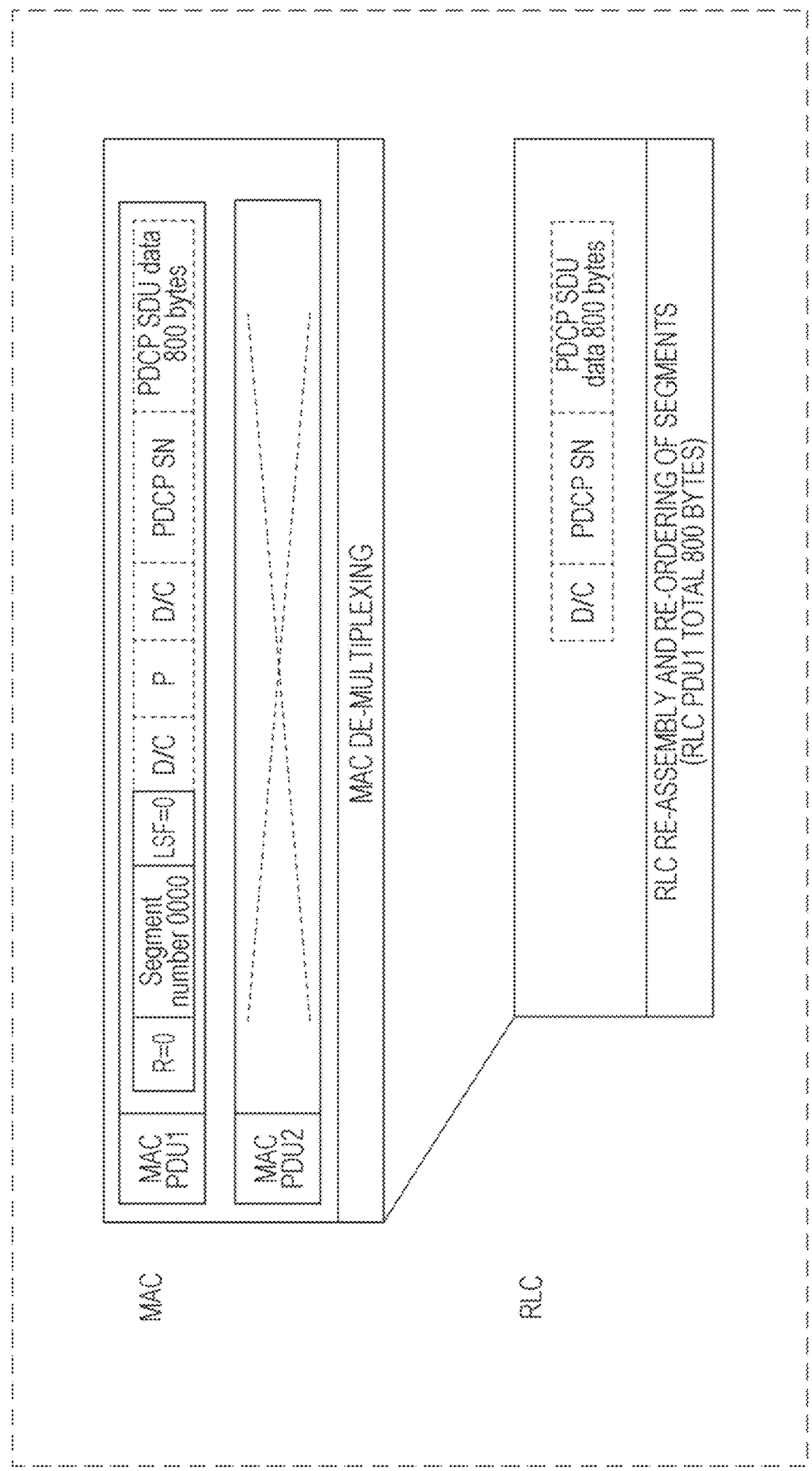
FIG. 13 is a schematic drawing showing an exemplary layer processing at the receiver side for the first transmission using segment numbers.

FIG. 13 illustrates an exemplary receiver side layer processing for this embodiment in which the segment numbers are employed instead of the segment offsets.

As shown in FIG. 13, on the receiver side, MAC PDU1 is received correctly while MAC PDU2 is lost. The MAC layer delivers MAC PDU1 together with the segmentation header (including R, segment number and LSF) to the RLC layer, whereas the RLC layer of the receiving side sends a status report indicating the missing 800 to 1200 bytes (i.e. MAC PDU2) to the transmitting RLC entity. The RLC layer performs then the re-assembly and re-ordering of the RLC segments. Here, only the first 800 byte segment is correctly received and thus no reordering has to be performed in this example.

Figure 14:
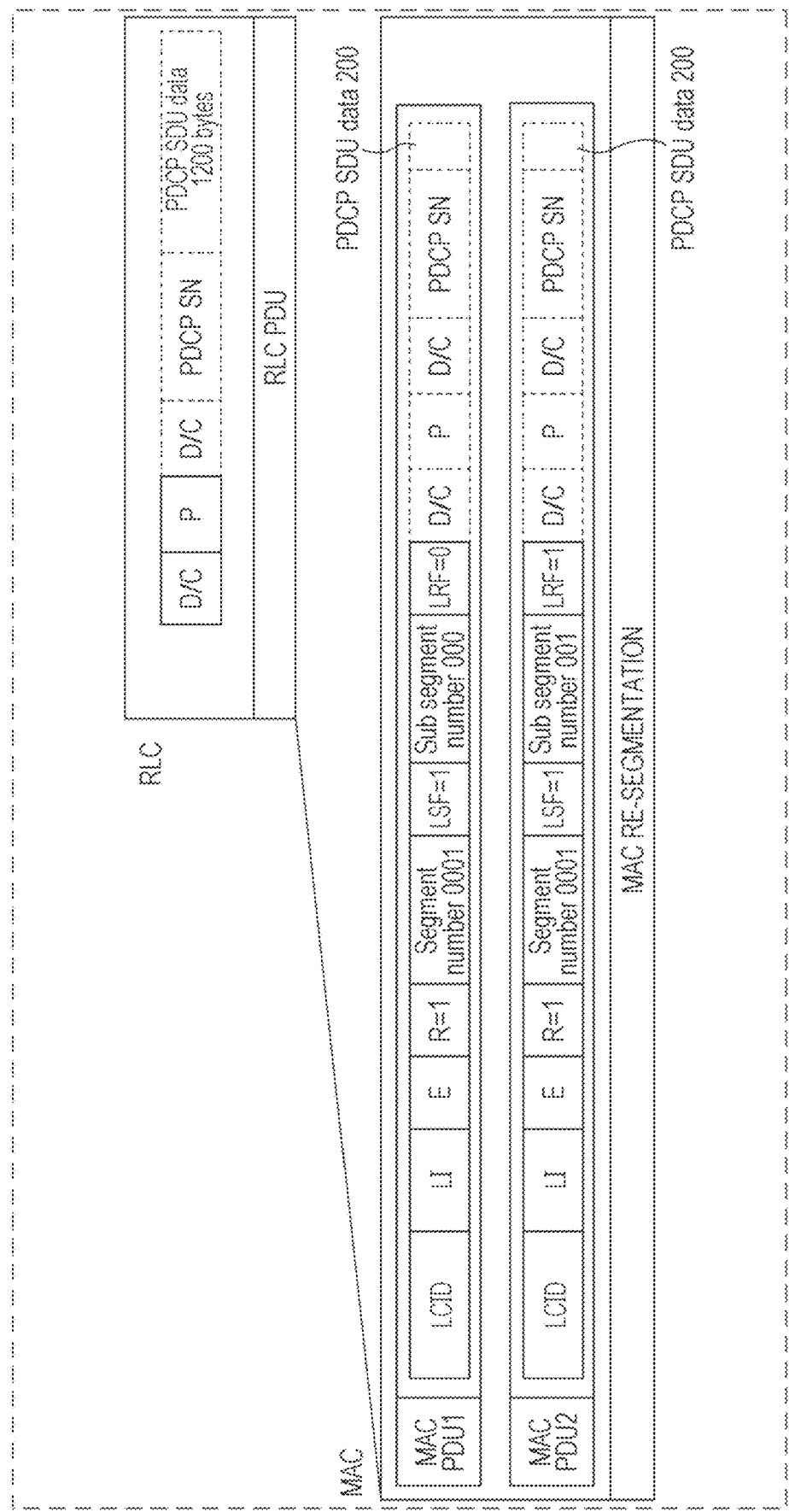
FIG. 14 is a schematic drawing showing an exemplary layer processing at the transmitter side for a retransmission using (re)segment numbers.

FIG. 14 shows an exemplary transmitter side layer processing upon receiving the status report from the data receiving side. As shown in FIG. 14, the RLC layer takes the complete RLC PDU from the retransmission buffer (this is illustrated by the PDCP SDU data of 1200 bytes included in the RLC PDU rather than only the missing 400 bytes). The MAC layer performs then a re-segmentation on the basis of the RLC status report.

After the re-segmentation of RLC PDU, the transmitting MAC entity includes the relevant MAC headers in the respective re-segmented MAC PDUs to indicate their length (LI), a 3 bits re-segment number, last re-segment field (LRF) and R=1 (which indicates that a re-segmentation follows) for the respective included RLC PDUs and forms the MAC PDUs which are referred as MAC PDU1 and MAC PDU2 in FIG. 14.

If required, the MAC layer may perform re-segmentation of the missing part of segment number e.g. when the missing segment, as reported in RLC Status report, cannot fit in the available grant for the corresponding LCID (after running LCP). For this purpose, MAC may use e.g. 3 bits (or more, if required) to identify "re-segments" of the corresponding segment of an RLC PDU.

In summary, the second layer processing unit includes into the header of the second layer data unit the segment identification comprising a re-segment number indicating a sequence number of the segment of the third layer data unit within the segment of the third layer data unit, the re-segment number being signaled using less bits than the segment number. However, it is noted that this is not to limit the present disclosure. The size of the segment number and re-segment number may also be the same. Another term, which may be employed for "re-segment" is a "sub-segment" since it is a sub-segment of a segment resulting from previous segmentation.

In FIG. 14, alternatively, the segment number may be used for the segments and the segment offset may be used for the sub-segments instead of the sub-segment number, since it is assumed that retransmissions are not as frequent and thus higher overhead may be acceptable.

Figure 15:
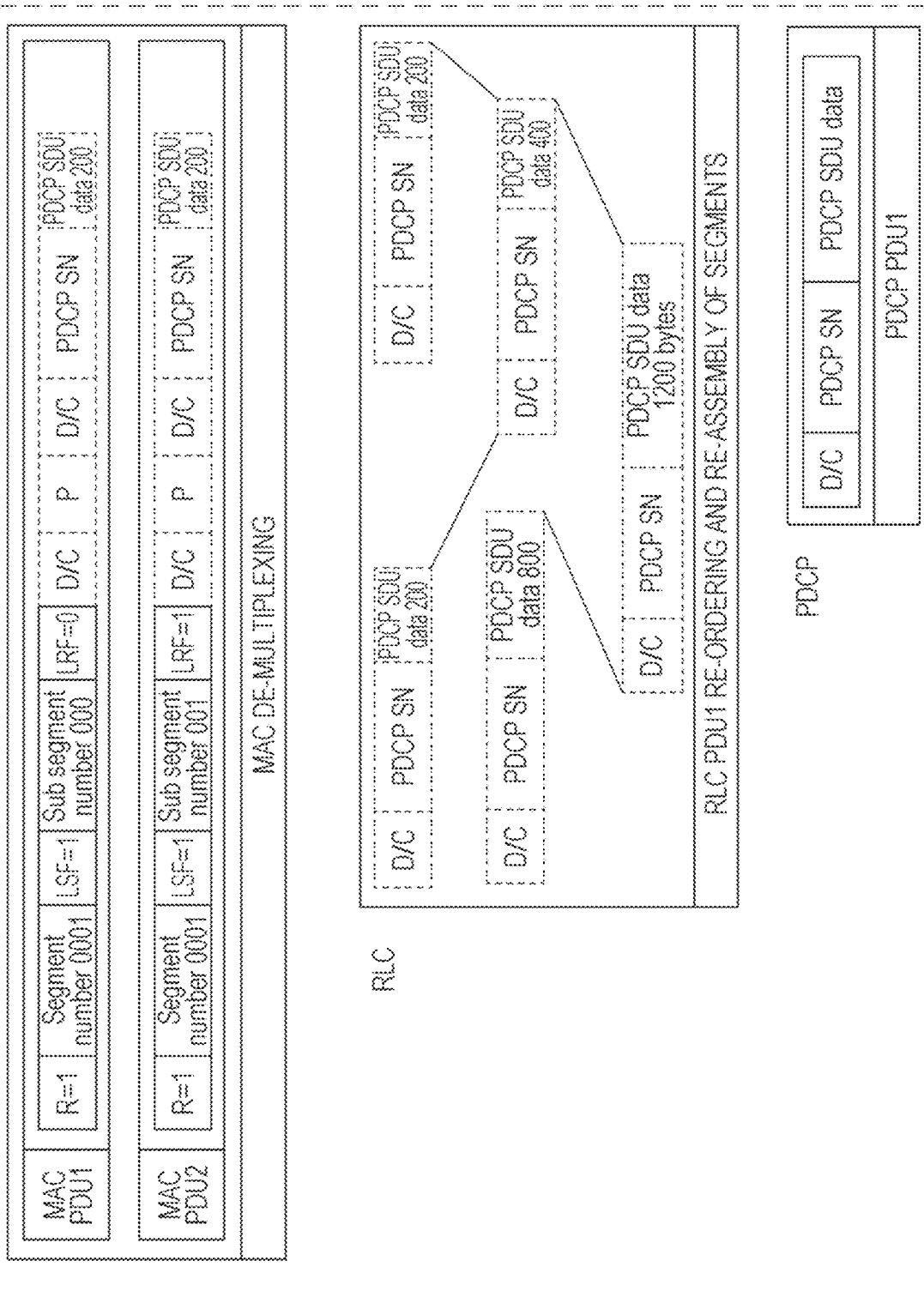
FIG. 15 is a schematic drawing showing an exemplary layer processing at the receiver side for the retransmission using (re)segment numbers.

FIG. 15 shows the receiving side layer processing upon receiving the retransmission of the MAC PDU1 and MAC PDU2 shown in FIG. 14.

As shown in FIG. 15, the MAC layer performs de-multiplexing of MAC PDU1 and MAC PDU2 and removes part of their header. However, the MAC layer keeps the relevant segmentation header fields (R field, segment number, LSF, LRF and re-segment number) since the re-ordering and re-assembling is performed in the RLC layer. The RLC performs then the re-ordering and re-assembling of the MAC segments and sends the result (PDCP PDU) to the PDCP layer.

Reordering and Reassembly at the Second Layer

According to another embodiment of the present disclosure, the receiving side is further modified. In particular, instead of performing the re-ordering and the re-assembly in the RLC layer, the MAC layer performs re-ordering and re-assembly. In that case, cross-layer interaction is not required. In this configuration, the MAC layer is also responsible for performing the retransmission processing. If any parts of the segments are missed, then the receiving entity of MAC layer sends the status report to the MAC TX. The MAC status report will slightly differ from the RLC status report. In particular, the LCID field will be provided in the status report to differentiate which status report belongs to which LCID (logical channel).

In other words, a data receiving node for receiving data over a wireless interface in a communication system from a data transmitting node, comprising: a first layer processing unit for de-mapping one or more of a plurality of second layer data units from the resources allocated for data transmission and for providing the one or more of the plurality of the de-mapped second layer data units to a second layer processing unit; the second layer processing unit for performing de-multiplexing of a plurality of third layer unit segments and segmentation control information from the one or more of the plurality of second layer data units, and forwarding the plurality of the demultiplexed third layer unit segments together with the segmentation control information to a third layer processing unit; Moreover, the second layer processing unit is also performing re-ordering of the plurality of the demultiplexed third layer unit segments and assembly of the demultiplexed third layer unit segments into a third layer data unit. The second layer processing unit may also be configured to check whether or not the data are received correctly and send a status report to the peer second layer entity. This embodiment of the receiver is particularly suitable for the receiver embodiment with the segmentation/concatenation performed in the second layer described above.

Multi-Connectivity/Dual Connectivity for more eNBs same Bbearer to More Links.

In case of multi-connectivity, the PDCP layer distributes duplicate packets into different eNB.

The following Table 7 describes protocol stack of multi-connectivity with the main functions of each layer.

TABLE 7

Table 7: Functions of protocol layers supporting multi-connectivity

| | Functions |
|---|---|
| PDCP TX | Header compression |
| | SN attaching |
| | Ciphering |
| | Packet segmentation on retransmission |
| RLC TX | |
| MAC TX | Concatenation/multiplexing |
| | Segmentation |
| | HARQ transmission |

TABLE 7-continued

Table 7: Functions of protocol layers supporting multi-connectivity

| | Functions |
|---|---|
| MAC RX | HARQ reception |
| | De-multiplexing |
| RLC RX | |
| PDCP RX | Packet deciphering |
| | Segment based reordering/reassembly/status reporting |
| | Complete PDU based reordering/status reporting |
| | Header decompression |

Figure 16:
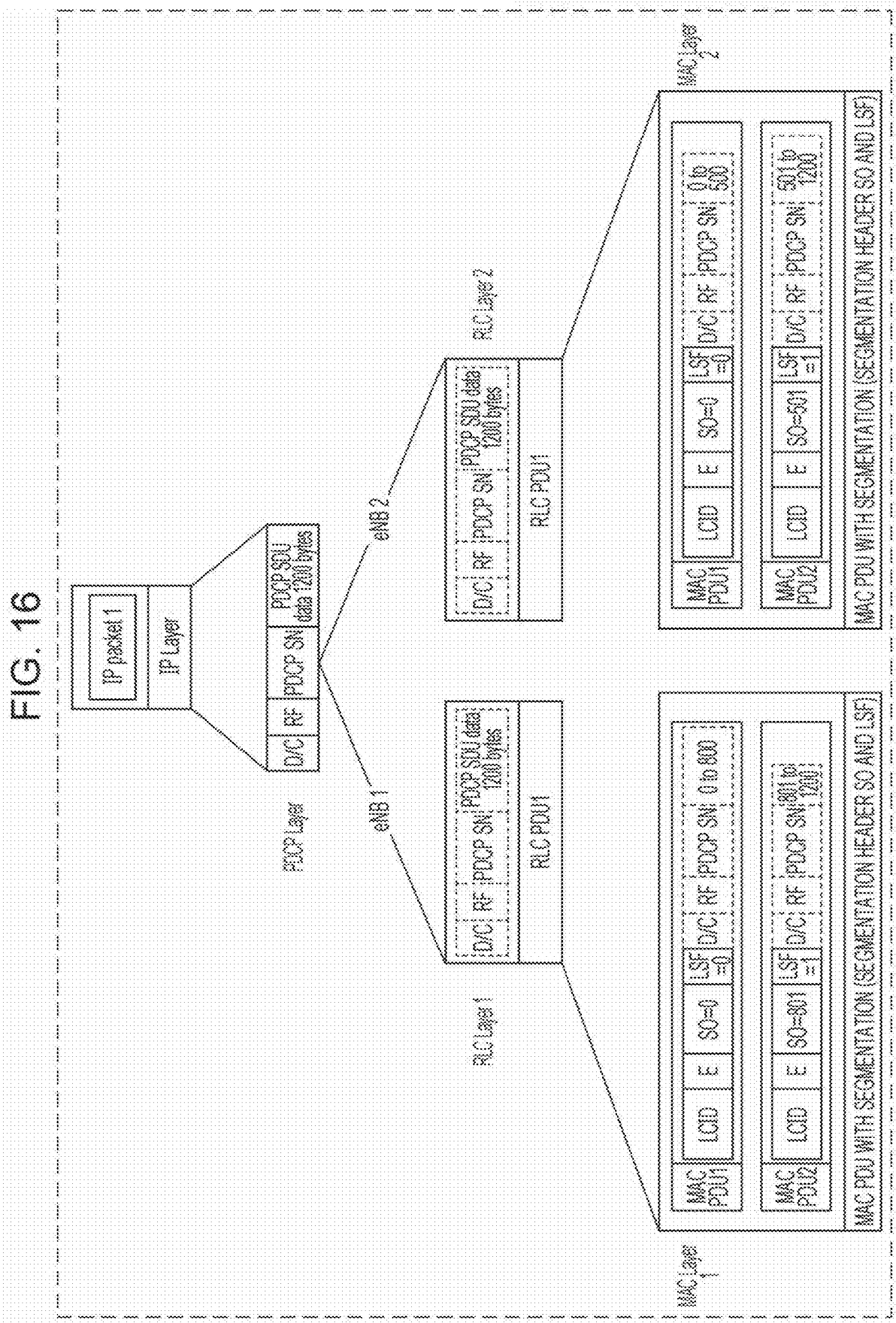
FIG. 16 is a schematic drawing showing an exemplary layer processing at the transmitter side for a first transmission supporting multi-connection.

FIG. 16 illustrates transmitting side layer processing for a case of a new transmission of an IP packet 1 in accordance with this embodiment supporting multi-connectivity.

In particular, the first layer is s physical layer, the second layer is a Medium Access Control, MAC, layer and the third layer is a Packet Data Control Protocol, PDCP, layer. However, it is noted that PDCP and RLC layer may also be combine into one layer, or RLC may perform the functionality. The third layer processing unit is configured to provide the same third layer data unit to different lower layer stacks for transmission, over the wireless interface, to different respective base stations, or, in general data receiving nodes. The lower layer stacks are capable of performing segmentation/reassembly individually and independently from each other. The lower layer stack may include physical layer and MAC. However, it may also still include RLC layer.

As also noted above, the layer may be also called differently and have different functions than the current LTE layers. In general, the multi-connectivity has a one layer in common which receives a packer from higher layers and provides multiple (more than one) copies of the packet encapsulated as own PDU to the lower layers of respective multiple stacks. The multiple stacks handle segmentation and reassembly as described in any of the above embodiments and separately and independently from each other, which ensures that they can adapt to their respective physical channel conditions and status of data reception.

The third layer advantageously controls the retransmission processing. In the above multi-connectivity scenario it is not necessary that each lower layer stack at the receiver side receives and reassembles the packet correctly. It is enough when one of them which collects segments of the packets from all other stacks is capable of reassemble the packet. This provides a kind of diversity and increases the throughput.

As shown in FIG. 16, IP packet 1 is attached to the PDCP header on the PDCP layer and the corresponding PDCP PDU is sent to two different base stations, here eNB1 and eNB2. The base stations eNB1 and eNB2 (network nodes) implement respectively protocol layers as described above (RLC/MAC/PHY). The eNB1 passes the PDCP PDU which corresponds to the RLC PDU1 into two segments MAC PDU1 and MAC PDU2 containing 800 byte and 400 bytes respectively. The eNB2 may employ a different segmentation since the channel quality in different cells may differ. Thus in this example, eNB2 segments the RLC PDU1 into two segments MAC PDU1 and MAC PDU2 containing 500 byte and 700 bytes respectively. The RLC layer, if working in acknowledged mode, may be further responsible for ARQ functionality. However, as described above, the PDCP may control the RLC retransmissions. In particular, each RLC layer (of the respective eNB) may pass the status reports to the PDCP of the master eNB, which decides whether or not a retransmission is necessary and for which segment of the packet.

The PDCP then instructs the respective RLC layers to perform the retransmissions accordingly.

Figure 17:
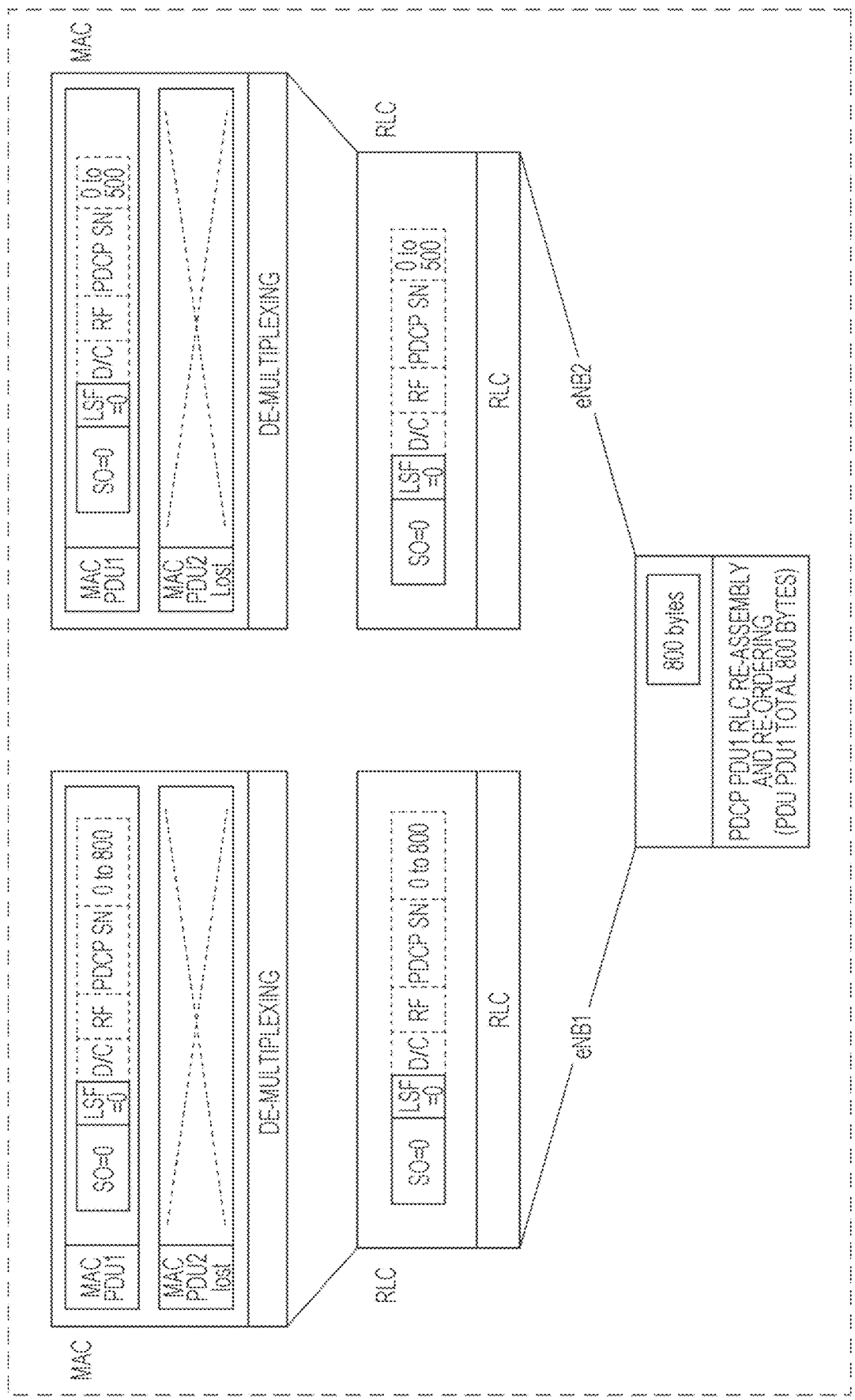
FIG. 17 is a schematic drawing showing an exemplary layer processing at the receiver side for the first transmission supporting multi-connection.

FIG. 17 illustrates processing at the receiving side. As shown in FIG. 17, eNB1 receives MAC PDU1 which contains 0 to 800 bytes whereas the MAC PDU2 with 801 to 1200 bytes is lost. On the other hand, eNB2 receives MAC PDU1 containing 0 to 500 bytes whereas 501 to 1200 bytes is lost due to missing of MAC PDU2. The PDCP layer performs central re-ordering and re-assembling.

An advantage of not performing the reordering and reassembling in the RLC layer in this embodiment is avoiding unnecessary retransmissions during multi-connectivity. If reassembling and reordering were performed in the RLC layer, then the RLC layer of both eNBs will send respective individual RLC status reports to the RLC TX (RLC of eNB1 sends status report of 801 to 1200 bytes and RLC of eNB2 sends status report of 501 to 1200 bytes, so far actual missing part is 801 to 1200 bytes). In this case, RLC TX could retransmit more than the required segments which will be discarded at RLC RX.

To overcome this problem, the RLC layer in this embodiment works as transparently as possible and the central reordering and reassembling functions are carried out in the PDCP layer. In order to perform the reordering and reassembling, the PDCP layer has to understand the segment header (SO and LSF) of the MAC layer, since the segmentation is being performed in the MAC. The PDCP receives the PDUs from MAC layer and performs central reordering and reassembling, similarly as described in the above embodiments for the RLC layer. It overlaps common segments and sends a status report indicating only the missing part of the segments, i.e. the part which has not been correctly received by any of the eNBs.

When looking at FIG. 17, it can be seen that the MAC PDUs include segmentation information as described above, i.e. SO and LSF. However, similarly as for the other embodiments, the segmentation information may include segment number and length of the segments instead. Moreover, FIG. 15 shows PDCP SN usage also in the RLC layer to reduce overhead. However, the present disclosure is not limited thereto and in general separate sequence numbers may be used for the PDCP and the RLC layers as it is the case in the LTE currently. As mentioned above, cross-layer design may improve the efficiency of the transmissions. In particular, the status report is advantageously transmitted and received on the layer (RLC) below the coordinating layer (third, PDCP) and provided to the coordinating layer for matching the received segments and deciding which segments are to be transmitted, Moreover, the MAC segmentation information may be passed up to the coordinating layer in order to enable re-ordering and re-assembly, as well as the coordination of the retransmissions.

However, it is noted that the present disclosure may still work, even when slightly less efficiently, if the PDCP does not perform the retransmission coordination and if the segments are indeed retransmitted redundantly on each link. Advantageously, in FIG. 17, the PDCP RX sends a status report of missing 801 to 1200 bytes. Advantageously, this status report is send to both (in general multiple) eNBs, so that diversity is achieved by retransmission over both links. However, the present disclosure is not limited thereto and generally, for the purpose of the retransmission, single connectivity may be re-established.

Figure 18:
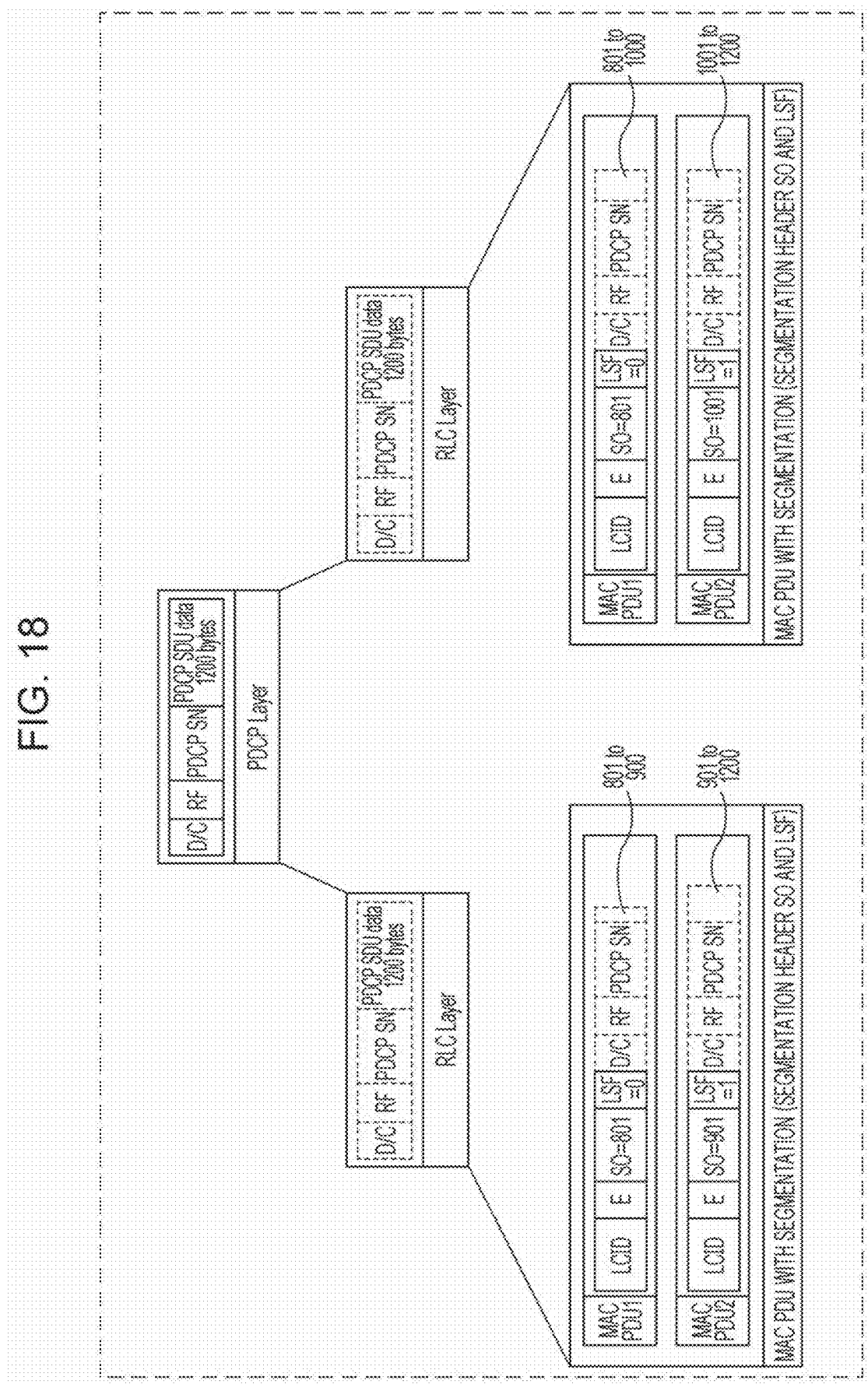
FIG. 18 is a schematic drawing showing an exemplary layer processing at the transmitter side for a retransmission supporting multi-connection.

As shown in FIG. 18, the PDCP TX, upon reception of the status report, takes a complete PDCP PDU (1200 bytes) from the transmission buffer and performs a re-segmentation (extraction) of the 800 to 1200 bytes which are indicated by the PDCP status report and then the PDU segment of 800-1200 bytes (re-segmented PDU) is delivered to the MAC. The MAC layer of each eNB performs its own segmentation according to the resource allocation as described in the above embodiments. In this case, as can be seen in FIG. 18, the fits MAC entity (transmitting to eNB1) segments the 800-1200 bytes to two MAC PDUs, namely in MAC PDU1 with 800 to 900 bytes and a second MAC PDU2 with 901 to 1200 bytes. On the other hand, the second MAC entity (transmitting to eNB2) segments the 800-1200 bytes to a first MAC PDU1 with the bytes 801-1000 and a second MAC PDU2 with the bytes 1001 to 1200.

In general, there are also alternatives: As described above, the PDCP takes the complete PDU from retransmission buffer and then performs re-segmentation of the missing packet, which is indicated by PDCP status report.

However, alternatively, the PDCP status report may be understood by the MAC layer and therefore, the PDCP passes the complete PDU to the MAC, rather than doing the re-segmentation. The MAC will perform segmentation based on the PDCP status report then.

Still another possibility is that the PDCP will inform the RLC about the missing part(s) of segments. Afterwards, the RLC layer will send the status report to the RLC TX.

Figure 19:
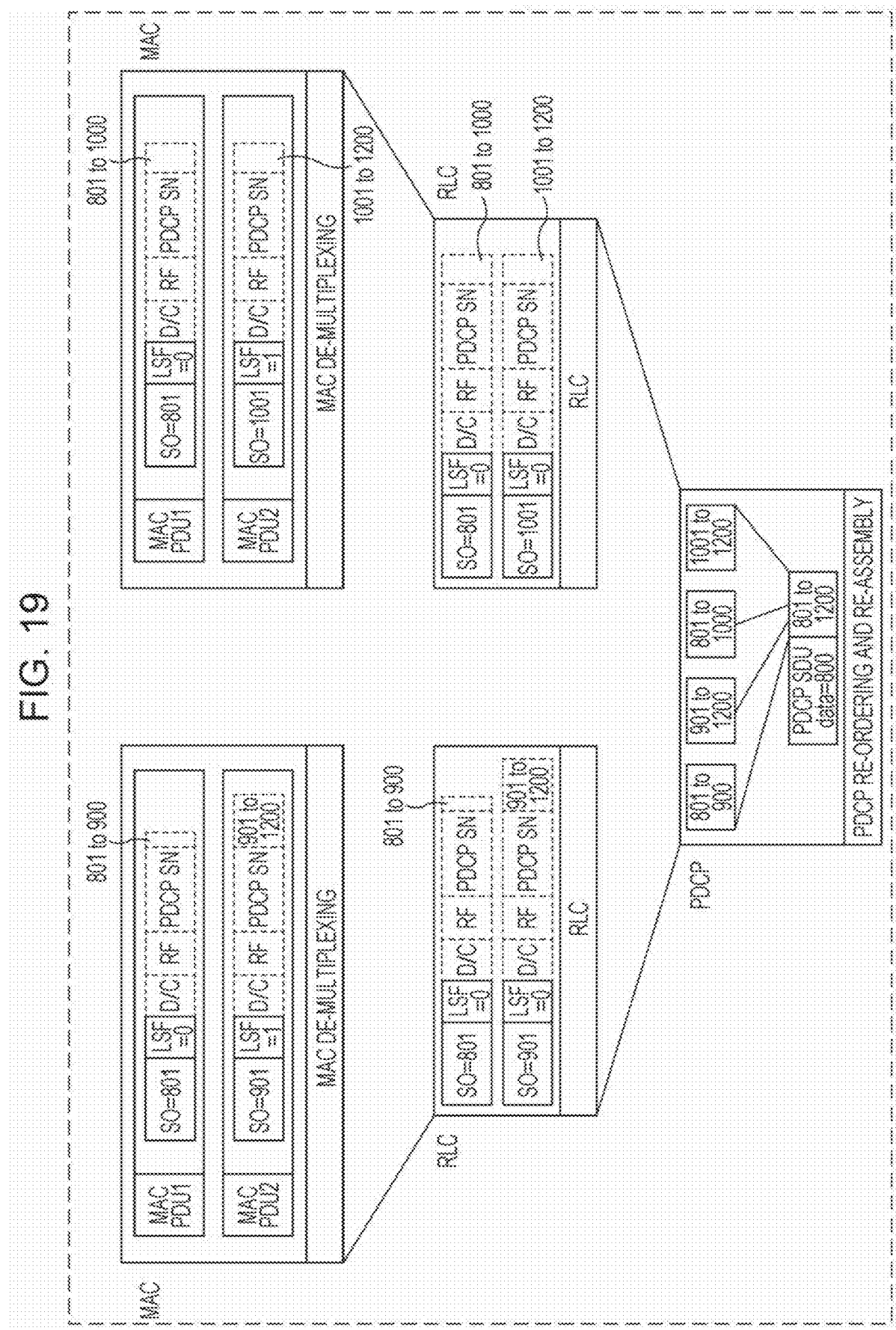
FIG. 19 is a schematic drawing showing an exemplary layer processing at the receiver side for the retransmission supporting multi-connection.
Figure 20:
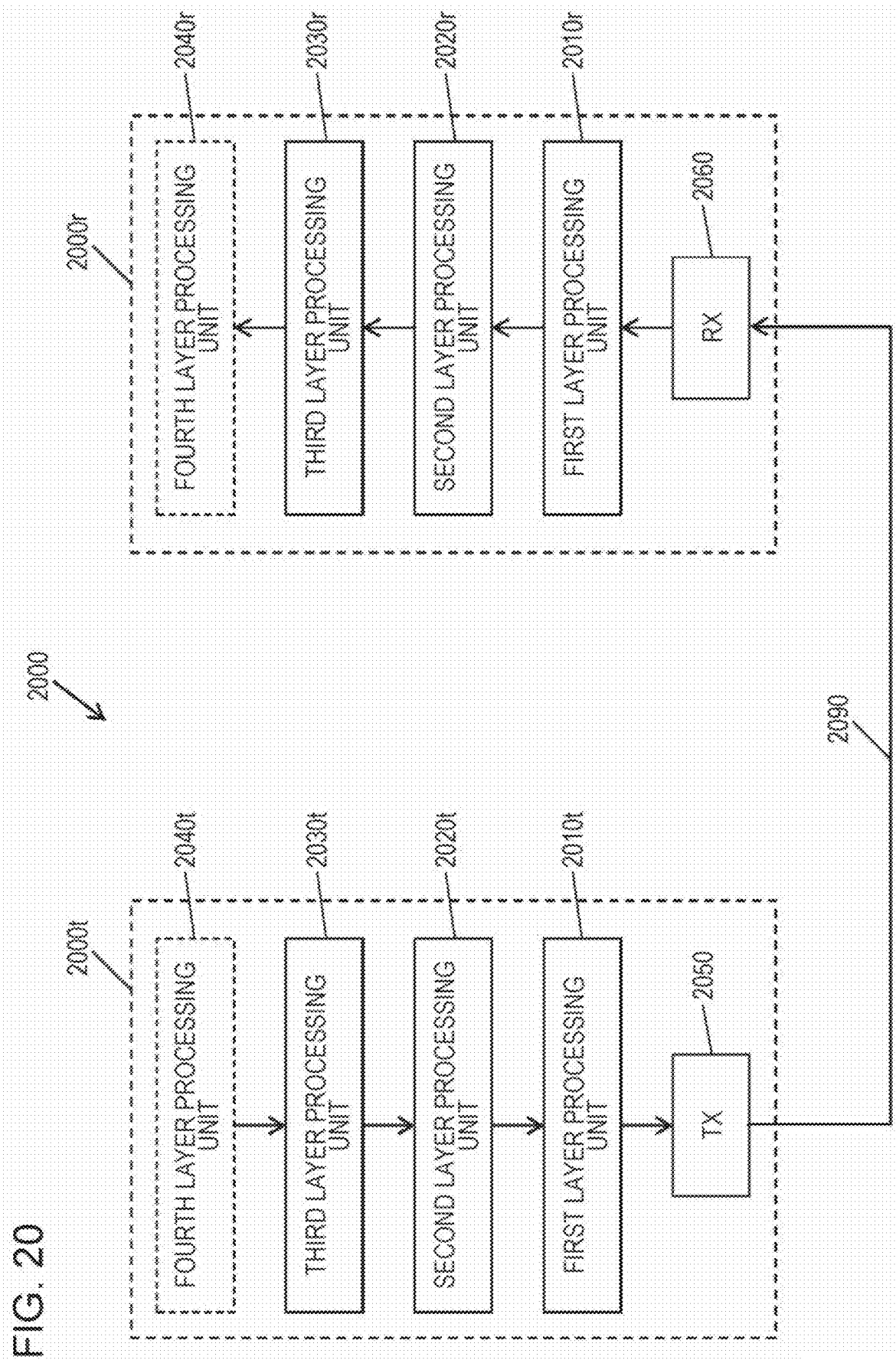
FIG. 20 is a block diagram illustrating functional structure of exemplary data transmitting and data receiving apparatuses.

Correspondingly, FIG. 19 shows receiving side (network side in this uplink data transmission example) upon reception of the retransmissions of FIG. 18. In particular, in this example, all segments are received correctly at the MAC and demultiplexed. The RLC basically passes the received segments together with the segmentation information received from the MAC to the PDCP and the PDCP performs the re-ordering and reassembly of all segments received from all nodes of the multi-connection (here eNB1 and eNB2). p FIG. 20 illustrates the transmitting apparatus 2000*t* and the receiving apparatus 2000*r* being parts of a communication system 2000 and communicating over a channel 2090. In particular, the fourth layer processing unit 2040*t*, the third layer processing unit 2030*t*, the second layer processing unit 2020*t* and the first layer processing unit 2010*t* perform the processing of the corresponding layers as described in the embodiments above. The transmitter 2050 transmits via its antenna(s) the signal mapped onto the physical resources. The receiving apparatus 2000*r* correspondingly comprises the fourth layer processing unit 2040*r*, the third layer processing unit 2030*r*, the second layer processing unit 2020*r* and the first layer processing unit 2010*r* and a receiver 2060 which receives the transmitted signal over its antenna(s).

Figure 21:
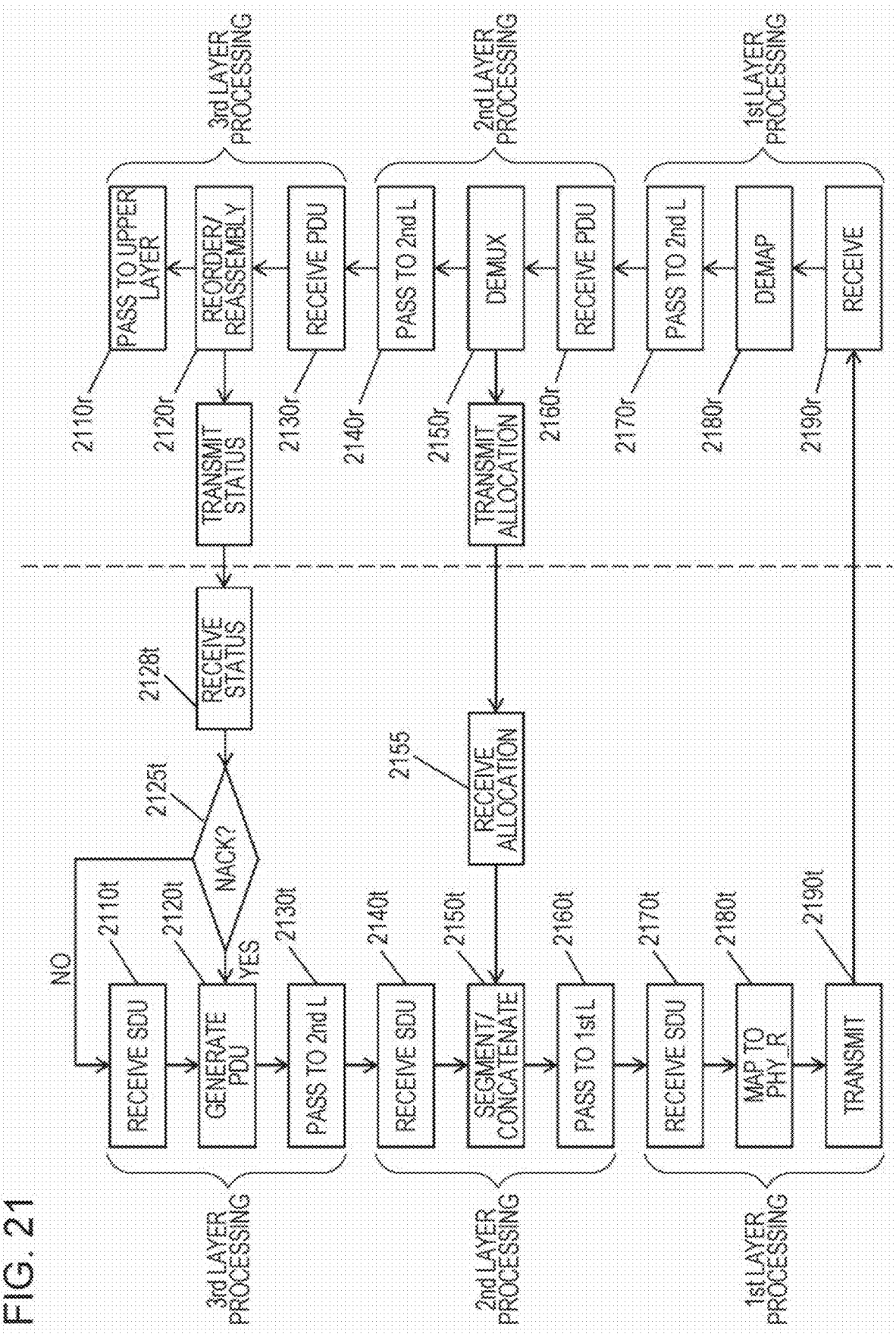
FIG. 21 is a flow diagram illustrating steps of exemplary methods performed at the transmitting and receiving side.

FIG. 21 exemplifies one of the embodiments of methods according to the present disclosure. In particular, at the left hand side, a method performed at the data transmitting side is illustrated while on the right hand side a method performed at the data receiving side is exemplified.

The transmitting method may include steps performed by the third layer including receiving 2110*t* a $3^{rd}$ layer SDU, generating 2120*t* a PDU based thereon for instance by appending a header and passing 2130*t* the PDU to the second layer. The second layer processing then may include receiving the third layer PDU as a second layer SDU 2140*t*, performing segmentation or concatenation 2150*t* as described above, based on the received allocation (and in some embodiments also based on the status report) and passing the so formed PDU to the first layer in step 2160*t*. The first layer processing then includes receiving 2170*t* the SDU from the second layer, mapping it to the physical resources 2180*t* and transmitting 2190*t*.

At the receiver, as a part of the first layer processing, the reception 2190r is performed, then the data are demapped from the physical resources 2180r and passed 2170r to the second layer. The second layer processing includes receiving 2160r the PDU, demultiplexes it 2150r and passes 2140r to the third layer for reordering and reassembly (as described above, in one alternative embodiment, the reordering and reassembly is also performed in the second layer). The third layer processing includes receiving the PDU 2130r, performing the reordering and reassembly 2120r and passing the reassembled packet to the upper layers 2110r.

Moreover, there are embodiments which implement retransmission mechanism on the third layer, including transmission of a status report at the data receiving side and receiving 2128t the status report at the data transmitting side. If the status report includes negative acknowledgement for some segments (2125t, "yes"), the re-segmentation is performed on the third layer (alternatively, in some embodiments in the second layer).

In summary, according to an embodiment of the present disclosure, a data transmitting node is provided for transmitting data over a wireless interface in a communication system to a data receiving node, comprising: a third layer processing unit for performing an automatic repeat request, ARQ, retransmission according to a status report fed back from the data receiving node and for re-segmenting or not data to be retransmitted based on segment length information included in the status report including adding to the data a segmentation control information; a second layer processing unit for receiving, from the third layer processing unit, a third layer data unit, segmenting the third layer data unit based on a resource allocation and forming a plurality of second layer data units including the respective segments of the third layer data unit and the segmentation control information which is modified if re-segmentation is to be applied; and a first layer processing unit for receiving from the second layer one or more of the plurality of the second layer data units and mapping the one or more of the plurality of the second layer data units onto the resources allocated for data transmission.

According to another embodiment of the present disclosure, a data transmitting node is provided for transmitting data over a wireless interface in a communication system to a data receiving node, comprising: a third layer processing unit for performing an automatic repeat request, ARQ, retransmission according to a status report fed back from the data receiving node; a second layer processing unit for receiving, from the third layer processing unit, a third layer data unit, segmenting the third layer data unit according to the status report and based on a resource allocation and forming a plurality of second layer data units including the respective segments of the segmented third layer data unit; and a first layer processing unit for receiving from the second layer one or more of the plurality of the second layer data units and mapping the one or more of the plurality of the second layer data units onto the resources allocated for data transmission.

According to another embodiment of the present disclosure, a data receiving node is provided for receiving data over a wireless interface in a communication system from a data transmitting node, comprising: a first layer processing unit for de-mapping one or more of a plurality of second layer data units from the resources allocated for data transmission and for providing the one or more of the plurality of the de-mapped second layer data units to a second layer processing unit; the second layer processing unit for performing de-multiplexing of a plurality of third layer unit segments and segmentation control information from the one or more of the plurality of second layer data units, and forwarding the plurality of the demultiplexed third layer unit segments together with the segmentation control information to a third layer processing unit; the third layer processing unit for performing re-ordering of the plurality of the demultiplexed third layer unit segments and assembly of the demultiplexed third layer unit segments into a third layer data unit.

Moreover, a method is provided for transmitting data over a wireless interface in a communication system to a data receiving node, comprising: performing a third layer processing including performing an automatic repeat request, ARQ, retransmission according to a status report fed back from the data receiving node and for re-segmenting or not data to be retransmitted based on segment length information included in the status report including adding to the data a segmentation control information; performing a second layer processing including receiving, from the third layer processing unit, a third layer data unit, segmenting the third layer data unit based on a resource allocation and forming a plurality of second layer data units including the respective segments of the third layer data unit and the segmentation control information which is modified if re-segmentation is to be applied; and performing a first layer processing including receiving from the second layer one or more of the plurality of the second layer data units and mapping the one or more of the plurality of the second layer data units onto the resources allocated for data transmission.

Still further, a method is provided for transmitting data over a wireless interface in a communication system to a data receiving node, comprising: a third layer processing including performing an automatic repeat request, ARQ, retransmission according to a status report fed back from the data receiving node; a second layer processing including receiving, from the third layer processing unit, a third layer data unit, segmenting the third layer data unit according to the status report and based on a resource allocation and forming a plurality of second layer data units including the respective segments of the segmented third layer data unit; and a first layer processing including receiving from the second layer one or more of the plurality of the second layer data units and mapping the one or more of the plurality of the second layer data units onto the resources allocated for data transmission.

Furthermore, a method for receiving data over a wireless interface in a communication system from a data transmitting node, comprising: a first layer processing including de-mapping one or more of a plurality of second layer data units from the resources allocated for data transmission and for providing the one or more of the plurality of the de-mapped second layer data units to a second layer processing unit; the second layer processing including performing de-multiplexing of a plurality of third layer unit segments and segmentation control information from the one or more of the plurality of second layer data units, and forwarding the plurality of the demultiplexed third layer unit segments together with the segmentation control information to a third layer processing unit; the third layer processing including performing re-ordering of the plurality of the demultiplexed third layer unit segments and assembly of the demultiplexed third layer unit segments into a third layer data unit.

MAC Subheaders

MAC PDUs are byte aligned bit strings. One MAC PDU includes at least MAC subheaders associated with MAC control elements and/or MAC SDUs, and, if required, padding. A MAC control element is used for signalling between the MAC peers in the eNB and in the UE. A MAC SDU contains data from the higher layer (RLC), accordingly, MAC SDUs correspond to RLC PDUs. A RLC PDU contains user data from one service. The MAC PDU includes a sub-header for each MAC control element and for each MAC SDU.

Each sub-header includes a logical channel ID (LCID). In a sub-header associated with a MAC control element, the LCID points at the control element type of the respective MAC control element carried. In a sub-header associated with a MAC SDU, the LCID indicates the identity of the logical channel which the carried respective RLC PDU belongs to.

User Plane Protocol Stack

Figure 22:
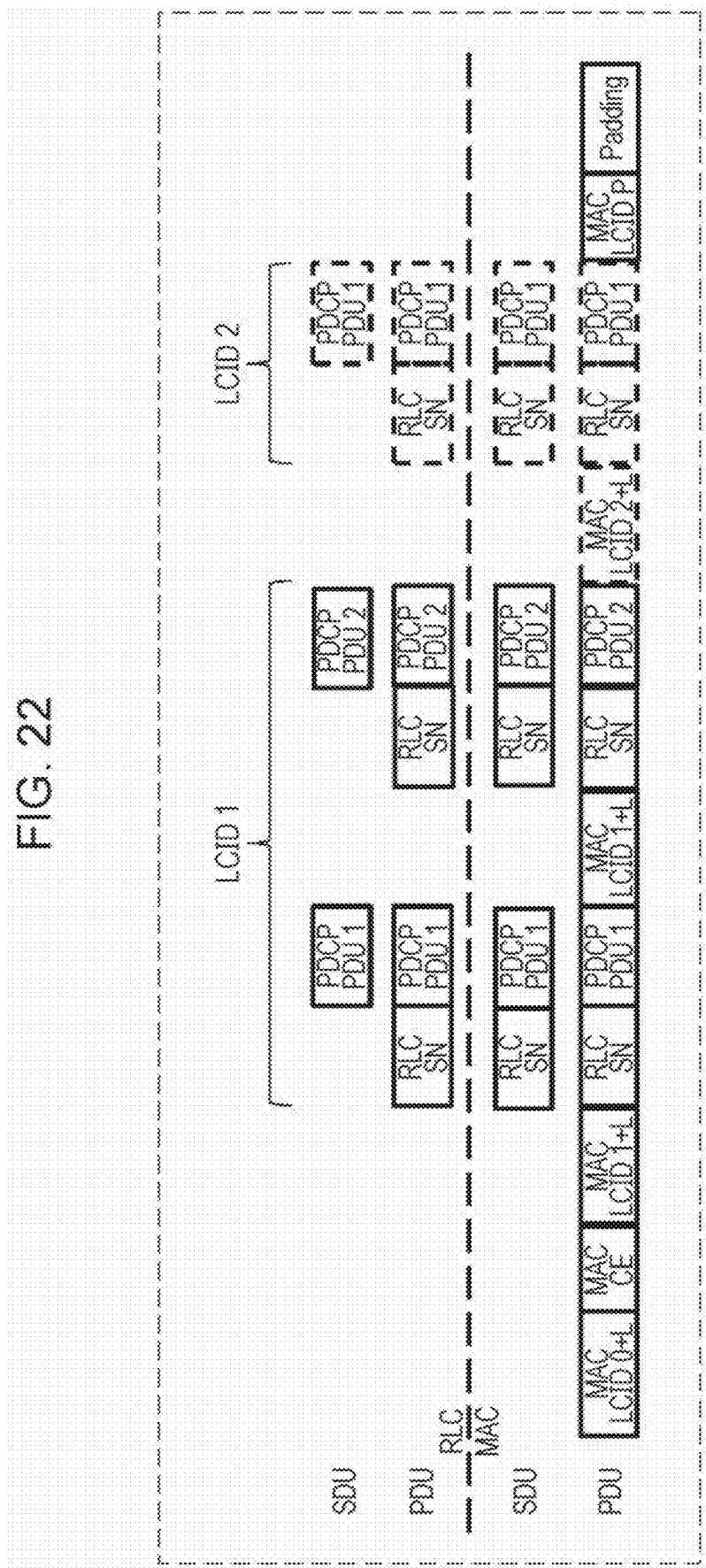
FIG. 22 is a schematic drawing showing an exemplary structure of the user plane protocol stack for NR.

FIG. 22 shows an exemplary structure of a user plane protocol stack. From top to bottom, the arrangement of different data units in the third layer and the second layer is shown. The top row refers to third-layer SDU, the second row refers to third-layer PDU, the third row refers to second-layer SDU, and the bottom row refers to second-layer PDU. In an embodiment shown in the drawing, the third layer corresponds to the RLC layer of the user plane, and the second layer corresponds to the MAC layer of a user plane. Not shown in the drawing is the fourth layer, which in the discussed embodiment corresponds to the PDCP layer of the user plane. The third layer and the second layer are visually separated by a dashed line.

Data units are passed from the RLC layer to the MAC layer through logical channels (LC). In FIG. 22, two logical channels with logical channel identifiers LCID1 and LCID2 are shown. Signaling and user data pertaining to the channel with LCID1 are marked by solid line frames, and data elements associated with LCID2 are marked by dashed line frames. As can be seen in the drawing, different amounts of data units may be provided through different logical channels. In the example shown, in the top-row associated with third-layer SDUs, two data units of the top row corresponding to third-layer SDU belong to a first logical channel with LCID1 (the data units labeled "PDCP PDU1" and "PDCP PDU2"), whereas one data unit belongs to a second logical channel with LCID2 ("PDCP PDU1"). Since third-layer SDUs can be identified by means of the corresponding logical channel, two third-layer SDUs operated by two different logical channels have the same label, "PDCP PDU 1" in the drawing. However, the present disclosure is not restricted to the case shown in FIG. 22; alternatively, different logical channels may operate the same amount of data to be allocated to a TB. There may be also only one logical channel or more than two logical channels.

Through the different logical channels with identifiers LCID1 and LCID2, fourth-layer PDUs (labeled PDCP PDU1, PDCP PDU2, and PDCP PDU1) are received by the third layer processing unit from the fourth layer processing unit to be processed as third-layer SDUs. By adding a third-layer header including a sequence number (referenced as "RLC SN") to each of the fourth-layer PDUs corresponding to third-layer SDUs, the third layer processing unit generates third-layer PDUs each of which consists of a third-layer header and a third-layer SDU. The third-layer PDUs are then forwarded to the second layer which receives them as second-layer PDUs. Although the third-layer SDUs shown in the second row are identical to the second-layer PDUs shown in the third row, these identical data units are shown twice in FIG. 22, which is only for reasons of illustration.

The second-layer processing unit receives second-layer SDUs from the third layer and generates a second-layer PDU, which is shown in the bottom row of FIG. 22, by concatenating one or more second-layer SDUs with some second-layer control information and possibly padding. In the generation of the second-layer PDU, different data elements are concatenated. In particular, second-layer subheaders are provided for the respective user data and control elements, labeled respectively "MAC LCID 0+L", "MAC LCID 1+L", "MAC LCID 2+L", "MAC LCID P". Here the labeling indicates that the subheader carries prioritization control information corresponding to the respective LCIDs (since priorities are assigned to the respective LCIDs) and the length information (L). The second-layer control elements (labeled "MAC CE") may be further inserted into the second-layer PDU as well as padding, if necessary. In the Fig., the padding at the end of the MAC PDU is shown with a corresponding subheader for the padding ("MAC LCID P"). A case in which padding is preceded by a corresponding subheader may be the Padding BSR which may be included in a MAC PDU instead of mere padding. For the Padding BSR, see also 3GPP TS 36.321 v 13.3.0, section 5.4.5.

It is noted that in some LTE versions, padding may have the corresponding subheader assigned, depending on the length of the padding. In particular, padding is inserted at the end of MAC PDU except when single byte or two bytes padding required. When single-byte or two-byte padding is required, one or two MAC PDU subheaders representing the padding are placed at the beginning of the MAC PDU before any other MAC PDU subheader.

In terms of the LTE terminology, FIG. 22 shows PDCP PDUs (representing respective RLC SDUs) of two different logical channels concatenated into a single MAC PDU. In this case, after concatenating the three MAC SDUs corresponding to the two logical channels and prepending to each of them the corresponding MAC subheader, there still is some place left in the allocated resources. In this place, one or more MAC CEs are advantageously inserted. If there is still some place left, padding is applied. Providing respective MAC subheaders instead of a single MAC header for the MAC PDU enables at least partial pre-processing of the MAC PDU.

Correspondingly, the user plane protocol stack shown in FIG. 22 and discussed above is an exemplary user plane protocol stack for NR. With such a user plane, pre-processing of third-layer headers and second-layer subheaders is possible. In particular, a second-layer SDU with its associated second-layer subheader can be delivered to the first layer before a complete TB (the complete MAC PDU) has been built. This, on the other hand, enables processing delay reduction.

The advantages related to the enabling of processing delay reduction mentioned above result from a suitable second-layer (MAC) PDU format, as is provided by the embodiments of the present disclosure. In the following, different alternative configurations of second-layer PDU formats are described with respect to FIGS. 23 to 30. Although it is assumed in these Figs. that the second layer corresponds to the MAC layer, the present disclosure is not restricted to the case in which the second layer is the MAC layer.

Figure 23:
FIG. 23 is a schematic drawing showing an exemplary MAC PDU format.

FIG. 23 is a schematic drawing showing an exemplary second-layer PDU corresponding to the user plane protocol stack described with respect to FIG. 22. The second-layer PDU includes two second-layer SDUs, two second-layer control elements (CE), the corresponding four respective second-layer subheaders, and padding. A respective secondlayer subheader is associated with each of the second-layer SDUs and with each of the second-layer control elements. Each of the second-layer subheaders precedes the second-layer SDU or, respectively, the second-layer control element with which it is associated. This association is indicated in the drawing by the arrows pointing from each second-layer subheader to the respective second-layer control element or second-layer SDU. The same arrow notation is used in the FIGS. 24 to 30 to denote the association of a second-layer subheader. In the second-layer PDU format shown in FIG. 23, the second-layer control elements are placed before all the second layer SDUs, i.e. before any of the second-layer SDUs. In other words, each of the second layer control elements precedes each of the second-layer SDUs. The padding is placed at the end of the second-layer PDU. However, in this second-layer PDU format, padding is a merely optional component of the second-layer PDU, only applicable if there is some remaining place left in the MAC PDU length corresponding to the allocated physical resources, the remaining place being too small to accommodate any other MAC SDU or MAC CE to be transmitted. This also applies to any second-layer PDU format according to any embodiment to be described in the remainder of this description.

In FIG. 23, number of second-layer PDUs and the number of second-layer control elements are both two. However, the present disclosure is not limited to a particular number of second-layer control elements or a particular number of second-layer SDUs. Rather than suggesting a particular number of second-layer control elements or second-layer SDUs, the drawing illustrates the particular order of second-layer subheaders, second-layer SDUs, second layer control elements, and the padding within the second-layer PDU.

As already mentioned with reference to FIG. 22, the arrangement of FIG. 23 provides the advantage that each MAC CE or MAC SDU with the respective corresponding subheader can be individually provided to the lower layer without waiting for the entire MAC PDU to be assembled.

A disadvantage of the second-layer PDU format of FIG. 23 is that as any second-layer control elements are placed before any second-layer SDUs, the second-layer processing unit can only deliver available second-layer SDUs to the physical layer after the second-layer control elements have been computed. However, in order to compute some MAC CEs, calculations such as prioritization procedure or the like should be terminated. On the other hand, preparation of some MAC SDUs may take less time. However, they cannot be provided to the physical layer before the MAC CEs have been calculated.

Efficient MAC Control Elements Signaling

Figure 24:
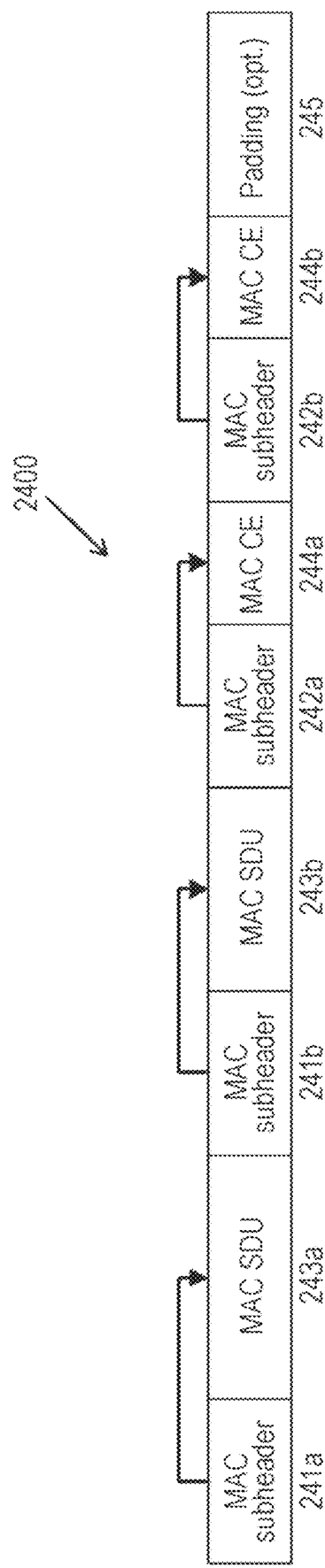
FIG. 24 is a schematic drawing of an MAC PDU format including MAC control elements following MAC SDUs.

In order to address the above mentioned disadvantage, FIG. 24 shows an advantageous embodiment of a MAC PDU, in which any MAC SDU precedes any MAC CE. In particular, the MAC PDU 2400 starts with a first MAC SDU 243a preceded by a subheader 241a associated therewith. The first MAC SDU is followed by a second MAC SDU 243b with is respective header 241b. In this example there are only two MAC SDUs, the logical channel ID (priority) of which may be signaled in their respective subheader. However, in the present embodiment, the MAC PDU may include more than two MAC SDUs. The MAC PDU 2400 further comprises a MAC subheader 242a associated with a first MAC CE 244a followed by the MAC subheader 242b associated with a second MAC CE 244b. The MAC subheaders 242a, 242b precede their respective MAC CE, 244a or 244b, with which they are associated. As shown in the drawing, the MAC CE 244a and the MAC CE 244b as well as their respective MAC subheaders 242a and 242b follow any of the MAC SDU 243a and the MAC SDU 243b and their respective subheaders 241a, 241b.

The present embodiment is not limited to the case in which there are two MAC CEs. There may be only one MAC CE or more than two MAC CEs. Further, a case is shown in the drawing in which the number of MAC CEs is equal to the number of MAC SDUs. However, the number of MAC CEs may be different from the number of MAC SDUs. In a MAC PDU according to the present embodiment, there may be fewer MAC CEs than there are MAC SDUs or, alternatively, there may be more MAC CEs than MAC SDUs. It is a feature of the embodiment that any MAC CE and any MAC subheader associated with any MAC CE follows any MAC PDU or any subheader associated with any MAC PDU. Optionally, padding 245 may be added. If the complete resources of a TB are used for MAC SDUs, MAC CEs, and their respective MAC subheaders, padding may be omitted.

In general, padding is inserted if, after mapping the MAC SDUs and the MAC CEs together with their respective MAC subheaders, there are still some free resources among the resources allocated for the transmission and these free resources are not enough to convey any further MAC CE or MAC SDU.

Figure 31:
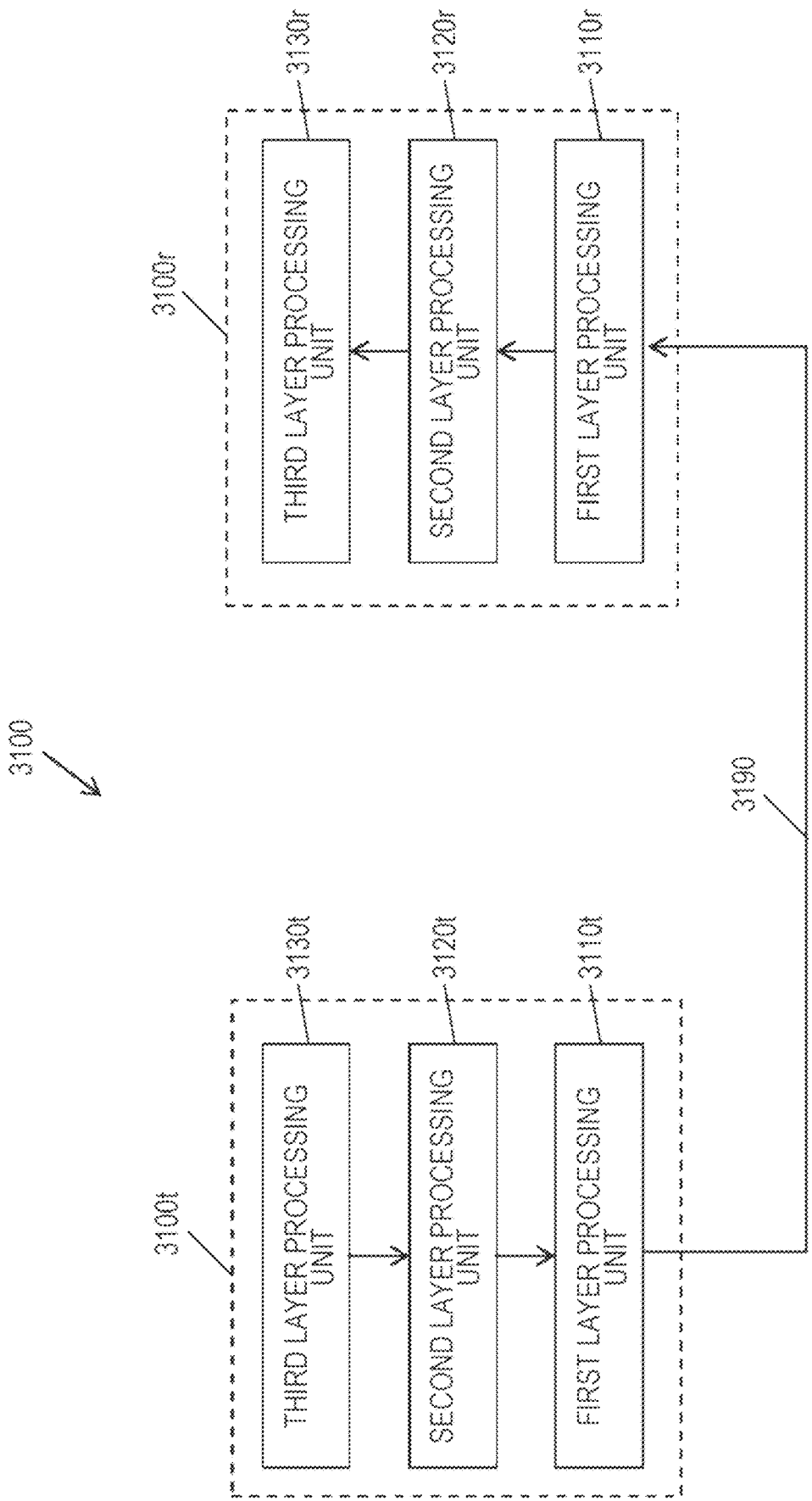
FIG. 31 is a schematic drawing of a data transmitting node and a data receiving node.

Thus, a data transmitting node for transmitting data over a wireless channel to a data receiving node in a communication system 3100 may generate the MAC PDUs as exemplified in FIG. 24, thereby enabling processing delay reduction. In particular, such a node may correspond to the device 3100t illustrated in FIG. 31, and comprise a second-layer processing unit 3120t and a first-layer processing unit 3110t. The second-layer processing unit 3120t is suitable for receiving, from a third layer processing unit 3130t, at least one second-layer service data unit, SDU, to be mapped onto a resource allocated for data transmission, and for generating a second-layer PDU. Such a second-layer PDU generated by the second-layer processing unit includes the at least one second-layer SDU received from the third layer and at least one second-layer control element, the at least one second-layer control element following any of the at least one second-layer SDU. The first-layer processing unit 3110t is suitable for receiving the second-layer PDU generated by the second-layer processing unit and mapping the second-layer PDU onto the resource allocated for data transmission.

On the other hand, a receiving node for receiving data over a wireless channel from a data transmitting node in a communication system 3100 node may receive and process the MAC PDUs as exemplified in FIG. 24, thereby enabling processing delay reduction. In particular, such a node may correspond to the device 3100r illustrated in FIG. 31, and comprise a first-layer processing 3110r unit and a second-layer processing unit 3120r. Therein, the first-layer processing unit 3110r is suitable for de-mapping at least one second-layer protocol data unit, PDU, from a resource allocated for data reception. Further, the second-layer processing unit 3120r is suitable for receiving and parsing the second-layer PDU de-mapped by the first-layer processing unit. Such a second-layer PDU received and parsed by the second-layer processing unit includes at least one second-layer SDU, to be forwarded to a third layer processing unit 3130r included in the data receiving node 3100r, and at least one second-layer control element, the at least one second-layer control element following any of the at least one second-layer SDU.

Advantageously, the second-layer PDU to be generated by the second-layer processing unit of the data transmitting node and, correspondingly, the second-layer PDU to be received and parsed by the second-layer processing unit of the data receiving node further include a respective second-layer subheader associated with each of the at least one second-layer SDU, and a respective second-layer subheader associated with each of the at least one second-layer control element. As mentioned above, providing a plurality of respective MAC subheaders within the MAC PDU rather than a single MAC header enables forwarding portions of the MAC PDU to the lower layers rather than the entire MAC PDU. This, on the other hand, allows for reducing the delay since some portions of the MAC PDU may be earlier processed by the lower layers.

It is noted that in some systems, subheaders for the MAC CEs and/or SDUs may be unnecessary. In LTE like systems, a subheader may typically include a channel type indication and a length indication. The channel type indication may serve for prioritization of the particular MAC PDU portions. The length indication specifies the length of the corresponding data portion such as length of the MAC SDU and/or MAC CE. However, in some systems, the MAC SDU may have a predefined length or a length configured in another way, so that the length indication may not be necessary, either.

Figure 25:
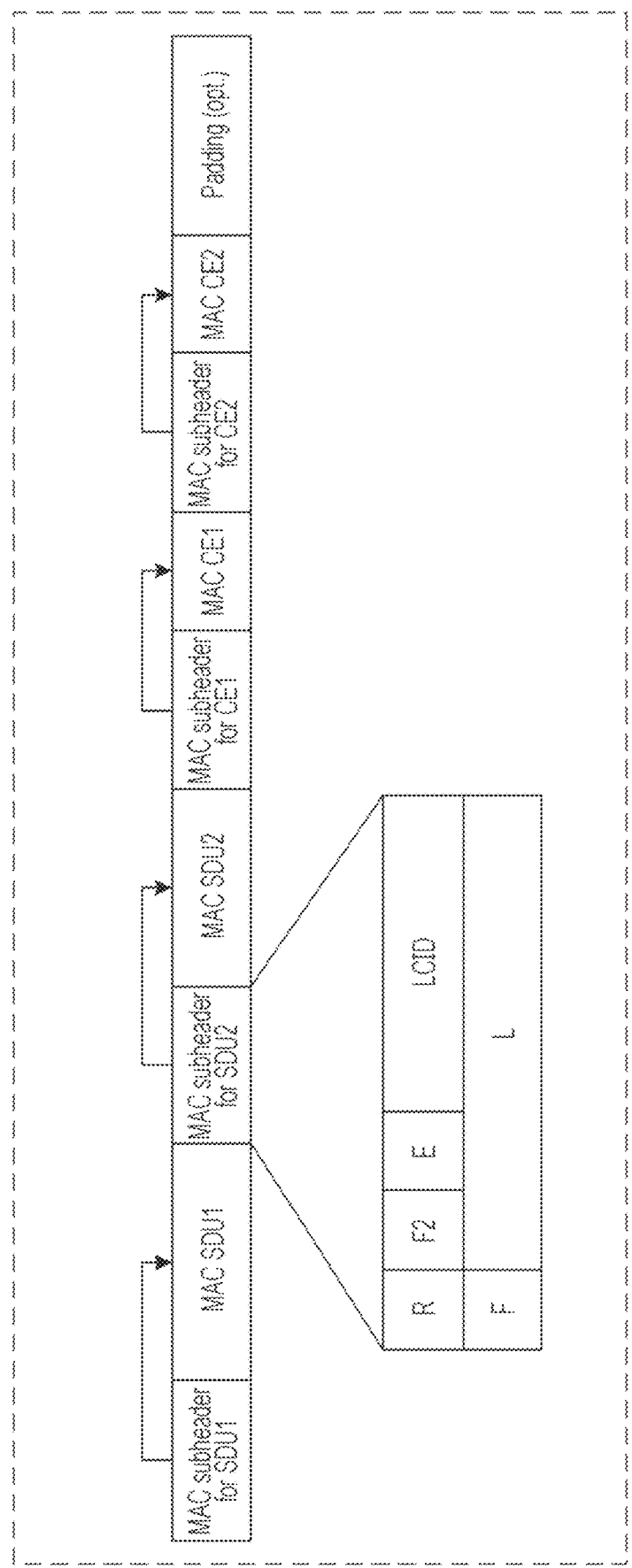
FIG. 25 is a schematic drawing showing another exemplary MAC PDU format and an exemplary structure of a MAC subheader.

FIG. 25 illustrates an example of a subheader format for a MAC SDU, which is similar to the format known from the current LTE standard (see also 3GPP TS 36.321 v 13.3.0 Section 6.2.1). A MAC PDU having the same format as shown in FIG. 24 is shown, and the format of a MAC subheader is exemplified by a MAC subheader associated with a MAC SDU (labeled MAC SDU2 in the drawing). This MAC SDU corresponds to the MAC SDU 243b, and its associated MAC subheader corresponds to the MAC subheader 241b shown in FIG. 24. Accordingly, a MAC subheader includes a reserved bits (R), a format2 field (F2), an extension field (E), a logical channel ID (LCD) field. It further includes a length field (L) and a format field (F) if the subheader is associated with a MAC SDU or a variable-sized MAC control element.

The extension field E may be a one-bit field. In the LTE, the one row R/F2/E/LCID is one octet (byte, i.e. 8 bits) long, wherein the R-field is one bit long, the F2 field is one bit long, the E-field is one bit long and the LCID is 5 bits long. Already in the LTE, F2=1 indicates that the size of the corresponding MAC SDU or variable-sized control element is larger than 32767 bytes (corresponding to 15 bits length field), and that the subheader is not the last subheader in the MAC PDU. The extension field E indicates the presence of another MAC subheader in the PDU. In particular, a value E=1 indicates that at least one more MAC sub-header including at least R/F2/E/LCID fields (and thus also possibly the corresponding SDU or CE) follows in parsing direction in the MAC PDU. The parsing direction in the LTE is assumed to be from the beginning of the MAC PDU (starting with the header) towards the end. This is also the case for FIG. 25, in which the parsing direction is from left to right.

In FIG. 24 such additional octet is shown in the second row of the subheader with the fields F and L. In general, if the header has only one octet, the length L field is not present. Thus, the length of the MAC SDU cannot be signaled. In LTE, a second octet is not included in the MAC subheader if the MAC subheader is associated with a fixed-length MAC control element. In this case, the length of the fixed-length MAC control element is known from the LCID which specifies type of the MAC control element. The F field indicates the length of the L field, which, in LTE, may be 7 bits or 15 bits long (thus extending over either one or two octets). The R field is reserved in the current LTE standard but may be replaced with another indicator or indicators in the upcoming versions of the standard. In other words, in a receiver working according to the current standard, the R-field is ignored.

As will be discussed below, the parsing direction may generally be from the start of the MAC PDU towards the end of the MAC PDU or vice versa, depending on the format of the MAC PDU.

For the fields of the MAC subheader in LTE, see also 3GPP TS 36.321 v 13.3.0 Chapter 6.2.1.

The LCID field has, for example, 5 bits as in LTE, and indicates the subheader type and the logical channel or, in case the subheader is associated with a control element, the control element type. Here, the subheader type means whether the subheader is a MAC CE subheader or a MAC SDU subheader or anything else (e.g. reserved, padding, etc.). Subheaders of the respective MAC CE types define the MAC CE type uniquely. For instance, "11101" stands for short BSR, "11010" stands for PHR, whereas "11011" stands for C-RNTI and "11111" stands for padding.

The length field L in LTE may have 7 or, alternatively, 15 bits, and it indicates the length of the MAC SDU, or respectively, the length of the MAC control element, depending on whether the sub-header is associated with a MAC control element or a MAC SDU. In the L field, the length of the MAC SDU or, respectively, the MAC control element is given in bytes. Further, the format field F may be a 1-bit field indicating the length of the L field. For example, a value F=0 may indicate that the L field has 7 bits, whereas F=1 may indicate that the L field has 15 bits.

However, it is noted that the present disclosure is not limited to the subheader format of the current LTE standard. The lengths and values of for the E, LCD, F and L field are examples corresponding to an advantageous implementation of a MAC subheader. However, a MAC subheader having a structure corresponding to an embodiment of the present disclosure may be implemented using different field lengths or variable values.

Figure 26:
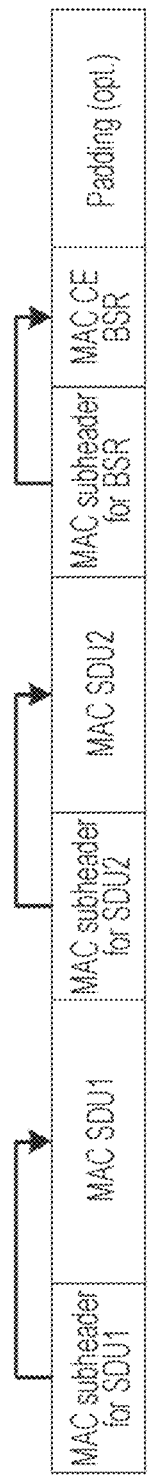
FIG. 26 is a schematic drawing showing an exemplary MAC PDU format including a Buffer Status Report MAC control element.

An exemplary MAC PDU according to an exemplary embodiment of the present disclosure is shown in FIG. 26. The format of the MAC PDU corresponds to the MAC PDU format shown in FIG. 24. The MAC PDU shown in FIG. 26 includes MAC SDUs and a MAC control element, all of which are preceded by their respective MAC subheaders. At the end of the MAC PDU, padding is shown as an optional component. In this example, only one MAC control element is shown, namely a BSR MAC control element. However, in correspondence with the MAC PDU format illustrated in FIG. 24, the MAC control element and its respective MAC subheader are placed after each MAC SDU (MAC SDU1 and MAC SDU2 in the drawing) and their respective MAC subheaders. Although not shown in the drawing, instead of a BSR MAC control element, a different type of MAC control element plus its associated subheader may also be placed after each MAC SDU and the respective MAC subheader of each MAC SDU included in a MAC PDU. For example, the MAC control element may also be a power headroom report, BSR (short, long or truncated) or C-RNTI. Accordingly, the second-layer control element is any one of a buffer status report, C-RNTI and a power headroom report and each second-layer subheader associated with any buffer status report, C-RNTI or power headroom report is placed after each of the at least one second-layer SDU.

In the MAC PDU according to the embodiment shown in FIG. 24, MAC CEs (for example, BSR MAC CEs, and PHR MAC CEs) and their associated MAC subheaders are always placed after any MAC SDUs, while MAC SDUs and their associated MAC subheaders are located at the beginning of a MAC PDU corresponding to a TB. Therefore, the beginning of the MAC PDU does not depend on the MAC CEs. For instance, it does not depend on the complete outcome of LCP in the case of the MAC CE being a BSR, and the calculation of the PHR depends upon PHY inputting this value to MAC. This independence allows for sending the beginning of MAC PDU (when the first MAC SDU is ready) to the first-layer (PHY) processing unit even before the MAC PDU has been fully constructed. Accordingly, the second (MAC) layer can start forwarding packets to the first (PHY) layer when the first second layer SDU is ready, and the second layer processing unit does not need to wait until it has assembled the entire second layer PDU before forwarding packets belonging the to the second layer PDU to the lower layer(s). It is beneficial for transmission processing delay reduction and allows more processing time for sender, i.e. the data transmitting node, to compute BSR and PHR, as both BSR MAC control elements and MAC PHR control elements are located at the end of a TB, i.e. after any MAC SDUs included in the MAC PDU.

An advantage of using a MAC PDU format as shown in FIGS. 24 and 26 and, correspondingly, a MAC subheader structure as shown in FIG. 25, is that most MAC subheaders and MAC SDUs except for the last one subjected to segmentation can be pre-processed. However, while such a MAC PDU format is transmitter friendly however, it might be important for the receiver to receive and process certain types of MAC CEs as soon as possible i.e. activation/de-activation MAC CEs and UE contention resolution MAC CEs in downlink (transmitted from eNB to the UE) or C-RNTI in uplink (from the UE to the eNB). Accordingly, in LTE this was the main reason to place MAC CEs before any MAC SDUs in a MAC PDU.

Figure 27:
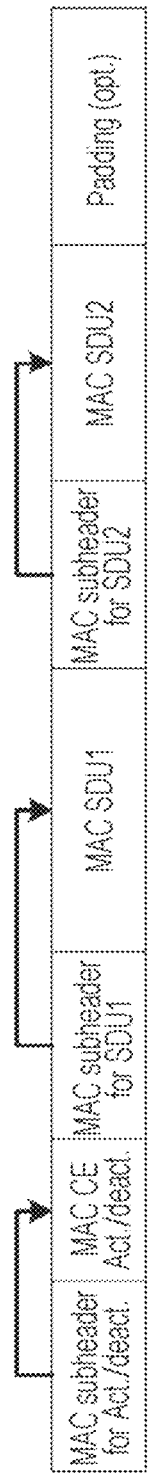
FIG. 27 is schematic drawing showing an exemplary MAC PDU format including an Activation/Deactivation MAC control element.

An early processing of MAC control elements of certain types (such as activation/de-activation MAC CEs and UE contention resolution MAC CEs in DL or the C-RNTI in UL) can be achieved through an embodiment of the present disclosure which is illustrated in FIG. 27. In the drawing, a MAC PDU is shown in which a MAC control element and its associated subheader are placed at the beginning of the MAC PDU, the MAC subheader preceding the MAC control element with which it is associated (in the direction of parsing which is here from the beginning of the MAC PDU towards the end). In particular, the MAC control element shown in the drawing is an activation/deactivation MAC CE. The activation/deactivation MAC CE precedes any MAC SDU and any MAC subheader associated with a MAC SDU. In the drawing, two MAC SDUs and their associated MAC subheaders are shown. However, the embodiment of the disclosure is not limited to the number of MAC SDUs being two. Alternatively, there may be only one MAC SDU or more than two MAC SDUs included in the MAC PDU. Although the MAC control element shown in the drawing is an activation/deactivation CE, a UE contention resolution MAC CE and its associated subheader or the C-RNTI with its subheader may instead or in addition be placed at the beginning of a MAC SDU, i.e. before any MAC SDU and any MAC subheader associated with a MAC SDU. As shown in the drawing, a MAC SDU in the present embodiment may end with padding, if necessary.

In other words, depending on the type of the MAC CE, the MAC CE is placed either before or after any MAC SDUs when assembling the MAC PDU. The MAC CE type may be defined in the respective MAC CE subheader, for instance within the LCID field.

Different types of MAC CEs may be included in a MAC PDU, of which one type is advantageously placed at the beginning of the MAC PDU, i.e. before any MAC SDU, and another type is advantageously placed at the end of the MAC PDU, i.e. after any MAC SDU. Therefore, in an exemplary embodiment of the disclosure, in addition to at least one second-layer control element which is placed after any second layer SDU, the second-layer PDU further includes a second-layer control element which is placed before any second-layer SDU. A second-layer subheader associated with the second-layer control element placed before any second layer SDU may further be included and placed before the respective second-layer control element at the beginning of the second-layer PDU.

Figure 33:
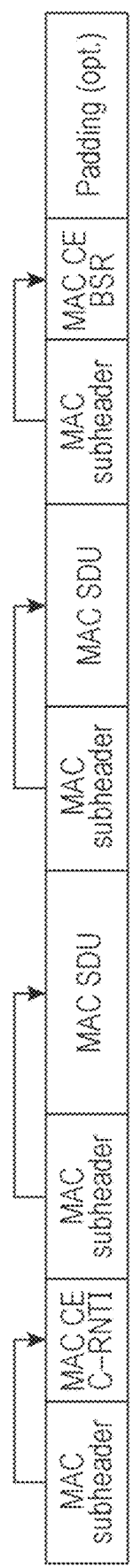
FIG. 33 is a schematic drawing showing an exemplary PDU format including MAC control elements at the beginning and at the end.

An example of a MAC PDU format according to this embodiment is illustrated in FIG. 33. At the beginning of the MAC PDU, there is a MAC CE, namely a C-RNTI MAC CE, which is preceded by the subheader associated with this C-RNTI MAC CE. After the C-RNTI MAC CE, two MAC SDUs are included in the MAC PDU, each of which is preceded by a respective associated MAC subheader. However, the disclosure is not limited to the number of second-layer SDUs being two, there may be one or more than two second-layer control elements. After the last MAC SDU, a further MAC CE is included and preceded by its respective associated MAC subheader. In the example shown in the drawing, this MAC CE is a BSR MAC CE. However, the disclosure is not limited to the MAC CE before any MAC SDU being a C-RNTI MAC CE, and the MAC CE after any MAC SDU being a BSR MAC CE. Instead of a C-RNTI, there may be, for example, an activation/deactivation MAC CE, and instead of the BSR MAC CE, there may be, for example, a MAC PHR control element. Furthermore, instead of one MAC CE placed before and one MAC CE placed after each MAC SDU, there may be two or more MAC CEs placed before and/or after any MAC SDU. Optionally, after the MAC CE placed after each MAC SDU, padding is included at the end of the MAC PDU. The present disclosure is not limited to the CEs currently defined by the LTE but is also applicable to any CEs of any systems. In general, CEs which require longer calculation time or input from other layers may be advantageously placed at the end of the MAC PDU, while CEs which are available may be placed at the beginning of the MAC PDU.

A MAC PDU format as shown in FIG. 33 may advantageously be used in a transmitter/receiver system that allows forwarding of parts of a TB instead of forwarding only complete TBs to lower/higher layers. For instance, the TB may be subdivided into a plurality of parts which become individual codewords and may also be provided by respective CRCs.

Thus, when the MAC PDU is divided among different parts of the TB and MAC CEs such as C-RNTI MAC CEs are placed at the beginning of the MAC PDU, these MAC CEs can be processed at the transmitter by the PHY layer within codewords without having to wait for completion and forwarding of the entire TB.

At the receiver side, one or more of the codewords may be received individually and their CRC may be checked. Then, the PHY may forward the individual correctly received codewords to the MAC before the entire TB has been received correctly. This is advantageous, since the MAC CE located at the beginning of the MAC PDU (e.g. the C-RNTI) may be extracted in the MAC layer before the remaining TB codewords have been correctly received and passed to the MAC. However, if not all codewords pertaining to the TB have been received correctly, i.e., the TB has not been received successfully, the entire TB is discarded, i.e. also the already parsed (preprocessed) parts such as MAC CEs and MAC SDUs.

It is noted that the above layer processing is exemplary. The present disclosure may also be applied to other system designs in which the transport block corresponds to one codeword and is not processed in multiple individual parts.

Accordingly, the receiver does not need to wait until the end of the TTI before it can process the respective MAC CE. Thus, for the C-RNTI MAC CE (or another MAC CE such as an activation/deactivation MAC CE), preparation processing is possible.

Thus, it may be advantageous if the data transmitting and/or receiving device is capable of generating and transmitting or receiving both, the MAC CEs located before the MAC SDUs and MAC CEs located after the MAC SDUs. It is noted that in general, the data transmitting device may be the terminal in uplink or the base station in downlink.

In an embodiment of the present disclosure, a data transmitting node for transmitting data over a wireless channel to a data receiving node in a communication system may include a second-layer processing unit which is configurable to generate different types of second-layer PDUs. In particular, it may be suitable for generating a first-type second-layer PDU which includes at least one second layer SDU and at least one second layer control element, the at least one second-layer control element following any of the at least one second-layer SDU. It may be further configurable to generate a second-type PDU which includes at least one second layer SDU and at least one second layer control element, the at least one second-layer control element preceding any of the at least one second-layer SDU.

As discussed above, some MAC control elements are advantageously placed after any MAC SDUs in a MAC PDU, whereas other MAC control elements are advantageously placed before any MAC SDU. For this reason, an embodiment of the present disclosure provides a second-layer processing unit which is configurable to generate a second-layer PDU including a type-switching second-layer control element (type-switching MAC CE) indicating whether the second-layer PDU including the type-switching second-layer control element is a first-type second-layer SDU or a second-type second-layer SDU. The type-switching second-layer control element precedes any second-layer SDU and any second-layer control element different from the type-switching second-layer control element. The second-layer PDU further includes a second-layer subheader associated with and preceding the type-switching second-layer control element. The second-layer subheader associated with the type-switching second-layer control element precedes the second-layer type-switching control element. However, it is noted that the explicit type switching MAC CE is only an example. Such MAC CE is not necessary to decide whether to generate a MAC PDU with the CEs at the beginning or at the end. Such decision may be made solely based on the type of the MAC CE(s) to be included into the MAC PDU according to some predefined (fixed) rules.

Moreover, it is noticed that in general, a MAC PDU may also include both MAC CEs located before the (any) MAC SDUs and MAC CEs located after any MAC SDUs. There may also be a difference between the uplink and downlink. For instance, in downlink, the MAC CEs may always be located at the beginning (i.e. preceding any SDUs) whereas in uplink the type of MAC CE determines whether it is mapped before or after the SDUs.

In general, in the downlink, a data transmitting node for transmitting data over a wireless channel to a data receiving node in a communication system may be a base station. A data receiving node for receiving data over a wireless channel from a data transmitting node in a communication system in downlink may be a UE. As described above, for the uplink, the data transmitting node may be a UE and data receiving node may be the base station (eNB).

Generally, a UE and/or the base station may be capable of operating as both the data transmitting and the data receiving node. In particular, the UE may be capable of generating the MAC PDU with CEs placed after any SDUs as well as capable of receiving MAC PDUs with MAC CEs placed at the beginning of the MAC PDU. Similarly, the base station may be capable of transmitting MAC PDU with CEs at the beginning and receiving MAC PDU with CEs at the end. However, it is noted that the present disclosure is not limited to such combinations and both directions may support or be configurable to support either or both of placing MAC CEs at the end or at the beginning of the MAC PDU, possibly depending on the type of the MAC CEs. It is noted that in general, it is also possible to include MAC CEs on both ends of the MAC PDU, depending on their type.

In the embodiments illustrated in FIGS. 23 to 27, MAC subheaders are placed respectively before the MAC SDU or the MAC control element they are associated with. This arrangement of MAC subheaders in a MAC PDU allows the MAC subheaders to be processed as early as possible by a receiver, provided the MAC PDU is parsed in the direction from the beginning to the end by the receiver (the direction pointing from left to right in FIGS. 23 to 30). However, in some cases it may be advantageous to start parsing a MAC PDU starting from the ending of the MAC PDU towards the beginning (in the figures from right to left). In particular, when control elements are available at the end of a MAC PDU, they can be processed early at the receiver, if the MAC PDU is parsed starting from the end.

When a receiver parses a MAC PDU from its end (backward), a MAC subheader associated with a MAC control element can be processed early if it is placed after the respective control element (or, in other words, before the respective control element in the direction of parsing). To achieve such an early processing of a MAC subheader associated with a MAC control element, an embodiment of the present disclosure provides a data transmitting including a second-layer processing unit for generating a second-layer PDU including at least one second-layer SDU and at least one second-layer control element and second-layer subheaders associated respectively with the second-layer SDU and the second-layer control element, wherein at the at least one second-layer SDU is preceded by the respective associated subheader and the at least one second-layer control element is followed by the respective associated subheader.

Figure 28:
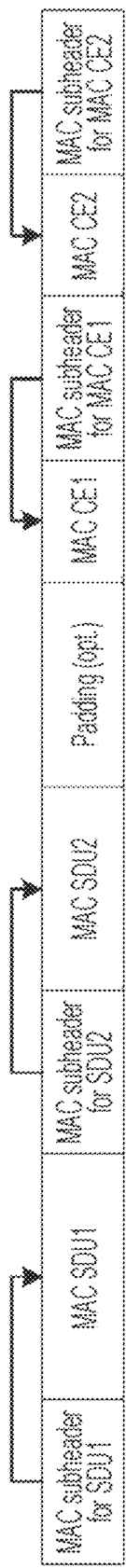
FIG. 28 is a schematic drawing showing an exemplary MAC PDU format for processing in both directions.

The format of such a second-layer PDU is illustrated in FIG. 28. In particular, the drawing shows a MAC PDU including two MAC SDUs, MAC SDU1 and MAC SDU2. MAC SDU1 and MAC SDU2 are directly preceded by their respective associated subheader. The number of MAC SDUs shown in the drawing is only exemplary. Alternatively there may be one MAC SDU, three MAC SDUs ore more than three MAC SDUs included in the MAC PDU. The MAC PDU further includes two MAC control elements, MAC CE1 and MAC CE2 that follow each MAC SDU and each subheader associated with a MAC SDU, and MAC subheaders respectively associated with these MAC control elements. Padding may also be included in the MAC PDU.

However, if a receiver starts parsing a MAC PDU at its end, the processing of MAC control elements and their associated subheaders is delayed when the padding is placed at the end of the MAC PDU, i.e. after any MAC control element. Thus, instead of placing the padding at the end, it may be placed between the MAC SDUs with their associated subheaders and the MAC control elements and their associated subheaders. Such location is also beneficial since when starting the parsing at the end of the PDU, the length of the padding is generally not known so that the parsing is not possible without obtaining the padding length information in some way (for instance by signaling information).

An example of this arrangement of the padding is shown in FIG. 28, where the padding is directly preceded by MAC SDU2 and directly followed by MAC CE1. The subheader associated with MAC CE1 is placed after MAC CE1, and the subheader associated with MAC CE2 is placed after MAC CE2. This corresponds to pre-pending the subheader to the respective MAC CE in the parsing direction, which is here reversed, i.e. from the end of the MAC PDU to the beginning, at least for all MAC CEs. It is noted that the MAC SDUs may be parsed in the usual (forward) direction from the beginning towards the end of the MAC PDU.

For example, the two MAC control elements may be a BSR MAC control element or a PHR MAC control element. The disclosure is not limited to the MAC PDU having two MAC control elements. Alternatively, there may be three or more MAC control elements ore one MAC control element, which, for example, may be a BSR MAC control element or a PHR MAC control element.

In order to parse a MAC PDU in an efficient and time-saving way, it is helpful if the receiver can determine at an early stage of parsing if MAC control elements are available in the MAC PDU. Especially if the MAC CEs are located at the end of the MAC PDU, with such an indication, the receiver may start parsing the MAC CEs from the end of the MAC PDT backwards. Information on the availability of a further MAC control element can be included in a MAC subheader.

For this reason, in an exemplary embodiment, the first second-layer subheader comprised by the second-layer PDU as discussed previously includes a presence indicator indicating whether the second-layer PDU includes at least one second-layer control element.

Alternatively, all of the second-layer subheaders comprised by the second-layer PDU may include the presence indicator. This solution enables maintaining the subheader format independent of the position of the SDU/CE within the PDU. In this way, it is also compliant with the MAC subheader in current the LTE specifications. On the other hand, including the presence indication only into the first subheader of the MAC PDU may be more efficient regarding the resource utilization.

Figure 29:
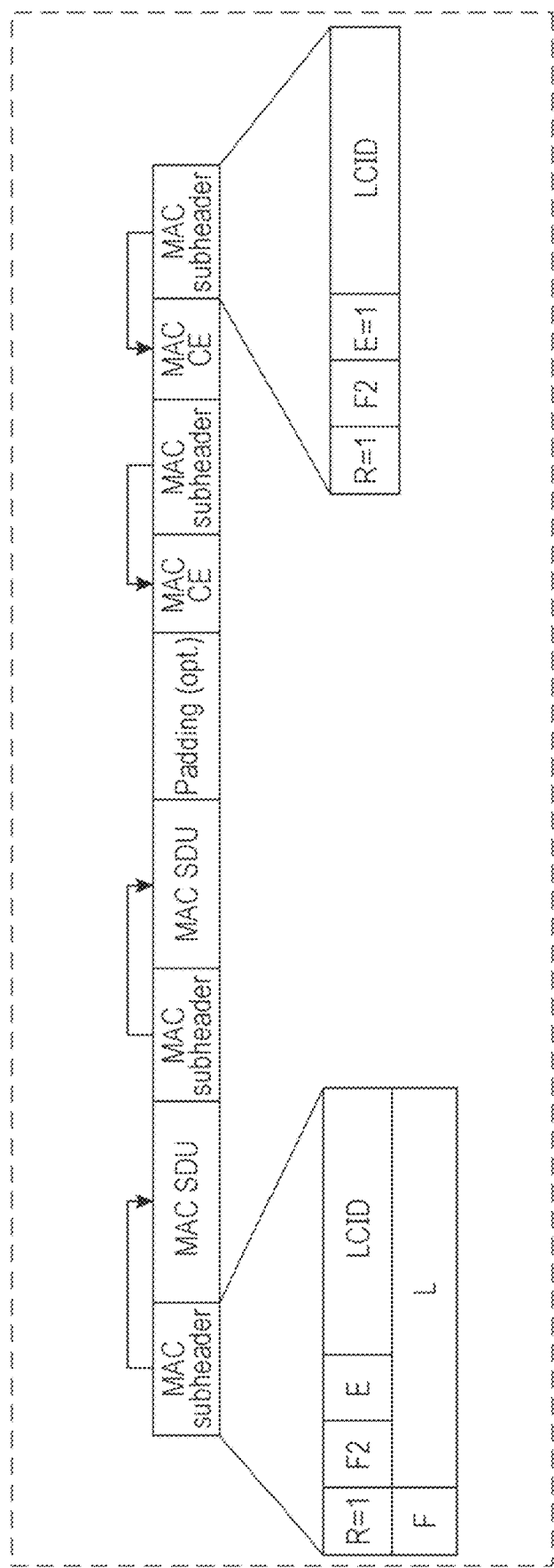
FIG. 29 is a schematic drawing showing the MAC PDU format of FIG. 28 and MAC subheaders including flags which indicate the presence of MAC control elements and of further MAC subheaders.

An example of such a presence indicator is shown in FIG. 29. In the drawing, a MAC PDU format is illustrated which is similar to the MAC PDU format shown in FIG. 28. Accordingly, at the beginning of the MAC PDU there is a MAC subheader associated with and preceding a MAC SDU, and at the end there is a MAC subheader associated with and following a MAC control element. For the MAC subheader at the beginning and the MAC subheader at the end of the MAC PDU, the structure of the MAC subheader is further illustrated. As already shown in FIG. 25, the MAC subheaders include a reserved bit (R), an F2 bit an extension field (E), and a LCD. The configurations of R, F2, E, and LCID are same as the configurations discussed with respect to FIG. 25. The first MAC subheader, which is associated with a MAC SDU, further includes a second octet comprising an F field and an L field. Such a second octet is not shown for the last MAC subheader shown in the drawing. It can be assumed that this MAC subheader is associated with a fixed-length MAC CE of which the size is known based on the LCID, although the embodiment also includes the case of variable-sized control elements in which a second octet and in some cases a third octet must be included in the MAC subheader. However, the first reserved bit is now used to indicate if there are MAC control elements in the MAC PDU. Here it is assumed that if there are MAC CEs (at least one) in the MAC PDU, they are placed at the end. Accordingly, the presence indicator can be used to instruct the receiver to parse the MAC CEs (and their respective headers) from the end of the MAC PDU in the backward direction, i.e. from the end of the MAC PDU. Accordingly, one of the R bits included in the MAC subheader at the beginning and/or all MAC subheaders of the MAC PDU is set by the transmitter.

For example, as shown in FIG. 29, R=1 means that MAC control elements are available in the MAC PDU and R=0 means that no MAC control elements are available. In the drawing, an R bit in both the first and the last MAC subheader of the MAC PDU is shown to be set R=1, assuming that the remaining subheaders have the same format and R field also set (R=1). However, the disclosure is not limited to the case in which an R bit in all MAC subheaders is set to one. Alternatively, for example, only an R bit in the first MAC subheader may be set to indicate whether the MAC PDU includes a MAC control element. In other words, it is sufficient if the R field is presented in the starting subheader, i.e. the subheader which is parsed first, however it can also be set in all subheaders.

In FIG. 29, a case is shown in which the E bit in the last MAC subheader of the MAC PDU is set to 1. As discussed above with regard to the structure of the MAC subheader, a value E=1 indicates that at least one more MAC subheader is present in parsing direction. Since the parsing starts from the end, the at least one more MAC subheader can be identified with the MAC subheader associated with the MAC control element before the last MAC control element (which corresponds to MAC control element "CE1" from FIG. 28). Thus, in this drawing, the right utmost MAC subheader has the E field set to 1 meaning that the corresponding MAC CE is followed (in the backward parsing direction) by a second subheader associated with a second MAC CE. In the second subheader, the E-field is set to 0 since in the backward parsing direction, there is no further subheader, but rather only the (optional) padding.

It is also noted that the parsing of the MAC PDU of FIG. 29 at the receiver starts with the first subheader of the first SDU. Since R=1, the parsing then advantageously continues from the end of the MAC PDU backward as described above. After the MAC CEs are extracted, the parsing of the SDUs may be resumed from the beginning (left hand side of the drawing). However, it is noted that this is only an advantageous example of the parsing. The MAC PDU format also allows for parsing the SDUs first and then parsing the MAC CEs from the end towards the beginning of the MAC PDU.

Thus, the present disclosure also provides a receiver that is able to start parsing a MAC PDU from the beginning when no MAC control elements are available, and from the ending when at least one MAC control element is available. In an embodiment, a data receiving node includes a second layer processing unit for receiving and parsing a second-layer PDU, wherein the second layer processing unit parses the second-layer PDU starting from the end of the second-layer PDU when the presence indicator indicates that at least one second-layer control element is included in the secondlayer PDU. For example, the second-layer processing unit of the receiver may be configured to parse a second-layer PDU starting from the beginning by default. Thus, when it starts parsing, it evaluates the presence indicator (such as one predefined R bit in the current LTE specification) in the first subheader. If the R bit has the value R=1, indicating that a MAC control element is included in the MAC PDU, it parses the MAC PDU from its end, deviating from the default setting. It is noted that using the reserved bit R is an advantageous option to provide a presence indicator for indicating whether in the MAC PDU there are MAC CEs present. However, the present disclosure is not limited thereto and the presence indicator may be introduced in another way, for instance, by providing a longer MAC subheader. As also mentioned above, the present disclosure is not limited to the format of the subheader as defined by the LTE.

Alternatively, the second-layer processing unit may be configured to start parsing the MAC PDU from the end by default. In this case, when it starts parsing, it evaluates the MAC subheader at the end of the MAC PDU. When it evaluates the R bit in this subheader and detects the value R=1 indicating that there are MAC control elements in the MAC PDU, it continues parsing the MAC PDU from the end.

When the MAC PDU is parsed from the end, the individual octets of MAC subheaders and MAC control elements may be ordered from both directions. In other words, if the MAC PDU is parsed in backward direction, the bit ordering within the individual MAC subheaders and MAC CEs which are to be parsed in backward direction may or may not be also reversed. However, the direction in which the receiver reads the individual MAC subheaders and MAC control elements must be known to the receiver.

Thus, in an embodiment, a transmitting node is disclosed, which includes a second-layer processing unit for generating a second-layer PDU including at least one second-layer subheader and at least one second-layer control element, and subheaders associated respectively with the at least one second-layer SDU and the at least one second-layer control element, wherein the at least one second-layer SDU is preceded by the respective associated subheader and the at least one second-layer control element is followed by the respective associated subheader.

The MAC PDU format shown in FIGS. 28 and 29 implicates advantages that are associated with both the receiver and the transmitter. The receiver is able to parse the MAC PDU from the end in order to quickly process the MAC CEs if it present.

The transmitter, on the other hand, has more processing time for the computation of MAC CEs since they are placed after any MAC SDUs.

Figure 30:
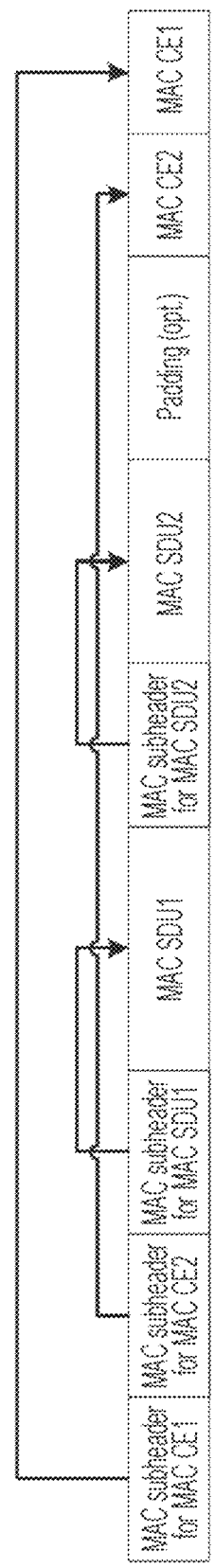
FIG. 30 is a schematic drawing showing yet another exemplary MAC PDU format.

Another exemplary embodiment of the disclosure is illustrated in FIG. 30. The drawing shows a PDU format in which the MAC control elements are placed after any MAC SDU, whereas the MAC subheaders associated with the MAC control elements are placed before any MAC SDU. In particular, the MAC PDU illustrated in the drawing includes two MAC SDUs, SDU1 and SDU2, which are both preceded respectively by their associated subheaders. Furthermore, the MAC PDU includes two MAC control elements, to each of which a respective MAC subheader is associated. However, instead of being placed directly before the associated MAC control elements, the MAC subheaders associated with the MAC control elements are placed before the MAC SDUs (all of them within the MAC PDU) at the beginning of the MAC PDU. In other words, the MAC SDUs and their associated subheaders are preceded by the MAC subheaders associated with the MAC control elements, but followed by the respective MAC control elements themselves as the MAC CEs are placed after any SDUs and their respective headers and, in this example, also after the padding. In the example shown in the drawing, the MAC subheader for MAC CE1 precedes the MAC subheader for CE2, which in return precedes MAC SDU 1, MAC SDU2, and the subheaders associated with the MAC SDUs. Furthermore, although the subheader for MAC CE1 precedes the subheader for MAC CE2, the MAC control element MAC CE1 follows the MAC control element CE2. This has the advantage of an efficient parsing at the receiver. The parsing starts from the beginning of the MAC PDU and thus, the subheader of a first MAC CE1 is read. Then, the parser may "chop" (extract) the corresponding MAC CE1 from the end of the MAC PDU immediately without waiting for further parsing. The parsing continues then with the next subheader pertaining to a second MAC CE2. After parting this subheader, the second MAC CE2 can be chopped from the end of the MAC PDU. Similarly, if there are more than two MAC CEs, their subheaders are ordered sequentially at the beginning of the MAC PDU while the MAC CEs themselves are ordered from the end of the MAC PDU backwardly in the same sequence.

However, the disclosure is not limited to this particular order. Alternatively, The, the MAC subheaders associated with MAC control elements may be arranged in the same order as the MAC control elements with which they are associated. Furthermore, the embodiment is not limited to the MAC SDU including two MAC SDUs and two MAC control elements; the numbers of MAC SDUs and MAC control elements may be different from two and different from each other. Padding is optionally included in the MAC PDU, if some resources are left in a TB. In the drawing, the padding is placed between the MAC SDUs and the MAC control elements, which enables parsing from both sides of the MAC PDU without requiring the knowledge of padding length.

It is noted that the advantage of the present disclosure is provided by the organization of the MAC PDU. The receiver must be capable of parsing it to obtain the CEs and the SDUs. The way in which the parsing is performed is not to limit the present disclosure. For instance, even in the embodiment of FIG. 30, the receiver may merely parse the MAC PDU from the beginning to the end (left to right in the drawings). Nevertheless, additional advantages may be achieved if the receiver utilizes the possibility of parsing the MAC CEs at first and then parsing the remaining MAC PDU parts (SDUs, padding).

Moreover, the embodiment of FIG. 30 does not require any presence indicator, since the headers of the MAC CEs are ordered at the beginning of the MAC PDU so that the presence of the MAC CEs is indicated by the presence of the specific corresponding subheaders.

In other words, according to an embodiment, each second-layer subheader associated with any of the at least one second-layer control element precedes each second-layer SDU and the respective subheader associated with each second-layer SDU. At the same time, advantageously, the second-layer control elements are located after any second-layer SDUs.

Thus, a receiver may be provided, of which the second-layer processing unit is configured to parse from the beginning of the second-layer PDU a subheader associated with a second-layer control element and to extract from the second-layer PDU said second-layer control element places after the second-layer SDU(s).

In the subheaders, the LCIDs indicate whether subheaders belong to MAC CEs or MAC SDUs. In a telecommunication system with a PDU structure as shown in FIG. 30, the receiver parses the MAC PDU from the beginning. If a sub-header belongs to a MAC CE, then the receiver retrieves MAC CEs from the end of the MAC PDU, and if a sub-header belongs to a MAC SDUs, then it starts processing of SDUs from beginning.

An advantage this embodiment with regard to the transmitter side is that the transmitter has more processing time for the computation of MAC CEs since they are placed after any MAC SDUs. Additionally, available MAC SDUs can be already delivered to PHY processing before TB construction is completed. An advantage with regard to the receiver side is that the receiver can process the MAC CEs quickly since associated MAC headers are placed at the beginning of TB. MAC subheaders for BSR MAC CEs are advantageously placed after any MAC SDU, since the existence of a BSR is only known to the UE after the LCP has been finalized.

As shown in FIG. 30, the MAC CEs can be located at the end of the MAC PDU. However, this is not necessarily the case is a padding CE is inserted into the MAC PDU. According to an embodiment, the second-layer PDU includes a padding buffer status report, BSR, and a second-layer subheader associated with the padding BSR, and the padding BSR and the second-layer subheader associated with the padding BSR are placed after any of the at least one second-layer SDU.

In particular, already in LTE, a so called padding BSR can be inserted into the MAC PDU. A padding BSR is a BSR which generally does not have to be included into the MAC PDU since it is not the periodic or the triggered BSR which is regularly or after triggering to be included into the MAC PDU. However, if the MAC PDU is assembled and there still is a portion of the resources allocated for this MAC PDU free and large enough to accommodate a BSR, then a "padding BSR" is inserted into the MAC PDU. Such padding BSR may have a LCID which is different from the LCIDs of non padding LCIDs and in particular may differ, for example, from the LCID values specified for different types of BSRs in Table 6.2.1-2 in 3GPP TS 36.321 v 13.3.0. Thus, if a padding BSR is included into the MAC PDU, it would be included in FIG. 30 after the MAC CE1, i.e. at the end of the MAC PDU together with its subheader.

Figure 32:
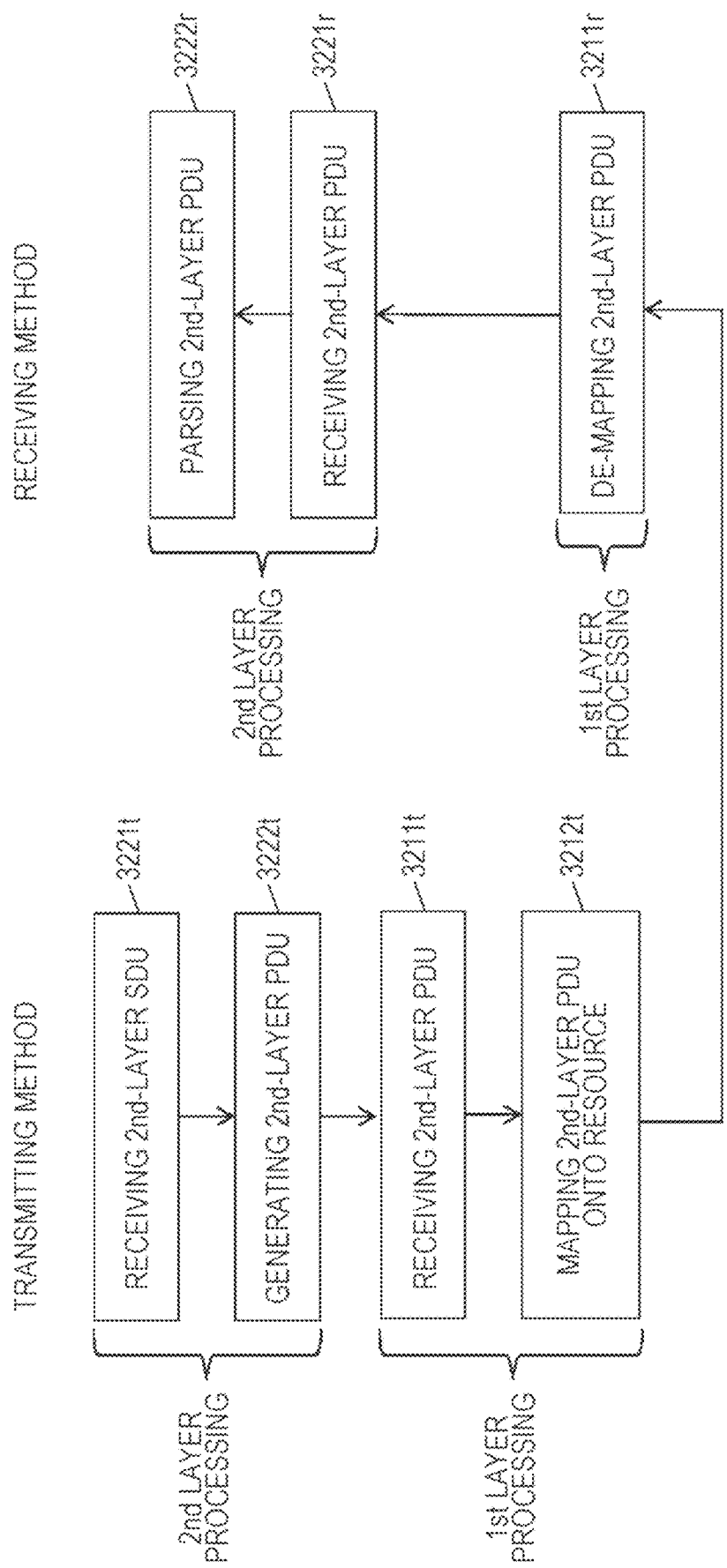
FIG. 32 is a flow chart illustrating a method for transmitting data and a method for receiving data.

Further, disclosed, as shown in FIG. 32, is a method for transmitting data over a wireless channel to a data receiving node in a communication system, comprising: receiving 3221t, from a third layer, at least one second-layer service data unit, SDU, to be mapped onto a resource allocated for data transmission, generating 3222t a second-layer protocol data unit, PDU, including said at least one second-layer SDU and at least one second-layer control element, the at least one second-layer control element placed after any of the at least one second-layer SDU, receiving 3211t the second-layer PDU generated by the second-layer processing and mapping 3212t the second-layer PDU onto the resource allocated for data transmission.

Additionally, a method for transmitting data over a wireless channel to a data receiving node in a communication system is disclosed which additionally comprises determining which type of second-layer control element is to be included in the second-layer PDU, and, dependent on the type of control element to be included, generate either a first-type second-layer PDU, or a second-type second-layer PDU. Therein, a first-type second-layer PDU includes at least one second layer SDU and at least one second layer control element, the at least one second-layer control element placed after any of the at least one second-layer SDU, and a second-type PDU includes at least one second layer SDU and at least one second layer control element, the at least one second-layer control element preceding any of the at least one second-layer SDU.

Additionally, a method for transmitting data over a wireless channel to a data receiving node in a communication system is disclosed, in which the following steps are repeatedly applied in an alternating order: generating packages that constitute parts of the second-layer PDU, and forwarding packages that constitute parts of the second-layer PDU to the first-layer processing unit. Accordingly, packages constituting parts of the second-layer PDU are forwarded to the first-layer processing unit before the generation of the second-layer PDU is completed. Such packages may be respective single SDUs or a plurality of SDUs with their respective subheaders and/or respective MAC CEs with their associated headers.

Also disclosed, as shown in FIG. 32, is a method for receiving data over a wireless channel from a data transmitting node in a communication system, comprising: de-mapping 3211r at least one second-layer protocol data unit, PDU, from a resource allocated for data reception, receiving 3221r and parsing 3222r the second-layer PDU de-mapped by the first-layer processing unit, the second-layer PDU including at least one second-layer service data unit, SDU, and at least one second-layer control element, the at least one second-layer control element following any of the at least one second-layer SDU.

In an embodiment of the disclosure, the method for receiving data includes the step of parsing the second-layer PDU from the beginning of the second-layer PDU (i.e. from the earlier received portion to the later received portion).

In another embodiment, the method for receiving data includes the step of parsing the second-layer PDU beginning from the end of the second-layer PDU until each subheader associated with a second layer CE, and each second-layer CE have been processed, and, after the processing of the second-layer CEs and the respective subheaders associated with second-layer CEs, parsing the remaining part of the second-layer PDU from the beginning, thereby processing the second-layer SDUs and the second-layer control elements associated with the second-layer SDUs. An advantage of this method is that second-layer control elements are processed more quickly if the second-layer PDU has the format illustrated in FIGS. 28 and 29, where the second-layer CEs and the subheaders associated with the second-layer CEs are placed after any of the at least one second-layer SDU, and no padding is placed after the second-layer CEs and the subheaders associated with the second-layer CEs.

For example, when the first or any second-layer subheader includes a presence indicator indicating whether the second-layer PDU includes at least one second-layer control element, the method for receiving data may include the step of parsing the second-layer PDU starting from the end of the second-layer PDU. An example of such a presence indicator is the R bit in the MAC subheader associated with the first MAC SDU in the MAC PDU of FIG. 29. Accordingly, after evaluating this R bit, in the case of R=1 follows the step of parsing the second-layer PDU from the end of the second-layer PDU, thus evaluating the MAC control elements and the MAC subheaders associated with MAC control elements.

Alternatively, in an exemplary embodiment, the method for receiving data includes the steps of parsing from the beginning of the second-layer PDU a subheader associated with a second-layer control element, and extracting from the second-layer PDU said second-layer control element placed after any second-layer SDUs. For example, this method is applicable for a second-layer PDU that has the format shown in FIG. 30. The steps of parsing beginning of the second-layer PDU a second-layer subheader associated with a second-layer control element and extracting ("chopping") the respective second-layer control element may alternate until all second-layer control elements have been extracted. Afterwards may follow the step of parsing the remaining part of the second-layer PDU from the beginning, thereby parsing at least one second-layer SDU and second-layer subheader or subheaders respectively associated with the at least one second-layer SDU.

Alternatively, in an exemplary embodiment, a data receiving node for receiving data over a wireless channel from a data transmitting node in a communication system is disclosed, comprising: first-layer processing circuitry for de-mapping at least one second-layer protocol data unit, PDU, from a resource allocated for data reception, second layer processing circuitry for receiving and parsing the second-layer PDU de-mapped by the first-layer processing circuitry, the second-layer PDU including at least one secondlayer service data unit, SDU, and at least one second-layer control element, the at least one second-layer control element following any of the at least one second-layer SDU.

Alternatively, in an exemplary embodiment, a method is disclosed for transmitting data over a wireless channel to a data receiving node in a communication system, comprising: receiving, from a third layer, at least one second-layer service data unit, SDU, to be mapped onto a resource allocated for data transmission, generating a second-layer protocol data unit, PDU, including said at least one second-layer SDU and at least one second-layer control element, the at least one second-layer control element placed after any of the at least one second-layer SDU, receiving the secondlayer PDU generated by the second-layer processing and mapping the second-layer PDU onto the resource allocated for data transmission.

Alternatively, in an exemplary embodiment, a method is disclosed for receiving data over a wireless channel from a data transmitting node in a communication system, comprising: de-mapping at least one second-layer protocol data unit, PDU, from a resource allocated for data reception, receiving and parsing the second-layer PDU de-mapped by the first-layer processing circuitry, the second-layer PDU including at least one second-layer service data unit, SDU, and at least one second-layer control element, the at least one secondlayer control element following any of the at least one second-layer SDU.

Hardware and Software Implementation of the Present Disclosure

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. They may include a data input and output coupled thereto. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present disclosure relates to layer processing at a receiver and a transmitter in a communication system. The layer processing includes at least processing on a first, a second and a third layer. At the transmitter side, the third layer receives a packet, adds its header and forwards the packet to the second layer. The second layer performs segmentation and provides segmented data to the first layer, which maps the segmented data onto physical resources. The segmentation is based on the allocated resources. Retransmissions may take place on the third layer and thus, the third layer may re-segment the packet according to the received feedback for particular segments and provide the re-segmented data to the lower layers. Alternatively, the feedback information is provided to the second layer which then performs the segmentation by taking it into account. Correspondingly, the receiver performs re-ordering and re-assembly at the third layer for which it receives also control information from the second layer.

Moreover, the present disclosure relates to systems and methods for transmitting data over a wireless channel from a data transmitting node to a data receiving node in a communication system. In particular, the data transmitting node comprises a second-layer processing unit for receiving, from a third layer, at least one second-layer service data unit, SDU, to be mapped onto a resource allocated for data transmission, and for generating a second-layer protocol data unit, PDU, including said at least one second-layer SDU and at least one second-layer control element, the at least one second-layer control element placed after any of the at least one second-layer SDU, and a first-layer processing unit for receiving the second-layer PDU generated by the second-layer processing unit and mapping the second-layer PDU onto the resource allocated for data transmission. The data receiving node comprises a first-layer processing unit for de-mapping at least one second-layer protocol data unit, PDU, from a resource allocated for data reception, and a second layer processing unit for receiving and parsing the second-layer PDU de-mapped by the first-layer processing unit, the second-layer PDU including at least one second-layer service data unit, SDU, and at least one second-layer control element, the at least one second-layer control element following any of the at least one second-layer SDU.

What is claimed is:

1. A communication apparatus, comprising:
    circuitry, which, in operation, generates a first-type second-layer protocol data unit (PDU) including at least one second-layer service data unit (SDU) and at least one second-layer control element, which is placed after any of the at least one second-layer SDU;
    a transmitter, which, in operation, transmits the first-type second-layer PDU mapped onto a resource allocated for data transmission; and
    a receiver, which, in operation, receives at least one second-type second-layer PDU mapped onto a resource allocated for data reception, wherein the second-type second-layer PDU includes at least one second-layer SDU and at least one second-layer control element, which precedes any of the at least one second-layer SDU,
    wherein the circuitry, in operation, parses the second-type second-layer PDU de-mapped from the resource allocated for data reception,
    wherein the first-type second-layer PDU and the second-type second-layer PDU are generated dependent on a type of second-layer control element to be included in the first-type second-layer PDU or the second-type second-layer PDU, and
    wherein the type of second-layer control element to be included in the first-type second-layer PDU includes at least a power headroom report and the type of second-layer control element to be included in the second-type second-layer PDU includes at least one of activation/deactivation commands or a contention resolution message.

2. The communication apparatus according to claim 1, wherein
    the first-type or second-type second-layer PDU further includes:
    a second-layer subheader associated with the at least one second-layer SDU, or
    a second-layer subheader associated with the at least one second-layer control element.

3. The communication apparatus according to claim 2, wherein
    the at least one second-layer SDU is placed after the associated second-layer subheader and the at least one second-layer control element is placed before the associated second-layer subheader.

4. The communication apparatus according to claim 3, wherein
    the second-layer subheader includes a presence indicator indicating whether the first-type or second-type second-layer PDU includes at least one second-layer control element.

5. The communication apparatus according to claim 2, wherein
    the second-layer subheader associated with the at least one second-layer control element precedes the second-layer SDU and the second-layer subheader associated with the second-layer SDU.

6. The communication apparatus according to claim 1, wherein
    the first-type or second-type second-layer PDU includes a padding buffer status report (BSR) and a second-layer subheader associated with the padding BSR, and
    the padding BSR and the second-layer subheader associated with the padding BSR are placed after any of the at least one second-layer SDU.

7. The communication apparatus according to claim 1, wherein
    the first-type second-layer PDU includes an uplink second-layer control element, and the second-type second-layer PDU includes a downlink second-layer control element.

8. The communication apparatus according to claim 1, wherein
    the circuitry, in operation, starts forwarding packages constituting parts of the first-type second-layer PDU to first-layer processing before completing the generation of the first-type second-layer PDU.

9. A method comprising:
    generating a first-type second-layer protocol data unit (PDU) including at least one second-layer service data unit (SDU) and at least one second-layer control element, which is placed after any of the at least one second-layer SDU;
    transmitting the first-type second-layer PDU mapped onto a resource allocated for data transmission;
    receiving at least one second-type second-layer PDU mapped onto a resource allocated for data reception, wherein the second-type second-layer PDU includes at least one second-layer SDU and at least one second-layer control element, which precedes any of the at least one second-layer SDU; and
    parsing the second-type second-layer PDU de-mapped from the resource allocated for data reception,
    wherein the first-type second-layer PDU and the second-type second-layer PDU are generated dependent on a type of second-layer control element to be included in the first-type second-layer PDU or the second-type second-layer PDU, and
    wherein the type of second-layer control element to be included in the first-type second-layer PDU includes at least a power headroom report and the type of second-layer control element to be included in the second-type second-layer PDU includes at least one of activation/deactivation commands or a contention resolution message.

10. The method according to claim 9, wherein
    the first-type or second-type second-layer PDU further includes:
    a second-layer subheader associated with the at least one second-layer SDU, or
    a second-layer subheader associated with the at least one second-layer control element.

11. The method according to claim 10, wherein
    the at least one second-layer SDU is placed after the associated second-layer subheader and the at least one second-layer control element is placed before the associated second-layer subheader.

12. The method according to claim 11, wherein
    the second-layer subheader includes a presence indicator indicating whether the first-type or second-type second-layer PDU includes at least one second-layer control element.

13. The method according to claim 10, wherein
    the second-layer subheader associated with the at least one second-layer control element precedes the second-layer SDU and the second-layer subheader associated with the second-layer SDU.

14. The method according to claim 9, wherein
    the first-type or second-type second-layer PDU includes a padding buffer status report (BSR) and a second-layer subheader associated with the padding BSR, and the padding BSR and the second-layer subheader associated with the padding BSR are placed after any of the at least one second-layer SDU.

15. The method according to claim 9, wherein the first-type second-layer PDU includes an uplink second-layer control element, and the second-type second-layer PDU includes a downlink second-layer control element.

16. The method according to claim 9, comprising: starting to forward packages constituting parts of the first-type second-layer PDU to a first layer before completing the generation of the first-type second-layer PDU.

* * * * *